(12) United States Patent
Yuasa et al.

(10) Patent No.: US 7,390,564 B2
(45) Date of Patent: Jun. 24, 2008

(54) COATED METAL MATERIAL CAPABLE OF BEING WELDED WHICH IS EXCELLENT IN CORROSION RESISTANCE OF WORKED ZONE

(75) Inventors: Kensei Yuasa, Futtsu (JP); Hiroshi Kanai, Futtsu (JP); Masahiro Fuda, Futtsu (JP)

(73) Assignee: Nippon Steel Corporation, Tokyo (JP)

( * ) Notice: Subject to any disclaimer, the term of this patent is extended or adjusted under 35 U.S.C. 154(b) by 230 days.

(21) Appl. No.: 10/514,369

(22) PCT Filed: May 14, 2003

(86) PCT No.: PCT/JP03/06027

§ 371 (c)(1),
(2), (4) Date: Jun. 3, 2005

(87) PCT Pub. No.: WO03/095195

PCT Pub. Date: Nov. 20, 2003

(65) Prior Publication Data

US 2005/0244660 A1      Nov. 3, 2005

(30) Foreign Application Priority Data

| May 14, 2002 | (JP) | ............................. 2002-139037 |
| Nov. 26, 2002 | (JP) | ............................. 2002-342433 |
| Nov. 26, 2002 | (JP) | ............................. 2002-342467 |
| Dec. 6, 2002 | (JP) | ............................. 2002-354714 |
| Dec. 6, 2002 | (JP) | ............................. 2002-354867 |

(51) Int. Cl.
*B32B 27/32* (2006.01)
*B32B 5/16* (2006.01)
*B32B 27/40* (2006.01)
*B32B 15/04* (2006.01)

(52) U.S. Cl. .................. 428/323; 428/220; 428/328; 428/331; 428/423.1; 428/457

(58) Field of Classification Search ................ None
See application file for complete search history.

(56) References Cited

U.S. PATENT DOCUMENTS

| 4,079,163 A | * | 3/1978 | Tanaka et al. ............... 428/328 |
| 4,880,890 A | * | 11/1989 | Miyabayashi et al. ......... 528/45 |
| 6,440,580 B1 | * | 8/2002 | Berger et al. ................ 428/623 |

FOREIGN PATENT DOCUMENTS

| JP | 1-60668 | | 3/1989 |
| JP | 4-65475 | | 3/1992 |
| JP | 4-077246 | A | 3/1992 |
| JP | 5-77357 | | 3/1993 |
| JP | 6-47863 | | 2/1994 |
| JP | 7-314601 | | 12/1995 |
| JP | 08-294668 | | 12/1996 |
| JP | 9-117984 | | 5/1997 |
| JP | 9-234820 | | 9/1997 |
| JP | 09-276786 | | 10/1997 |
| JP | 09-286932 | A | 11/1997 |
| JP | 10-44307 | | 2/1998 |
| JP | 11-061001 | | 3/1999 |
| JP | 11-92960 | | 4/1999 |
| JP | 2000-017450 | A | 1/2000 |
| JP | 2000-025468 | A | 1/2000 |
| JP | 2000-107686 | | 4/2000 |
| JP | 2000-119867 | A | 4/2000 |
| JP | 2000-198963 | A | 7/2000 |
| JP | 2000-199078 | A | 7/2000 |
| JP | 2000-319790 | | 11/2000 |
| JP | 2001-202830 | | 7/2001 |
| JP | 2001-271177 | A | 10/2001 |
| JP | 2002-172363 | | 6/2002 |

* cited by examiner

*Primary Examiner*—Sheeba Ahmed
(74) *Attorney, Agent, or Firm*—Kenyon & Kenyon LLP

(57) ABSTRACT

A weldable coated metal material excellent in the corrosion resistance of the formed part, comprising a metal sheet having formed on at least one surface thereof a coat layer containing electrically conducting particles, wherein the number distribution of the electrically conducting particle has a mode value in the particle size range from 0.05 to 1.0 μm and the total content of electrically conducting particles in the coat layer is from 15 to 60 vol %.

29 Claims, 1 Drawing Sheet

COATED METAL MATERIAL CAPABLE OF BEING WELDED WHICH IS EXCELLENT IN CORROSION RESISTANCE OF WORKED ZONE

TECHNICAL FIELD OF THE INVENTION

The present invention relates to a metal sheet, having formed thereon a coat layer containing electrically conducting particles, which is used for automobiles, home appliances, OA devices, civil engineering building materials and the like. Particularly, the present invention relates to a weldable coated metal material excellent in the corrosion resistance of the formed part and, more specifically, a coated metal material not susceptible to the generation of corrosive perforation in the portion formed by press forming even when formed through press forming and electric resistance welding and used in a corrosive environment without applying rust-preventive coating. The present invention also relates to a rust-preventive steel sheet having excellent corrosion resistance and exhibiting both good resistance weldability and good press formability, which is used as a material particularly for the fuel tank of automobiles.

BACKGROUND ART

In order to prevent a metal material from the environmental corrosion during use, application of various coating materials has been heretofore employed. The coat layer formed on the metal sheet usually uses an electrically non-conducting resin as the binder and therefore, this layer has no electric conductivity and can be hardly welded and earth-grounded. To solve this problem, a technique of forming a coat layer containing electrically conducting particles on a metal sheet to impart electric conductivity and thereby enable welding or earth-grounding has been proposed.

For example, Japanese Unexamined Patent Publication (Kokai) No. 09-234820 discloses a technique of imparting weldability by subjecting the metal sheet to coating with a resin using iron phosphide as the electrically conducting particles. In this method, the amount of the electrically conducting particles is specified to be 20 to 45 mass % and the weldability is ensured by controlling the amount to this range. As for the particle size, it is stated that the particles preferably have an average particle size of 20 µm or less.

Japanese Unexamined Patent Publication (Kokai) No. 07-314601 discloses a technique of imparting an earthing property by using nickel-based particles as the electrically conducting particles. In this method, the average value and the maximum value are specified with respect to the particle size of the electrically conducting particles and it is stated that the matter of importance for ensuring electrical conductivity is to add, in the case of a scale-like particle, from 11 to 200 parts of the electrically conducting particles having a long diameter of 100 µm as a maximum and 15 µm on average and in the case of a chain-like particle, 10 parts or less of the electrically conducting particles having a maximum particle size of 44 µm and an average particle size of 2.5 µm.

Also, in Japanese Unexamined Patent Publication (Kokai) No. 01-60668, the ratio of the average particle size of metal-based particle to the thickness of coating film is specified for imparting the electrical conductivity and it is stated that when the average particle size is from 0.5 to 3 times the film thickness, electric conductivity can be ensured. The particle size is not particularly described but in Examples, a particle having an average particle size of 7.5 to 25 µm is used.

Recently, Japanese Unexamined Patent Publication (Kokai) No. 2002-172363 has proposed a technique of coating an organic resin film containing from 10 to 70 mass % of ferro-silicon having a particle size of 0.5 to 10 µm on a zinc-plated steel sheet to a thickness of 2.5 to 8 µm to obtain a surface-treated steel sheet having excellent weldability.

The techniques disclosed in these publications are satisfied in terms of imparting electric conductivity to the coat layer and thereby ensuring weldability or earth property as a coated metal sheet, but are still insufficient from the aspect of obtaining satisfactory formability and corrosion resistance as well as stable weldability and an earthing property. One of the causes therefor is in that only the concept of average or maximum particle size is used in designing the particle size of the particle but the particle size distribution is not taken into consideration.

Japanese Unexamined Patent Publication (Kokai) Nos. 09-234820 and 2002-172363 supra disclose that a rust-preventive pigment is added for the purpose of enhancing the corrosion resistance. However, when a rust-preventive pigment is added in addition to the electrically conducting pigment, the electric conductivity or formability decreases and therefore, if possible, the addition of a rust-preventive pigment must be minimized. Japanese Unexamined Patent Publication (Kokai) No. 2002-172363 also discloses that when a zinc alloy-plated steel sheet is used for the underlying plated steel sheet, a coated steel sheet having more excellent corrosion resistance can be obtained. However, a change in the kind of plating may cause increase in the cost or may sacrifice other performances and therefore, it is demanded to obtain high corrosion resistance or formability independently of the kind of the underlying steel sheet.

In order to solve these problems, a first object of the present invention is to provide a coated metal sheet excellent in electric conductivity (for example, weldability and an earthing property), corrosion resistance and formability.

In a metal-made part for the outer panel of automobiles, the joined portion or folded hem portion on the inner surface of a hollow part prone to severe corrosion is coated by electrodeposition painting and/or applied with a rust-preventive subsidiary material such as sealer, adhesive and wax, whereby the corrosion resistance is ensured in many cases. On the other hand, studies are being made to reduce the production cost of an automobile by omitting or decreasing the painting on the inner surface of an automobile part or the rust-preventive treatment with sealer-wax or the like, which is performed for the purpose of rust prevention, and various coated steel sheets have been heretofore proposed. For example, Japanese Unexamined Patent Publication (Kokai) No. 55-17508 discloses a technique of forming a zinc-containing coating film on a steel sheet surface. Also, a steel sheet capable of ensuring rust perforation resistance even when electrodeposition painting or rust-preventive subsidiary material is not applied has been proposed and, for example, Japanese Unexamined Patent Publication (Kokai) Nos. 9-23480, 10-128906 and 11-5269 disclose a steel sheet where an electrically conducting resin coat layer is formed on a steel sheet surface. As for the constitution thereof in general, an organic film containing an electrically conducting or rust-preventive pigment is coated on a plated steel sheet through an undercoating layer.

However, when the steel sheet coated with such an organic film is formed as an automobile part through severe drawing or bending of press forming, the corrosion resistance in the formed part may decrease. One of the reasons therefor is because the film cannot follow the deformation of steel sheet and this causes cracking or separation of the film. Also, when the film is made thick so as to ensure sufficiently high corrosion resistance, this causes problems that welding and, in turn, stable production become difficult and the cost increases. Accordingly, conventional coated steel sheets decrease in the corrosion resistance or must receive a repair coating.

A second object of the present invention is to provide a weldable coated metal material in which, even when the steel sheet is greatly deformed by the forming under severe conditions, sufficiently high corrosion resistance can be ensured in the formed part.

In fuel tanks of automobiles, excellent formability (deep-drawing property) is required because the fuel tank has a complicated form in many cases. Also, the fuel tank is an important safety part of an automobile and therefore, it is essential that the material used therefor generates no corrosion product giving rise to filter clogging, is freed from corrosive perforation, and can be easily and stably welded. As for the material having these various properties, a lead-tin based alloy-plated steel sheet (see, Japanese Examined Patent Publication (Kokoku) No. 57-61833) has been heretofore widely used as a material for the fuel tank of automobiles. This material has a stable chemical property against gasoline, excellent press formability by virtue of high lubricity of the plating, and also excellent resistance weldability such as spot welding and seam welding. However, in view of environmental impact, materials not using lead are demanded and there are disclosed techniques such as tin-based alloy-plated steel sheet (see, for example, Japanese Unexamined Patent Publication (Kokai) No. 8-269733), aluminum-based alloy-plated steel sheet (see, for example, Japanese Unexamined Patent Publication (Kokai) No. 9-156027), metal- or organic film-coated zinc-based alloy-plated steel sheet (see, for example, Japanese Unexamined Patent Publication (Kokai) No. 08-296834).

In recent years, enhancement of the rust-preventive fuel tank to an extent of assuring no perforation over 15 years is demanded in North America and with this requirement, there arises a problem that corrosion resistance by conventional techniques is insufficient. When a tank is produced through forming and welding and then applied with multi-ply coating, long-term rust prevention can be achieved, but in this case, a problem of incurring a great increase in the cost arises. Also, for example, Kokai No. 6-306637 discloses a technique of applying a metal powder-containing organic film to an aluminum-based alloy-plated steel sheet, but this method has a problem in that, when the steel sheet is shaped through severe drawing or bending of press forming, the film cannot follow the deformation of steel sheet and this may cause cracking or separation of the plating layer or the film to decrease the corrosion resistance of the formed part or in that when the film is made thick so as to ensure sufficiently high corrosion resistance, the welding and in turn the stable production become difficult and the cost increases. Furthermore, Japanese Unexamined Patent Publication (Kokoku) No. 3-25349 discloses a technique of coating a zinc-plated steel sheet with an organic film containing various metal powers, but the zinc-based plating has a fear of causing filter clogging due to generation of corrosion product ascribable to an organic acid and coagulated water produced by gasoline degradation particularly in the portion subjected to severe forming. In addition, as the outer surface is also required to have high corrosion resistance, an organic coating film having a larger thickness must be applied to both the inner surface and the outer surface and this may cause problems that the welding and, in turn, the stable production, become difficult and the cost increases.

A third object of the present invention is to overcome the above-described problems in the performance and production and provide a rust-preventive steel sheet capable of realizing, as a fuel tank, high inner surface corrosion resistance and exhibiting good formability and stable weldability.

DISCLOSURE OF THE INVENTION

One technical point of the present invention is in the finding that when the particle size of the electrically conducting particle formed on a metal sheet is designed by taking account of not only the "average particle size" proposed, for example, in Kokai Nos. 07-314601 and 2000-319790 but also the size distribution, the electric conductivity, corrosion resistance and formability all can be satisfied at the same time. Another technical point is in the finding that although the electric conductivity is conventionally ensured by adding electrically conducting particles having a relatively large average particle size, for example, an average particle size larger than a certain level based on the thickness of coating film as described in Kokai No. 01-60668, when electrically conducting particles having a small particle size are used, this rather yields stable electric conductivity and also gives good effect on the corrosion resistance and formability.

Also, in thinking that it is necessary for ensuring corrosion resistance particularly in the formed part that the organic film of a coated steel sheet properly follows the deformation of the underlying steel material, the present inventors have made investigations on the components in the resin for the organic film, the kind of pigment added and the blending ratio thereof. As a result, it has been found that when an organic film containing electrically conducting particles comprising (1) a resin having a urethane bond and (2) (i) a metal and/or (ii) an alloy or compound of a typical metal, transition metal or semimetal element is applied to the entire or partial surface of a metal material, even if the metal material is greatly deformed by the forming under severe conditions, sufficiently high corrosion resistance can be ensured also in the formed part; and that when a certain kind of silicon compound is further used as the electrically conducting particle or a rust-preventive pigment is further added, a more enhanced corrosion resistance can be obtained. The present invention has been accomplished based on these findings.

Furthermore, the present inventors have made various investigations on a rust-preventive steel sheet for tanks, having excellent corrosion resistance and also being excellent in weldability and formability and, as a result, it has been found that when a film mainly comprising an organic resin containing an electrically conducting pigment is formed on at least one surface of a surface-treated steel sheet and when the film has a thickness of 5 to 30 μm and a surface roughness of 0.3 to 2.5 μm as the average roughness from center line of surface roughness (Ra) or 20 μm or less as the maximum height of surface roughness (Rmax) and/or the peak count of surface texture (Pc) of surface texture is controlled to from 10 to 200 peaks per 10-mm length with a count level of 0.3 μm, good press formability and stabilized continuous weldability can be obtained and the corrosion resistance is also satisfied. It has been also found that when an tin or tin-based alloy coat layer is formed on a surface of a steel sheet and after applying an undercoating film to one surface or both surfaces of the steel sheet, an organic film containing an electrically conducting pigment is further formed on one surface or both surfaces of the steel sheet, the above-described problem in the long-term corrosion resistance can be solved and at the same time, excellent properties, for a fuel tank, appear.

Specifically, the present invention provides the following.

(1) A weldable coated metal material excellent in the corrosion resistance of the formed part, comprising a metal sheet having formed, on at least one surface thereof, a coat layer containing electrically conducting particles, wherein the number distribution of the electrically conducting particles have a mode value in the particle size range from 0.05 to 1.0 μm and the total content of electrically conducting particles in the coat layer is from 15 to 60 vol %.

(2) The coated metal material as described in (1) above, wherein the number of particles at the mode value in the number distribution of the electrically conducting particles occupies 5% or more in the number of all electrically conducting particles.

(3) The coated metal material as described in (1) or (2) above, wherein the volume distribution in relation to particle size of the electrically conducting particles has a mode value of 2 to 20 μm.

(4) The coated metal material as described in any one of (1) to (3) above, wherein the average thickness of the coat layer is from 2 to 20 μm.

(5) The coated metal material as described in any one of (1) to (4) above, wherein the maximum particle size of the electrically conducting particles is 25 μm or less.

(6) A coated metal material excellent in electric conductivity, corrosion resistance and formability, comprising a metal sheet having formed on at least one surface thereof a coat layer containing electrically conducting particles, wherein assuming that the mode value in the number distribution in relation to particle size of the electrically conducting particles is Mn, the mode value in the volume distribution in relation to particle size of the electrically conducting particle is Mv and the thickness of the coat layer is H, $$H/10 \leq Mv \leq 10H$$

$$5Mn \leq H \leq 200Mn$$

$$12 \leq Mv/Mn \leq 50$$

and at the same time, the content of the electrically conducting particle in the coat layer is from 15 to 60 vol %.

(7) The coated metal material as described in (6) above, wherein Mn is from 0.05 to 1.5 μm and Mv is from 2 to 30 μm.

(8) The coated metal material as described in (6) or (7) above, wherein the thickness H of the coat layer is from 2 to 20 μm.

(9) The coated metal material as described in any one of (6) to (8) above, wherein the maximum particle size of the electrically conducting particle is 35 μm or less.

(10) The coated metal material as described in any one of (1) to (9) above, wherein the electrically conducting particles comprise (i) a metal and/or (ii) an alloy or compound of a typical metal, transition metal or semimetal element.

(11) The coated metal material as described in any one of (1) to (10) above, wherein the electrically conducting particles are ferrosilicon.

(12) The weldable coated metal material excellent in the corrosion resistance of the formed part as described in any one of (6) to (11) above, wherein the binder component in the coat layer mainly comprises a thermoplastic resin.

(13) The weldable coated metal material excellent in the corrosion resistance of the formed part as described in any one of (6) to (12) above, wherein the coat layer contains 20 vol % or less in total of a rust-preventive pigment and/or silica.

(14) The weldable coated metal material excellent in the corrosion resistance of the formed part as described in any one of (1) to (13) above, wherein the binder component in the coat layer mainly comprises a urethane bond-containing resin.

(15) A weldable coated metal material excellent in the corrosion resistance of the formed part, which is a coated metal material having a coat layer containing electrically conducting particles, wherein the binder component in the coat layer is a resin system mainly comprising a urethane bond-containing resin and the urethane bond-containing resin is an organic resin produced from a raw material film-forming resin containing (a) a polyester polyol having at least three functional groups and (b) a blocked organic polyisocyanate or a blocked product of a prepolymer having an NCO group at the end obtained by the reaction of an organic polyisocyanate with an active hydrogen compound.

(16) The weldable coated metal material excellent in the corrosion resistance of the formed part as described in (15) above, wherein the urethane bond-containing resin is an organic resin produced from a raw material film-forming resin containing (a) a polyester polyol having at least three functional groups, (b) a blocked organic polyisocyanate or a blocked product of a prepolymer having an NCO group at the end obtained by the reaction of an organic polyisocyanate with an active hydrogen compound, and (c) an epoxy resin having at least one secondary hydroxyl group or an adduct thereof.

(17) The weldable coated metal material excellent in the corrosion resistance of the formed part as described in (15) or (16) above, wherein the organic film further comprises a rust-preventive pigment.

(18) The weldable coated metal material excellent in the corrosion resistance of the formed part as described in any one of (15) to (17) above, wherein the electrically conducting particles in the organic film are an alloy or compound containing 50 mass % or more of silicon or a composite material thereof.

(19) The weldable coated metal material excellent in the corrosion resistance of the formed part as described in any one of (15) to (18) above, wherein the electrically conducting particles in the organic film are ferrosilicon containing 70 mass % or more of silicon.

(20) The coated metal sheet as described in any one of (17) to (19) above, wherein the coat layer contains 20 vol % or less in total of the rust-preventive pigment and/or silica.

(21) The weldable coated metal material excellent in the corrosion resistance of the formed part as described in any one of (1) to (20) above, wherein an organic resin film containing electrically conducting particle is formed as the coat layer on at least one surface of a surface-treated steel sheet and the surface roughness of the organic film is from 0.3 to 2.5 μm as the average roughness from center line of surface roughness Ra.

(22) The weldable coated metal material excellent in the corrosion resistance of the formed part as described in (21) above, wherein the content of the electrically conducting pigment in the organic film is from 5 to 50 vol % in terms of the solid content.

(23) The weldable coated metal material excellent in the corrosion resistance of the formed part as described in (20) or (21) above, wherein the electrically conducting pigment comprises one or more member selected from the group consisting of stainless steel, zinc, aluminum, nickel, ferrosilicon and iron phosphide.

(24) The weldable coated metal material excellent in the corrosion resistance of the formed part as described in any one of (21) to (23) above, wherein one electrically conducting pigment is an alloy or compound containing 40 mass % or more of silicon or a composite material thereof.

(25) The weldable coated metal material excellent in the corrosion resistance of the formed part as described in any one of (21) to (24) above, wherein the organic film further contains from 1 to 40 vol %, in terms of the solid content, of a rust-preventive pigment and the sum of the electrically conducting pigment and the rust-preventive pigment is from 5 to 70 vol % in terms of the solid content.

(26) The weldable coated metal material excellent in the corrosion resistance of the formed part as described in any one of (21) to (25) above, wherein the surface roughness of the organic film is 20 μm or less as the maximum height Rmax.

(27) The weldable coated metal material excellent in the corrosion resistance of the formed part as described in any one of (21) to (26) above, wherein the surface texture of the organic film has a peak count Pc of 10 to 200 peaks per 10-mm length with a count level of 0.3 μm.

(28) A weldable coated metal material excellent in the corrosion resistance of the formed part, obtained by forming a tin or tin-based alloy coat layer on a surface of a steel sheet, applying an undercoating film to a coverage of 10 to 1,000 mg/m$^2$ on one surface or both surfaces of the steel sheet, and further forming an organic film containing an electrically conducting pigment to a thickness of 1.0 to 20 μm on one surface or both surfaces of the steel sheet.

(29) The weldable coated metal material excellent in the corrosion resistance of the formed part as described in (28) above, wherein the organic film is a resin system mainly comprising a urethane bond-containing resin and the urethane bond-containing resin is an organic resin produced from a raw material film-forming resin containing (a) a polyester polyol having at least three functional groups and (b) a blocked organic polyisocyanate or a blocked product of a prepolymer having an NCO group (an isocianate group: —N=C=O) at the end obtained by the reaction of an organic polyisocyanate with an active hydrogen compound.

(30) The weldable coated metal material excellent in the corrosion resistance of the formed part as described in (29) above, wherein the urethane bond-containing resin is an organic resin produced from a raw material film-forming resin further containing, in addition to (a) and (b), (c) an epoxy resin having at least one secondary hydroxyl group or an adduct thereof.

(31) The weldable coated metal material excellent in the corrosion resistance of the formed part as described in any one of (28) to (30) above, wherein the organic film comprises from 1 to 50 vol % of an electrically conducting pigment and from 5 to 40 vol % of a rust-preventive pigment and the electrically conducting pigment and rust-preventive pigment account for from 5 to 70 vol % of the entire coating film.

(32) The weldable coated metal material excellent in the corrosion resistance of the formed part as described in any one of (28) to (31) above, wherein the electrically conducting pigment comprises one or more member selected from the group consisting of stainless steel, zinc, aluminum, nickel, ferrosilicon and iron phosphide.

(33) The weldable coated metal material excellent in the corrosion resistance of the formed part as described in any one of (1) to (32) above, which comprises an undercoating film between the organic film and the surface-treated steel sheet.

(34) The weldable coated metal material excellent in the corrosion resistance of the formed part as described in (33) above, wherein the coverage of the undercoating film is from 10 to 1,000 mg/m$^2$.

In the above, (1), (6), (15), (21) and (28) each is an independent aspect of the present invention having a characteristic feature, but these aspects can be combined to have characteristic features of respective aspects and depending on the case, a synergistic effect can be provided. Such combinations are belonging to the present invention.

MODE FOR CARRYING OUT THE INVENTION

Figure 1:
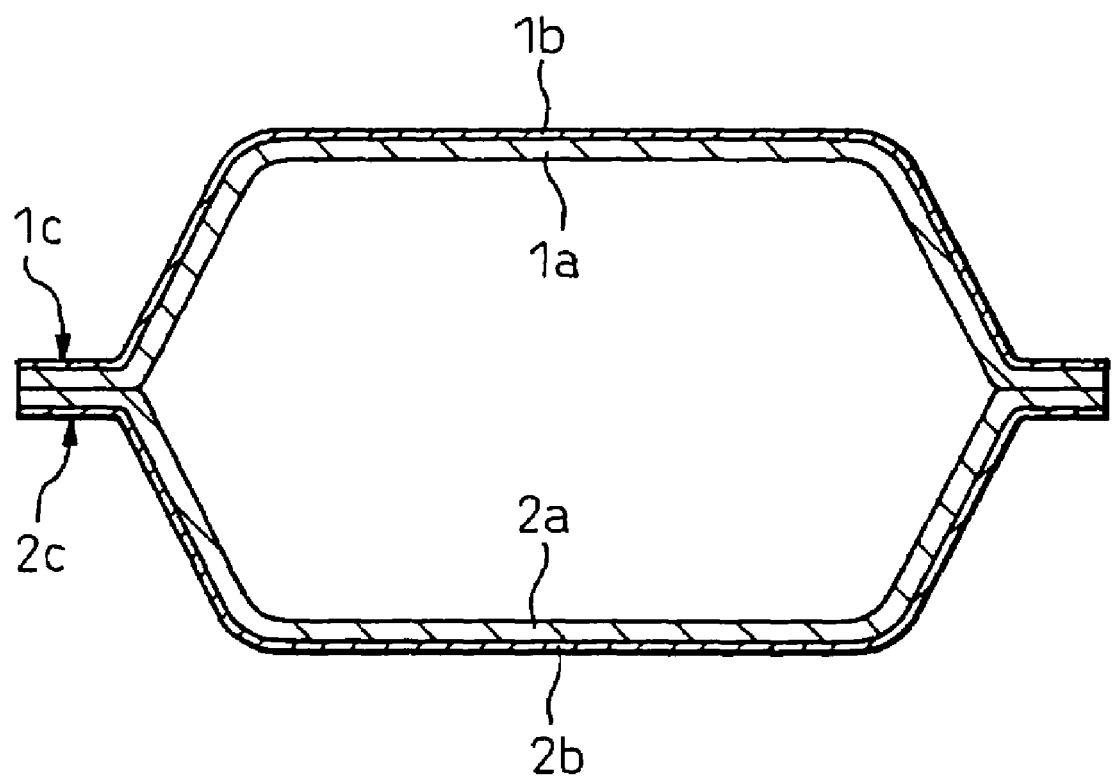
FIG. 1 is a view showing an example of a fuel tank.

The embodiments of the present invention are described in detail below.

In the present invention, formation of a coat layer containing electrically conducting particles on at least one surface of a metal sheet is essential and with respect to the particle size of the electrically conducting particles, the mode value in the number distribution in relation to particle size must be from 0.05 to 1.0 μm.

The particle size has a distribution but in conventional techniques, a simple concept of "average particle size" has been used. The average particle size is simply determined by an arithmetic calculation of particle sizes of individual particles. However, the present inventors have realized that the mere average of particle sizes is not important but the particle size distribution and particularly, which particle size is possessed by many particles, greatly affects the electric conductivity (weldability or earth property), corrosion resistance and formability of the entire coated metal sheet. The particle size of particle is measured, the number of particles having the measured particle size is counted, the number distribution in relation to particle size is examined, and the particle size having a largest number of particles (mode value) is determined. When the mode value is from 0.05 to 1.0 μm, each performance is high and a good balance is obtained. In examining the number distribution, the data are preferably sampled by setting the range in the measurement of the number of particles having the particle size to 0.05 μm (0.025 μm before and after the particle size indicated value). In the coating material (liquid) state, the particle size distribution can be easily examined by a size distribution meter. In the case of a coating film state, a secondary electron image of the cross section of the coating film is photographed and the actual particle size of the particle is measured. In the case where the particle is not spherical, the long diameter is defined as the particle size of the particle. When the particle size distribution is a normal distribution, the average particle size agrees with the mode value as used in the present invention but, in fact, when the particle is kept in the ground state or when the particles are dispersed after a coating material state is produced, a larger number of particles having a larger particle size remain to give a tail on the large particle size side and the average particle size does not agree with the mode value.

If the mode value is less than 0.05 μm, the process of pulverizing the particle takes a long time or secondary aggregation of particles often occurs and this is not practical. Also, the electric conductivity decreases. On the other hand, if the mode value exceeds 1.0 μm, the proportion of large particles increases to cause reduction in the corrosion resistance and formability. The mode value is more preferably from 0.05 to 0.5 μm and with this range, the electric conductivity, corrosion resistance and formability become particularly good.

When the number of particles having a particle size at the mode value accounts for 5% or more of the number of all particles, particularly good performances can be obtained. This is preferably 7% or more.

The particle size of the electrically conducting particle, which is small as compared with conventional inventions, is also one characteristic feature of the present invention. The general thinking in conventional techniques is such that the particle size is made larger than a certain level based on the thickness of coating film to allow the particles to penetrate through the coating film or the coating film is partially ruptured due to pressure of the electrode at the welding to put the electrically conducting particles into contact with the electrode, whereby the electric conductivity is ensured. In this case, when the thickness becomes large, the particle size of the particle must be also enlarged for ensuring the electric conductivity, and this technique is substantially effective only when the coating thickness is small. The present invention is based on the thinking that a relatively large amount of particles having a small particle size are contained in the coat layer and the electrification path is thereby stably ensured. Therefore, the entire particle is made small and for ensuring the amount of particles having a small particle size, the mode value is used as the measure. By this constitution, the electric conductivity can be ensured even when the film thickness becomes large and the particle size is small. Furthermore, a more preferred film can be specified by specifying the relationship between the particle size and the film thickness.

The present inventors have further realized that the mode value for the volume distribution every each particle size of the electrically conducting particles is also important. Insofar as the mode value in the number distribution of the particle size is in the above-described range, the electric conductivity, corrosion resistance and formability become good, but furthermore, when the mode value for the volume distribution is in the range from 2 to 20 µm, the performances in particular are enhanced. This value is determined by measuring volumes of individual particles every each particle size and calculating the ratio of the total volume of particles having that particle size to the entire volume of all particles. The particle size having a largest ratio is defined here as the mode value for the volume distribution every each particle size. This mode value is an index more strongly showing the effect of particles having a large particle size and when the number of large particles is large, this value becomes outstandingly large. Even with the same mode value for the number distribution, when the large particle size side has a large distribution, this value becomes large. If the mode value for the volume distribution is high, the weldability in particular is liable to decrease. The decrease in weldability as used herein means reduction in the continuous dotting property and easy generation of cracking in the metal sheet of the welded part.

If this mode value exceeds 20 µm, the weldability, particularly continuous dotting property, decreases and the formability or corrosion resistance also decreases. In order to render this mode value to be 2 µm or less, the particle must be made small, requiring much labor, and this is unprofitable. At the same time, if the content of the electrically conducting particle is small, the electric conductivity decreases. As described above, if the mode value is high, the continuous weldability in particular is liable to decrease. The reason therefor is presumed to be as follows. If the mode value for the volume distribution becomes large, the coat layer is more increased in the unevenness and only the protruded part of the coat layer is easily contacted with the electrode for welding to cause unstable electrification, as a result, generation of dust increases and the electrode is readily fouled. Furthermore, due to local generation of heat, the form of the nugget is worsened and the welding intensity becomes unstable. Since hard electrically conducting particles are present in the protruded part, the coat layer is not compressed by the pressure between electrodes and the electrification is ensured only by the one electrically conducting particle. In such an electrification form, the electric current is liable to concentrate at one point and, in turn, the generation of heat is liable to concentrate at that portion. Due to the effect of this heat, cracking of the metal sheet itself is readily generated in the welded part and in the vicinity thereof. On the other hand, when the mode value in the volume distribution is 20 µm or less or when the relationship between the particle size distribution and the film thickness is within the range specified in the present invention, the number of particles having a large particle size is decreased and this gives a smoother coat layer surface, as a result, the electrode can be contacted with a larger area of the coat layer, stable electrification can be obtained and a nugget in a normal form can be easily formed. Also, by virtue of the absence of large particles, the coat layer is slightly compressed by the pressure between electrodes, whereby electrification among electrically conducting particles is more easily ensured and the electric conductivity is enhanced. Furthermore, as the electric current does not concentrate at one point, the phenomenon that the metal sheet in the welded part or in the vicinity of the welded part is cracked can be prevented.

Within the range specified in the present invention, the formability is also enhanced than ever before. The reason therefor is because due to absence of excessively large particles, the particles less exfoliate at the exfoliate shaping and also the cracking of the coating film at the shaping, which takes place in many cases in the vicinity of the interface between the particles and the binder component, is reduced. In addition, the coating film surface is free from excessive unevenness, so that the coating film surface can have good slidability and the appearance and corrosion resistance after a draw-bead test or the like can also become better. The same applies to the draw-forming.

By virtue of good formability and no exfoliation or damage to a part of the coating film, the corrosion resistance is also enhanced. Particularly, in the case of using a particle having a rust-preventive effect, such as ferrosilicon, the increase in the surface area of the particle also provides an effect of enhancing the corrosion resistance.

In the present invention, the particle size distribution of the electrically conducting particles can be varied by a known method such as mechanical grinding or classification. The electrically conducting particle may be mixed in a binder for forming the coat layer after adjusting the size distribution to a specific range and then dispersed in the binder layer by a method of unchanging the size distribution, such as almost shearless stirring, or may be mixed in the binder and then dispersed under the conditions of causing the particle to be ground. The order of grinding and dispersion is not particularly limited.

The mode value in the volume distribution may be measured by a commercially available size distribution meter or in the above-described method of determining the particle size distribution by observing the cross section of the coat layer, may be determined from the particle size assuming that the particle is a sphere.

In the present invention, it is essential that the total content of electrically conducting particles in the coat layer is from 15 to 60 vol %. If the content is less than 15 vol %, insufficient electric conductivity results, whereas if it exceeds 60 vol %, the formability decreases. The total content is preferably from 20 to 35 vol %.

In the present invention, the film thickness is substantially not limited, but when the film thickness is from 2 to 20 µm, the electric conductivity, corrosion resistance and formability in particular are enhanced and this is preferred. If the film thickness is less than 2 µm, the corrosion resistance decreases, whereas if it exceeds 20 µm, this is disadvantageous in view of profitability and also, the formability or earth property decreases. The coat layer may not be a single layer but may comprise multiple layers. If desired, another layer may be formed on or below the coat layer of the present invention. For example, an undercoating layer may be formed as the lower layer or a layer for imparting scratch resistance or other functions may be formed as the upper layer.

When the maximum particle size of the electrically conducting particle is 25 μm or less, the formability in particular is enhanced and this is preferred. Independently of the film thickness, if the maximum particle size is larger than this range, the coat layer is readily cracked when formed. Particularly, in the case where the film thickness is from 2 to 20 μm, when the maximum particle size of the electrically conducting particles is 25 μm or less, the electric conductivity, corrosion resistance and formability become best.

In the present invention, as for the particle size distribution of the electrically conducting particles, it has been further found that when the relationship of $12 \leq Mv/Mn \leq 50$ is established assuming that the mode value in the number distribution in relation to particle size of the electrically conducting particles is Mn and the mode value in the volume distribution in relation to particle size of the electrically conducting particles is Mv, particularly the electric conductivity (weldability, earth property), formability and corrosion resistance can be obtained in a high level. The numerals above are specifying the particle size distribution and particularly when many large particles are present in the particle size as the mode value for the number distribution every each particle size, the value becomes large. This is an index different from the maximum particle size and even when the maximum particle size is same, the mode value for the volume distribution sometimes differs. If Mv/Mn is less than 12, not only is this unprofitable, by requiring an operation of removing particles having a large particle size for adjusting the size distribution to such a range, but also the weldability decreases, whereas if Mv/Mn exceeds 50, the formability or corrosion resistance decreases.

Furthermore, assuming that the thickness of the coat layer is H, the relationship of the mode values with this thickness is specified to satisfy $H/10 \leq Mv \leq 10H$ and $5Mn \leq H \leq 200Mn$. Japanese Unexamined Patent Publication (Kokai) No. 01-60668 states that when the index of particle size and the index of film thickness have a relationship proposed therein, good performances can be obtained, but the present invention differs from the conventional technique in that the indices used are the mode value for the number distribution and the mode value for the volume distribution as described later and a proper region of the particle size based on the film thickness is revealed to be present also in the smaller region than that heretofore proposed (see, for example, Japanese Unexamined Patent Publication (Kokai) No. 01-60668). If Mv is less than H/10, the weldability decreases, whereas if it exceeds 10H, the formability and corrosion resistance decrease. Also, if H is less than 5Mn, the corrosion resistance and formability decrease, whereas if it exceeds 200Mn, the weldability decreases.

Within the range specified in the present invention, the formability is also enhanced than ever before. The reason therefor is because, due to absence of excessively large particles, the particles exfoliate less at the shaping and also the cracking of the coating film at the shaping, which takes place in many cases in the vicinity of the interface between the particle and the binder component, is reduced. In addition, the coating film surface is free from excessive unevenness, so that the coating film surface can have good slidability and the appearance and corrosion resistance after a draw-bead test or the like can also get better. The same applies to the draw-forming.

By virtue of good formability and no exfoliation or damage to a part of the coating film, the corrosion resistance is also enhanced. Particularly, in the case of using a particle having a rust-preventive effect, such as ferrosilicon, the increase in the surface area of the particle also provides an effect of enhancing the corrosion resistance.

When Mn of 0.05 to 1.5 μm and Mv of 2 to 30 μm are satisfied, the effect is particularly high and the weldability, formability and corrosion resistance become good. At the same time, when the film thickness is from 2 to 20 μm, a more remarkable effect is obtained. In addition to these, when the condition that the maximum particle size is 35 μm or less is satisfied, a remarkable effect can be also obtained.

The electrically conducting particles for use in the present invention may be a known substance. For example, when a particle comprising (i) a metal and/or (ii) an alloy or compound of a typical metal, transition metal or semimetal element is added, functions of, for example, enhancing the electric resistance weldability or corrosion resistance can be imparted to the coated steel sheet.

For the electrically conducting particles, such a material may be used after shaping it into a particle by a known method, for example, by grinding a solid or jetting out a melt into a gas or aqueous phase.

Examples of the particle which can be used include metals such as magnesium, aluminum, silicon, calcium, scandium, titanium, vanadium, chromium, manganese, iron, cobalt, nickel, copper, zinc, gallium, germanium, strontium, yttrium, zirconium, niobium, molybdenum, technetium, ruthenium, rhodium, palladium, silver, gold, cadmium, indium and tin, and alloys and compounds of magnesium, aluminum, silicon, phosphorus, calcium, scandium, titanium, vanadium, chromium, manganese, iron, cobalt, nickel, copper, zinc, gallium, arsenic, strontium, yttrium, zirconium, niobium, molybdenum, technetium, ruthenium, rhodium, palladium, silver, cadmium, indium, tin, antimony or tellurium.

Among these electrically conducting particles, those which can be stably available in industry at a relatively low cost include magnesium, aluminum, silicon, chromium, iron, nickel, zinc, tin, copper, zinc-aluminum alloy, zinc-aluminum-magnesium alloy, zinc-aluminum-magnesium-silicon alloy, zinc-iron alloy, zinc-chromium alloy, zinc-nickel alloy, iron-nickel alloy, iron-chromium alloy, stainless steel, iron-based compounds such as ferrosilicon, ferrophosphorus and ferromanganese, oxide-based particles such as NiO and ZnO, and carbon-based particles such as carbon black, graphite and carbon nanotube. The form of the particle is not particularly limited and examples thereof include lump, flake, spherical, amorphous, fiber, whisker and chain.

In order to realize higher corrosion resistance of the coated steel sheet, silicon is preferably used as the essential component in the electrically conducting particle. Ferrosilicon is electrically conducting and itself has an effect of enhancing the corrosion resistance. The mechanism of enhancing the corrosion resistance is not fully elucidated, but it is presumed to be that, when an alkali environment is created below the coating film due to corrosion, ferrosilicon dissolves and forms a strong silica film, thereby preventing corrosion. Therefore, even if another rust-preventive pigment for enhancing the corrosion resistance is not incorporated, sufficiently high corrosion resistance is exhibited and the cause of inhibiting the electric conductivity can be decreased. The silicon content in the particle is preferably 20 mass % or more, more preferably 50 mass % or more.

When the particle size distribution and the content are in respective ranges specified in the present invention or when the particle size and the film thickness are in respective ranges specified in the present invention, very good formability is attained. The ferrosilicon includes those differing in the silicon content, but in the present invention, ferrosilicon having a silicon content of 70 mass % or more is particularly preferred. More specifically, when JIS No. 2 ferrosilicon having an silicon content of 75 to 80 mass % or the like is used as the electrically conducting particle, the electric conductivity can be ensured and at the same time, the corrosion resistance is remarkably enhanced.

Of course, for enhancing the weldability or electric conductivity, a plurality of electrically conducting particles may be used. When the electrically conducting particles newly added has a particle size distribution in the above-described range specified in the present invention, the electrically conducting particles have no particular problem and can be used by appropriately mixing it such that the total content of electrically conducting particles in the coat layer is from 15 to 60 vol %. However, when the electrically conducting particles newly added have a particle size distribution out of the above-described range, the content thereof is preferably 5 vol % or less in the coat layer. If its content exceeds 5 vol %, the particle size distribution is increased in the non-uniformity and reduction of the formability is readily incurred.

In the present invention, the electrically conducting particle contained in the coat layer is in that state that the entire or a part thereof is buried. The coat layer contains, in addition to the electrically conducting particle, a binder component for holding the coat layer and for the binder component, conventionally known techniques can be used. For example, in the case where the binder component is an organic resin, examples of the resin include urethane resin, epoxy resin, acryl resin, polyester resin, fluororesin, silicon resin, polyolefin resin, butyral resin, ether resin, sulfone resin, polyamide resin, polyimide resin, amino resin, phenol resin, vinyl chloride resin, polyvinyl alcohol resin, isocyanate resin, and a copolymer resin, a mixture and a composite material thereof. An inorganic film or organic-inorganic composite film formed by a sol-gel method or the like may also be used. The resin may be selected from known techniques such as a resin which is cured and dried at an ordinary temperature, a resin which is cured and dried under heat, and a resin which is cured and dried with energy such as ultraviolet light or electron beam. Also, the coated metal sheet may be produced by laminating a film mainly comprising such a resin.

In addition to this resin, the coat layer may contain additives such as wax for imparting lubricity, defoaming agent, leveling agent and dispersant.

Among those resins, particularly when a urethane bond-containing resin is used in the coat layer, the corrosion resistance, formability and electric conductivity in particular can be attained at the same time in a high level. The reason therefor is considered, for example, because the urethane bond-containing resin has excellent flexibility and when a pressure is applied by an electrode for welding, is deformed to ensure particularly the contact of electrically conducting pigments with each other, the coating film is likely prevented from cleavage or cracking at the forming by virtue of the flexibility and since this is a chemically strong bond, the coating film is highly resistant against degradation.

In regard to the corrosion resistance of the formed part, the film is required to have high formability because the film is formed together with the steel sheet, and to satisfy this requirement, a urethane bond-containing resin film using a combination of a polyester polyol having at least three functional groups with a blocked organic polyisocyanate or a blocked product of an organic polyisocyanate and an active hydrogen compound is preferably formed, whereby an excellent film having good followability to the bend or draw deformation in the press forming, high hardness and high resistance against chemicals can be obtained. Also, when the urethane bond-containing resin is compounded with an epoxy resin having at least one secondary hydroxyl group or with an adduct of a lactone compound or alkylene oxide to an epoxy resin, more excellent properties can be obtained.

The polyester polyol (1) having at least three functional groups used in the resin for use in the present invention can be obtained by esterifying a dicarboxylic acid, a glycol and a polyol having at least three OH groups.

Examples of the dicarboxylic acid for use in the production of the polyester polyol include aliphatic dicarboxylic acids such as succinic acid, succinic anhydride, adipic acid, azelaic acid, sebacic acid, dodecane diacid, maleic acid, maleic anhydride, fumaric acid, itaconic acid and dimeric acid, and aromatic and alicyclic dicarboxylic acids such as phthalic acid, phthalic anhydride, isophthalic acid, dimethyl isophthalate, terephthalic acid, dimethyl terephthalate, 2,6-naphthalenedicarboxylic acid, hexahydrophthalic anhydride, tetrahydrophthalic anhydride, cyclohexanedicarboxylic acid, dimethyl cyclohexanedicarboxylate, methyl hexahydrophthalic anhydride, himic anhydride and methyl himic anhydride.

Examples of the glycol include aliphatic glycols such as ethylene glycol, diethylene glycol, propylene glycol, 1,3-butylene glycol, 1,4-butylene glycol, dipropylene glycol, 1,5-pentanediol, 1,6-hexanediol, neopentyl glycol, neopentyl glycol ester of hydroxy divaric acid, triethylene glycol, 1,9-nonanediol, 3-methyl-1,5-pentanediol, 2,2,4-trimethyl-1,3-pentanediol, 2-ethyl-1,3-hexanediol, 2,4-diethyl-1,5-pentanediol, polycaprolactone diol, polypropyrene glycol polytetramethylene ether glycol, polycarbonate diol, 2-n-butyl-2-ethyl-1,3-propanediol and 2,2-diethyl-1,3-propanediol, and aliphatic or aromatic glycols such as cyclohexanedimethanol, cyclohexanediol, 2-methyl-1,1-cyclohexanedimethanol, xylylene glycol, bis-hydroxyethyl terephthalate, 1,4-bis(2-hydroxyethoxy)benzene, hydrogenated bisphenol A, ethylene oxide adduct of bisphenol A, and propylene oxide adduct of bisphenol A.

Examples of the polyol having at least three OH groups include glycerin, trimethylolpropane, trimethylolethane, 1,2,6-hexanetriol, pentaerythritol, diglycerin, and an ethylene oxide adduct, a propione oxide adduct and ε-caprolactone adduct using such a polyol as an initiator.

The esterification reaction is performed by charging the polyol component in excess of the acid component and distilling out the condensate in a usual manner, but since the product is polyfunctional, if the reaction excessively proceeds, gelling may occur. Therefore, the reaction is preferably stopped at an acid value of usually from 0.1 to 50, more preferably from 1 to 20. As for the specific production method, for example, a dicarboxylic acid is charged in excess of the molar number of glycol, the condensed water is removed while blowing a nitrogen gas at a temperature of 180 to 260° C., the reaction is allowed to proceed until a predetermined acid value to obtain a polyesterified product having a COOH group at both ends, a polyol having at least three OH groups is charged to convert the ends of this polyesterified product into an OH group, the condensed water is removed by distillation in the same manner, and the reaction is stopped at an acid value of 50 or less, preferably from 1 to 20. In the case of using a dimethyl ester of dicarboxylic acid, this ester is charged in a molar number larger than that of glycol and a transesterification reaction is performed under the same conditions as above, whereby a polyester polyol is obtained. In the case of using an acid anhydride in combination, a dicarboxylic acid is first charged in a molar number smaller than that of glycol, the condensate is distilled out under the same conditions as above to obtain a polyesterified product having an OH group at both ends, a dicarboxylic anhydride is then added, a polyesterified product having a COOH group at both ends is obtained by the ring-opening reaction, a polyol having at least three OH groups is then charged, and a reaction is performed in the same manner as above, whereby a polyester polyol is obtained. The polyester polyol for use in the present invention preferably has a functional group number of 3 to 7, more preferably from 4 to 6, a number average molecular weight of 600 to 3,500, and a hydroxyl group value of 80 to 460. If the functional group number is less than 3, the hardness of the cured film becomes low and the resistance to chemicals is worsened, whereas if it exceeds 7, a film having bad bending resistance may result. If the number average molecular weigh is less than 600, the smoothness of the cured film becomes bad, whereas if it exceeds 3,500, a problem may arise in the coating operation or the fouling resistance may decrease. Also, if the hydroxyl group value exceeds 460, the film may be worsened in the bending resistance The blocked product as the component (b) used in the resin for use in the present invention is a compound having at least two NCO groups and examples thereof include aliphatic diisocyanates such as trimethylene diisocyanate, tetramethylene diisocyanate, hexamethylene diisocyanate, pentamethylene diisocyanate, 1,2-propylene diisocyanate, 2,3-butylene diisocyanate, 1,3-butylene diisocyanate, 2,4,4- or 2,2,4-trimethylhexamethylene diisocyanate, dodecamethylene diisocyanate and 2,6-diisocyanate methylcaproate, cycloalkylene-based diisocyanates such as 1,3-cyclopentane diisocyanate, 1,4-cyclohexane diisocyanate, 1,3-cyclohexane diisocyanate, 3-isocyanatemethyl-3,5,5-trimethylhexyl isocyanate, 4,4'-methylenebis(cyclohexylisocyanate), methyl-2,4-cyclohexane diisocyanate, methyl-2,6-cyclohexane diisocyanate, 1,2-bis(isocyanatomethyl)cyclohexane, 1,4-bis(isocyanatomethyl)cyclohexane, 1,3-bis(isocyanatomethyl)cyclohexane and trans-cyclohexane-1,4-diisocyanate, aromatic diisocyanates such as m-xylene diisocyanate, m-phenylene diisocyanate, p-phenylene diisocyanate, 4,4'-diphenyl diisocyanate, 1,5-naphthalene diisocyanate, 4,4'-diphenylmethane diisocyanate, 2,4- or 2,6-tolylene diisocyanate, 4,4'-toluidine diisocyanate, dianisidine diisocyanate and 4,4'-diphenylether diisocyanate, aromatic aliphatic diisocyanates such as ω,ω'-diisocyanato-1,3-dimethylbenzene, ω,ω'-diisocyanato-1,4-dimethylbenzene, ω,ω'-diisocyanato-1,4-diethylbenzene and α,α,α',α'-tetramethylmeta-xylylene diisocyanate, triisocyanates such as triphenylmethane-4,4,4"-triisocyanate, 1,3,5-triisocyanatobenzene, 2,4,6-triisocyanatotoluene and ω-isocyantoethyl-2,6-diisocyanatocaproate, blocked tetraisocyanates such as 4,4'-diphenylmethylmethane-2,2',5,5'-tetraisocyanate, blocked products of a derivative from an isocyanate compound, such as dimer, trimer, buiret, allophanate, carbodiimide, polymethylenepolyphenyl polyisocyanate (crude MDI, c-MDI or polymeric MDI) and crude TDI, and blocked products of a prepolymer having an NCO group at the end obtained by the reaction of such a compound with an active hydrogen compound.

In the case where the organic film is required to have weather resistance, among those compounds having an NCO group, preferred are isocyanates compounds such as hexamethylene diisocyanate, 3-isocyanatomethyl-3,5,5-trimethylcyclohexyl isocyanate, 1,4-bis(isocyanatomethyl)cyclohexane, 1,3-bis(isocyanatomethyl)cyclohexane, 4,4'-methylenebis(cyclohexylisocyanate), α,α,α',α'-tetramethylmeta-xylylene diisocyanate.

The prepolymer having an NCO group at the end obtained by the reaction of such an isocyanate compound with an active hydrogen compound can be obtained by reacting an isocyanate monomer described above with an active hydrogen compound in the state of excess isocyanate group. Examples of the active hydrogen compound used for the production of this prepolymer include low molecular weight polyols such as dihydric alcohol (e.g., ethylene glycol, propylene glycol, 1,2-butylene glycol, 1,3-butylene glycol, 1,6-hexanediol, diethylene glycol, dipropylene glycol, neopentyl glycol, neopentyl glycol ester of hydroxy divaric acid, triethylene glycol, hydrogenated bisphenol A, xylylene glycol, 1,4-butylene glycol), trihydric alcohol (e.g., glycerin, trimethylolethane, trimethylolpropane, 1,2,6-hexanetriol) and tetrahydric alcohol (e.g., pentaerythritol), and high molecular weight polyols such as polyether polyol (e.g., propylene oxide or ethylene oxide adduct of a polyol described above), polyester polyol obtained by reacting a low molecular weight polyol described above with a dicarboxylic acid, and polyester polyol aliphatic-modified at its production. These polyols may be used individually or in combination.

The prepolymer can be obtained by performing a reaction usually at 40 to 140° C., preferably from 70 to 100° C. with an NCO group/OH group equivalent ratio of generally about 2.0 to 15, preferably about 4.0 to 8.0, and then, if desired, removing the unreacted isocyanate monomer by a commonly employed thin-film distillation method or extraction method. In this reaction, an organic metal catalyst such as tin-based, lead-based, zinc-based or iron-based catalyst may be used.

The blocked product of the above-described isocyanate monomer or a prepolymer thereof can be obtained by reacting the isocyanate monomer or a prepolymer thereof with a blocking agent by a known method. The blocking agent for use in this reaction may be any type blocking agent such as phenol-based, lactam-based, active methylene-based, active methylene-based, alcohol-based, mercaptan-based, acid amide-based, imide-based, amine-based, imidazole-based, urea-based, carbamate-based, imine-based, oxime-based or sulfite-based blocking agent. In particular, a blocking agent such as phenol-based, oxime-based, lactam-based or imine-based blocking agent is advantageously used. Specific examples of the blocking agent include the followings.

Phenol-Based Blocking Agent:

Phenol, cresol, xylenol, nitrophenol, chlorophenol, ethylphenol, p-hydroxydiphenyl, tert-butyl ether, o-isopropylphenol, o-sec-buylphenol, p-nonylphenol, p-tert-octylphenol, hydroxybenzoic acid, hydroxybenzoic acid ester, etc.

Lactam-Based Blocking Agent:

ε-Caprolactam, δ-valerolactam, γ-butyrolactam, β-propiolactam, etc.

Active Methylene-Based Blocking Agent:

Diethyl malonate, dimethyl malonate, ethyl acetoacetate, methyl acetoacetate, acetylacetone, etc.

Alcohol-Based Blocking Agent:

Methanol, ethanol, n-propyl alcohol, isopropyl alcohol, n-butyl alcohol, isobutyl alcohol, tert-butyl alcohol, n-amyl alcohol, tert-amyl alcohol, lauryl alcohol, ethylene glycol monomethyl ether, ethylene glycol monoethyl ether, ethylene glycol monobutyl ether, diethylene glycol monomethyl ether, distyrene glycol monoethyl ether, propylene glycol monomethyl ether, benzyl alcohol, methoxymethanol, glycolic acid, glycolic acid esters such as methyl glycolate, ethyl glycolate and butyl glycolate, lactic acid, lactic acid esters such as methyl lactate, ethyl lactate and butyl lactate, methylolurea, methylolmelamine, diacetone alcohol, ethylene chlorohydrin, ethylene bromohydrin, 1,3-dichloro-2-propanol, ω-hydroperfluoroalcohol, acetocyanhydrine, etc.

Mercaptan-Based Blocking Agent:
  Butylmercaptan, hexylmercaptan, tert-butylmercaptan, tert-dodecylmercaptan, 2-mercaptobenzothiazol, thiophenol, methylthiophenol, ethylthiophenol, etc.

Acid Amide-Based Blocking Agent:
  Acetanilide, acetanisidide, acetotoluide, acrylamide, methacrylamide, acetic amide, stearic amide, benzamide, etc.

Imide-Based Blocking Agent:
  Succinic imide, phthalic imide, maleic imide, etc.

Amine-Based Blocking Agent:
  Diphenylamine, phenylnaphthylamine, xylidine, n-phenylxylidine, carbazole, aniline, naphthylamine, butylamine, dibutylamine, butylphenylamine, etc.

Imidazole-Based Blocking Agent:
  Imidazole, 2-imidazole, etc.

Urea-Based Blocking Agent:
  Urea, thiourea, ethyleneurea, ethylenethiourea, 1,3-diphenylurea, etc.

Carbamate-Based Blocking Agent:
  Phenyl n-phenylcarbamate, 2-oxazolidone, etc.

Imine-Based Blocking Agent:
  Ethyleneimine, propyleneimine, etc.

Oxime-Based Blocking Agent:
  Formamidoxime, acetoaldoxime, acetoxime, methyl ethyl ketoxime, diacetyl monoxime, benzophenone oxime, cyclohexane oxime, etc.

Sulfite-Based Blocking Agent:
  Sodium bisulfite, potassium bisulfite, etc.

Specific methods for reacting the isocyanate monomer or a prepolymer thereof with a blocking agent include a method of reacting the isocyanate monomer or a prepolymer thereof with a blocking agent by setting the equivalent ratio of NCO group/active hydrogen group in blocking agent to about 0.9 to 1.0, preferably about 0.95 to 1.00, a method of reacting the isocyanate monomer with a blocking agent by setting the equivalent ratio of NCO group/active hydrogen group in blocking agent to about 1.1 to 3.0, preferably about 1.2 to 2.0, and then reacting it with the above-described low molecular weight polyol, high molecular weight polyol, water or lower amine for use in the production of the prepolymer, and a method of reacting the isocyanate monomer with the low molecular weight polyol, high molecular weight polyol, water or lower amine at an NCO group/active hydrogen group equivalent ratio of about 1.6 to 10.0, preferably from about 2.0 to 7.0, and then reacting it with a blocking agent. Each reaction above is performed by a known method in a solvent not having an active hydrogen group (examples of this solvent include aromatic solvents such as benzene, toluene and xylene, petroleum-based solvents such as Solvesso-100 and Solvesso-200, ester-based solvents such as ethyl acetate and butyl acetate, ketone-based solvents such as acetone, methyl ethyl ketone, methyl isobutyl ketone and cyclohexanone, and ether-based solvents such as tetrahydrofuran) or in the absence of such a solvent. At the reaction, a known catalyst such as tertiary amine and organic metal may be used.

In the present invention, when (c) an epoxy resin having at least one secondary hydroxyl group or an adduct thereof is further added to the polyol component, more excellent properties can be obtained. Examples of the lactone compound or alkylene oxide adduct of an epoxy resin having at least one secondary hydroxyl group include those obtained by adding a lactone compound or an alkylene oxide to an epoxy resin represented by the following formula according to a known method.

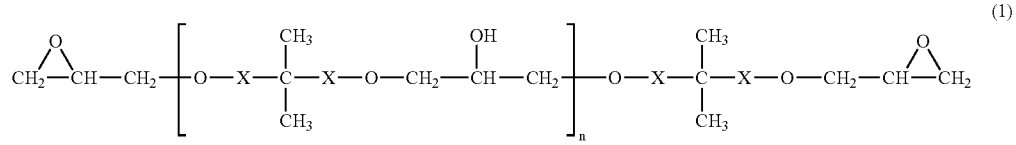

(1)

(wherein X represents a phenylene or cyclohexylene group which may be substituted by a halogen, and n represents a number of 0.5 to 12.0).

The amount of the lactone compound or alkylene oxide added is approximately from about 5 to 40 parts by weight per about 95 to 60 parts by weight of the epoxy resin. More preferably, the amount of the lactone compound or alkylene oxide added is from about 10 to 30 parts by weight per about 90 to 70 parts by weight of the epoxy resin.

Among the epoxy resins represented by the formula above, those where X is a p-phenylene group and n is a number of 2 to 9 are preferred. Examples of the halogen include bromine and chlorine. The number of substituents is usually on the order of 1 to 3, and the position therefor may be any position of the phenylene or cyclohexylene group.

Examples of the lactone compound include β-propionlactone, butyrolactone, γ-valerolactone, γ-caprolactone, δ-valerolactone, δ-caprolactone and ε-caprolactone, with ε-caprolactone being preferred. Examples of the alkylene oxide include ethylene oxide, propylene oxide, styrene oxide, glycidyl methacrylate and epichlorohydrin, with ethylene oxide being preferred.

In the polyol component, the blending ratio of the epoxy resin having at least one secondary hydroxyl group or the adduct obtained by adding a lactone compound or an alkylene oxide to the epoxy resin is from about 10 to 70 mass %, preferably from about 10 to 60 mass %. If the blending ratio is less than 10 mass %, the resistance against chemicals may be worsened, whereas if it exceeds 70 mass %, the hardness is seriously decreased and damages are readily generated at the press forming.

The raw material film-forming resin for use in the present invention contains the polyols (a) and (c) and the blocked product (b) and as for the blending ratio between the polyols and the blocked product, the OH group (a hydroxide group)/regenerated NCO group equivalent ratio is preferably from about 1/2 to 2/1, more preferably 1/1.2 to 1/0.8.

In the case where the coat layer mainly comprises a thermoplastic resin, a coated metal sheet excellent particularly in the weldability is obtained. This is presumed to result because the thermoplasticity is exerted upon application of a pressure by the electrode for welding and the coat layer is compressed, as a result, a firmer contact between electrically conducting particles is ensured and the welding current stably flows. Furthermore, by virtue of flexibility of the thermoplastic resin, cracking or separation of the coat layer can be reduced and the corrosion resistance is enhanced. Examples of the thermoplastic resin include polyethylene terephthalate resin (PET), high-molecular polyester resin, low-density polyethylene resin, high-density polyethylene resin, chained low-density polyethylene resin, polypropylene resin, polystyrene resin, acrylonitrile butadiene styrene resin (ABS resin), polyacetal resin (POM), polycarbonate resin, polyphenylene sulfide resin, polyamide resin and fluororesin.

In order to enhance the corrosion resistance, one or more rust-preventive pigment and/or silica may be added. The content thereof in the coat layer is preferably 20 vol % or less, more preferably 15 vol % or less. If the content exceeds 20 vol %, the electric conductivity and formability, in particular, are liable to decrease.

Examples of the rust-preventive pigment include hexavalent chromates such as strontium chromate and calcium chromate. In the case of intending to avoid use of a hexavalent chromium compound as the rust-preventive pigment, for example, a compound capable of releasing one or more ion out of silicate ion, phosphate ion and vanadate ion, such as calcium silicate, aluminum silicate, magnesium phosphate, aluminum phosphate, phosphorus vanadate and aluminum vanadate, may be used. When fine particulate silica is further added thereto, the scratch resistance, film adhesion and corrosion resistance are enhanced. Examples of the fine particulate silica include fumed silica, colloidal silica and aggregated silica. A calcium-deposited silica may also be used.

The rust-preventive pigment which can be preferably used is, for example, a known rust-preventive pigment such as hexavalent chromate (e.g., strontium chromate, calcium chromate).

In the case of intending to avoid use of a hexavalent chromium compound as the rust-preventive pigment, for example, a compound capable of releasing one or more ion out of silicate ion, phosphate ion and vanadate ion may be used.

For example, a rust-preventive pigment capable of releasing vanadate ion and phosphate ion is described below. When the rust-preventive pigment releases these two ions, the oxidizer function unsatisfied only by phosphate ion can be supplemented by the vanadate ion. In other words, this rust-preventive pigment serves, in an environment where water and oxygen are present, as a phosphate ion source of releasing phosphate ion and as a vanadate ion source of releasing vanadate ion.

In order to bring out the rust-preventive power of the organic film, this can be attained when phosphate ion and vanadate ion are present together in the organic film. The phosphate ion and vanadate ion may be as-is present or a substance capable of releasing phosphate ion and vanadate ion in an environment allowing for the presence of water and oxygen may be contained. The phosphate ion is scarcely present by itself in an aqueous solution and is present in various forms such as condensate, but also in such a case, the concept of "phosphate ion" as used in the present invention should be understood to include the condensate vanadate ion. The phosphate ion source and vanadate ion source are mainly provided as a rust-preventive pigment and this pigment can be obtained by baking and grinding a mixture containing a phosphorus compound, a vanadium compound and if desired, one or both of a network-modifying ion source and a vitrified substance.

Examples of the phosphide used in the rust-preventive pigment include orthophosphoric acid, condensed phosphorus, orthophosphate or condensed phosphate of various metals, phosphorus pentoxide, phosphate minerals, commercially available composite phosphate pigments, and a mixture thereof. The orthophosphate as used herein includes a monohydrogen salt ($HPO_4^{2-}$) and a dihydrogen salt ($H_2PO_4^-$) thereof. Also, the condensed phosphate includes hydrogen salts thereof. Furthermore, the condensed phosphate includes metaphosphates, normal polyphosphates and normal polymetaphosphates. Specific examples of the phosphorus compound include phosphate minerals such as monetite, triphylite, whitlockite, xenotime, stercorite, struvite and vivianite, commercially available composite phosphate pigments such as silica polyphosphate, composite phosphoric acids such as pyrophosphoric acid and metaphosphoric acid, composite phosphates such as metaphosphate, tetrametaphosphate, hexametaphosphate, pyrophosphate, acidic pyrophosphate and tripolyphosphate, and a mixture thereof. The metal species for forming the phosphate is not particularly limited and examples thereof include alkali metals, alkaline earth metals, other metal species of typical element, and transition metals. Preferred examples of the metal species include magnesium, calcium, strontium, barium, titanium, zirconium, manganese, iron, cobalt, nickel, zinc, aluminum, lead and tin.

Other than these, oxo-cations such as vanadyl, titanyl and zirconyl can also be used. Among these, more preferred are calcium and magnesium. The alkali metal is preferably not used in a large amount. When a phosphate of an alkali metal is used, the baked product tends to be excessively dissolved in water. However, in the case of using a phosphate of an alkali metal, the solubility in water may be controlled, if possible, at the production of the rust inhibitor or at other stages. This control may be performed by various methods such as use or coating of a matrix material (particularly, vitrified substance) for preventing dissolution in water.

The vanadium compound used in the rust-preventive pigment is a compound having a vanadium valence of 0, 2, 3, 4 or 5 or having two or more of these vanadium valences, and examples thereof include their oxides, hydroxides, oxyacid salts with various metals, vanadyl compounds, halides, sulfates and metal powder. This compound dissolves under heating or in the presence of water and acts with oxygen into a compound of higher valence. For example, the metal powder or divalent compound is finally converted into a trivalent, tetravalent or pentavalent compound. A rust-preventive pigment containing a pentavalent vanadium compound as one component is preferred. The zerovalent compound, such as vanadium metal powder, may be used because of the above-described reason, but this compound has a problem, for example, the oxidation reaction is insufficient, and its use is not preferred in practice. The pentavalent vanadium compound has vanadate ion and readily reacts with phosphate ion under heating to form a heteropolymer. Specific examples of the vanadium compound include vanadium(II) compounds such as vanadium(II) oxide and vanadium(II) hydroxide, vanadium(III) compounds such as vanadium oxide, vanadium(IV) compounds such as vanadium(IV) oxide and vanadyl halide, vanadium(V) compounds such as vanadium(V) oxide, vanadates such as orthovanadate, metavanadate or pyrovanadate with various metals and vanadyl halide, and a mixture thereof. Examples of the metal species for the vanadate are the same as those described for the phosphate. The vanadium compound may also be prepared by baking a vanadium oxide with an oxide, hydroxide, carbonate or the like of various metals at 600° C. or more. Also in this case, the alkali metal is not so preferred in view of solubility, but when the solubility is controlled by an appropriate treatment described regarding the phosphate, the alkali metal may be used. The same applies to the halide and sulfate.

The ratio of phosphate ion source to vanadate ion source blended is preferably from 1:3 to 100:1 in terms of the molar ratio of $P_2O_5$ to $V_2O_5$.

The total amount of the electrically conducting particle and the rust-preventive pigment blended in the organic coat layer of the present invention is from 6 to 65 vol %, preferably from 20 to 60 vol %, per 100 parts by weight of the entire solid content in the coating material for the organic film layer. If this total amount is less than 6 vol %, the above-described effects by virtue of the addition are not satisfactorily brought out, whereas if it exceeds 65 vol %, the cohesion of the film after curing decreases and a sufficiently high film strength cannot be obtained. Out of these components, the amount of the rust-preventive pigment blended is from 1 to 40 vol %, preferably from 3 to 30 vol %. If the amount blended is too small, a sufficiently high rust-preventive power cannot be obtained, whereas if it is excessively large, the proportion of the film resin decreases for that portion to cause reduction in the cohesion of film or the proportion of the electrically conducting particle decreases to fail in ensuring satisfactory weldability on the occasion of required electric welding.

The metal material may be a known metal material and examples thereof include steel sheet, copper sheet, titanium sheet and aluminum sheet. Examples of the steel sheet include various plated steel sheets, stainless steel sheet, cold-rolled steel sheet and hot-rolled steel sheet. Examples of the plated steel sheet include zinc-plated steel sheet, zinc alloy-plated steel sheet, alloyed zinc-plated steel sheet, tin-plated steel sheet, tin alloy-plated steel sheet, chromium-plated steel sheet, chromium alloy-plated steel sheet, aluminum-plated steel sheet, aluminum alloy-plated steel sheet, nickel-plated steel sheet, nickel alloy-plated steel sheet, copper-plated steel sheet, copper alloy-plated steel sheet, iron-plated steel sheet, iron alloy-plated steel sheet, iron-phosphor composite-plated steel sheet, manganese-plated steel sheet, lead-plated steel sheet, and composite-plated steel sheet with the plating being constituted by a metal or alloy containing fine particles such as silica.

In particular, when a zinc or zinc-based alloy-plated steel sheet (for example, electrogalvanized steel sheet, hot-dip galvanized steel sheet, alloyed hot-dip galvanized steel sheet, zinc-nickel alloy-plated steel sheet, zinc-aluminum alloy-plated steel sheet or zinc-aluminum-magnesium alloy-plated steel sheet) is used, the product metal material can be suitably used as a primer steel sheet for automobiles, which is excellent in the profitability and corrosion resistance, or as a coated steel sheet for home appliances and OA devices, where earth property is required. Also, when an aluminum or aluminum-based alloy-plated steel sheet (for example, aluminum-silicon plated steel sheet or aluminum-zinc-silicon alloy-plated steel sheet) is used, the product metal material can be suitably used as a highly anticorrosive coated steel sheet for building materials, and when a tin-based alloy-plated steel sheet (for example, tin-zinc alloy-plated steel sheet) or a zinc alloy-plated steel sheet (for example, zinc-nickel alloy-plated steel sheet) is used, the product metal material can be suitably used as a coated steel sheet for fuel tanks. In addition, when an aluminum sheet having poor weldability is used as the base sheet, the product metal material can be suitably used as a primer steel sheet for automobiles, which is excellent in weldability.

With respect to the underlying steel sheet for use in the present invention, various steel sheets can be used, such as aluminum-killed steel sheet, very low carbon steel sheet having added thereto titanium, niobium or the like, and high-strength steel obtained by adding a strengthening element such as phosphorus, silicon or manganese to such a steel sheet. This steel sheet may be plated with various metals or alloys described above. The plating coverage is not particularly limited but is preferably 10 $g/m^2$ or more in view of corrosion resistance and 100 $g/m^2$ or less in view of weldability.

Furthermore, in the present invention, the surface roughness of the organic coat layer is controlled to from 0.3 to 2.5 μm as Ra, preferably 20 μm or less as Rmax, and the Pc of the surface texture is controlled to from 10 to 200 peaks per 10-mm length with a count level of 0.3 μm, whereby the formability and continuous workability of welding can enhanced. These conditions for the surface roughness and surface texture and a production method using the conditions have been found as a result of studies on good formability and corrosion resistance obtainable based on the embodiment of the organic resin and good weldability and corrosion resistance obtainable based on the embodiment of the electrically conducting particle so as to effectively bring out these properties at the same time.

The surface roughness and texture can be controlled by adjusting the coating material and, for example, adjusting the viscosity of the coating material, adding a leveling agent, adding a surfactant, adding a solvent having a different specific gravity, or adding a filler having a controlled particle size. The surface can also be adjusted by a mechanical method such as temper-rolling with a skin pass roll or surface control by shot blasting. If the center line average roughness Ra is less than 0.3 μm, the contact area with the metal mold at the forming increases to elevate the coefficient of friction and this causes reduction in the formability, whereas if it exceeds 2.5 μm, the continuous workability at the welding decreases. Accordingly, Ra is from 0.3 to 2.5 μm, preferably from 0.6 to 1.5 μm. Also, if the maximum height Ra exceeds 20 μm, an irregular portion is locally generated in the regular roughness specified by Ra and uneven electrification such as local electrification is readily caused in this portion and, as a result, continuous formability at the welding decreases. Accordingly, Rmax is 20 μm or less. The peak count Pc is from 10 to 200 peaks per 10-mm length with a count level of 0.3 μm. If the Pc is less than 10 peaks, the contact area with the metal mold at the forming increases to elevated the coefficient of friction and this causes reduction in the formability, whereas if Pc exceeds 200 peaks, the texture largely fluctuates at every place and continuous workability at welding decreases. Particularly, when these three parameters are simultaneously satisfied, the weldability, formability and corrosion resistance are more enhanced. The surface roughness and texture can be measured by a normal roughness meter. The roughness per 10-mm length at an arbitrary portion is measured for L direction and C direction of the steel sheet and the aptitude is judged by whether each value falls within the range specified in the present invention. Alternatively, the aptitude may be judged by measuring the surface roughness and texture by a three-dimensional roughness meter and converting the obtained values into two-dimensional expression.

Furthermore, particularly in the case of use for a fuel tank, the metal material is preferably a tin-based alloy-plated steel sheet, though the metal material is not limited thereto. tin has very good corrosion resistance against an organic acid generated due to oxidative degradation of gasoline and also, the tin plating exhibits excellent spreadability even in the severe press forming and therefore, properly follows the deformation of steel sheet. By combining such properties with the protective activity of the electrically conducting pigment-containing organic film coat, very good corrosion resistance and formability are exerted and at the same time, good weldability can be ensured. When a system where an element having a sacrificing anticorrosive activity is alloyed with the tin plating is used, more excellent corrosion resistance can be obtained. The tin plating or tin-based alloy plating is advantageous also in view of cost, because the inner surface can have good corrosion resistance against degraded gasoline and the coating can be omitted.

The tin plating or tin-based alloy plating is a tin plating or an alloy plating comprising tin and one or more metal of zinc, aluminum, magnesium and silicon and having a composition that tin accounts for 50 mass % or more of the entire. Particularly, the zinc-alloyed tin plating can additionally have the sacrificing anticorrosive activity of zinc and is preferred as compared with the tin plating. At this time, the amount of zinc added is preferably 1 mass % or more for exerting the sacrificing anticorrosive activity. Also, when aluminum and magnesium are added to tin or tin-zinc plating, this is preferred in view of corrosion resistance. Magnesium exerts by itself an effect of enhancing the corrosion resistance but, for example, a compound such as $Mg_2tin$ or $Mg_2Si$ is formed in the process of producing a molten plating and preferentially dissolves in a corrosive environment and this causes a magnesium-based film to cover the plating layer and the base iron, whereby an anticorrosive effect is brought out. The amount of magnesium added for providing such an effect is preferably 0.5 mass % or more. Magnesium is an element having a very strong affinity for oxygen and, for example, in the case of producing the plated steel sheet by hot-dip galvanization, aluminum is preferably added at the same time for preventing the oxidation. The operability is improved by adding aluminum in an amount of about 1/10 the amount of magnesium. The aluminum is also effective in inhibiting the oxidation of tin or zinc itself and even when magnesium is not added, the plating appearance can be improved by adding aluminum. If desired, elements such as calcium, lithium, misch metal and antimony may be further added for the purpose of enhancing the corrosion resistance or preventing the oxidation.

In the case of use as a tank material, high resistance weldability (e.g., spot welding, seam welding) is required. As the copper of the electrode readily forms a compound with tin, the plating coverage greatly affects the weldability. The plating coverage of course has a large effect also on the corrosion resistance. A larger plating coverage is advantageous in view of corrosion resistance but is disadvantageous in view of weldability and therefore, the plating coverage is preferably from 20 to 50 $g/m^2$ per one surface.

Also, high formability is required of the fuel tank and, in this context, an IF steel (interstitial free steel) having excellent formability is preferably applied. In order to ensure welding airtightness, secondary formability and the like after welding, a steel sheet having added thereto from 0.0002 to 0.003 mass % of boron is more preferred.

As for the plating method, a conventional production method such as electroplating, hot-dip plating and vapor phase plating can be used. The plating can be of course directly applied to the steel sheet or a preplating treatment may be applied before the plating. The preplating is applied so as to enhance the plating property and may use nickel, cobalt, iron, chromium, tin, zinc, copper or a metal containing such a metal. The thickness is not particularly limited but is usually about 0.1 μm.

In use for a fuel tank, the film thickness of the organic coat layer is preferably from 1.0 to 20 μm. If the film thickness is less than 1.0 μm, even when combined with an undercoating film, the coat layer cannot satisfactorily contribute to the rust-preventive effect, whereas if it exceeds 20 μm, this is economically disadvantageous because the effect is saturated, and also an adverse effect is caused on the weldability In order to more stabilize the corrosion resistance, formability and weldability, the film thickness is more preferably from 5 to 15 μm. The total amount of the electrically conducting pigment and the rust-preventive pigment blended in the organic film layer is from 5 to 70 vol %, preferably from 20 to 60 vol %, per 100 parts by weight of the entire solid content in the coating material for the organic film layer. If this total amount is less than 5 vol %, the above-described effects by virtue of the addition are not satisfactorily brought out, whereas if it exceeds 70 vol %, the cohesion of the film after curing decreases and a sufficiently high film strength cannot be obtained. Out of these pigments, the amount of the electrically conducting pigment blended is from 1 to 50 vol %, preferably from 3 to 40 vol %. If this amount blended is too small, a sufficiently high weldability cannot be obtained, whereas if it is excessively large, the followability of the film at the forming decreases. On the other hand, the amount of the rust-preventive pigment blended is from 1 to 40 vol %, preferably from 3 to 30 vol %. If this amount blended is too small, a sufficiently high rust-preventive power cannot be obtained, whereas if it is excessively large, the proportion of the film resin decreases at that portion to cause reduction in the cohesion of film.

FIG. 1 shows an example of a fuel tank, but the fuel tank of the present invention is of course not limited thereto. In FIG. 1, a metal sheet 1*a* having at least on the outer surface thereof a coat layer 1*b* containing an electrically conducting particle is formed, and the formed upper tank portion 1 and the lower tank portion 2 (2*a*, 2*b*) formed in the same manner are welded to each other at respective flange portions 1*c* and 2*c* to form a fuel tank. The inner side of the fuel tank may be further subjected to a surface treatment, if desired.

For the purpose of enhancing the adhesion between the coat layer and the metal sheet or enhancing the corrosion resistance or electric conductivity, an undercoating layer may be formed on the surfaces of these metal sheets. The undercoating layer may be formed by a known technique and examples thereof include a phosphate-based treatment, a trivalent chromic acid treatment, a chromate treatment, a zirconium-based treatment, a titanium-based treatment, a manganese-based treatment, a nickel-based treatment, a cobalt-based treatment, a vanadium-based treatment and a treatment with a coupling agent (for example, a silicon-based or titanium-based coupling agent) or with an organic material. The undercoating layer need not be a single layer and may be formed by combining a plurality of treatments, for example, a zinc phosphate treatment layer may be formed and then subjected to a sealing treatment or a chromate treatment may be applied after pre-adjustment by an acidic nickel-containing solution.

The metal sheet surface can be treated by a known method before forming the undercoating layer or in the case of not forming an undercoating layer, before forming the coat layer. Examples of the treating method include degreasing with water, hot water or a degreasing solution, and mechanical grinding by etching with an acid or an alkali or by using a brush or the like.

The undercoating layer may be a film formed, for example, by a method of coating•drying an aqueous solution mainly comprising a known hexavalent chromic acid and containing, if desired, a fine particulate silica or a silane coupling agent, a method of forming an undercoating layer by contacting the plating surface with an aqueous solution mainly comprising a hexavalent chromic acid and containing, if desired, a fine particulate silica or a silane coupling agent and then washing and drying the film, a method of coating and drying an aqueous solution mainly comprising a trivalent chromic acid but not containing a hexavalent chromic acid, and containing, if desired, a fine particulate silica or a silane coupling agent, a method of depositing a film mainly comprising a trivalent chromium on the plating surface through electrolysis in an aqueous chromic acid solution and then washing and drying the film, or a method of depositing a phosphate of zinc and/or nickel and/or iron on the plating surface. One of these methods may be used or a plurality of the methods may be used in combination. Also, a film formed by coating and drying, on the plating surface, an aqueous solution mainly comprising an aqueous resin and containing at least one member selected from a fine particulate silica, a silane coupling agent, tannin and a tannic acid may be used. In the case of intending to avoid use of hexavalent chromium, a film formed from a trivalent chromium, a phosphate of various metals, or an aqueous resin may be used as the undercoating layer.

The aqueous resin for the undercoating layer includes not only a water-soluble resin but also a resin which is originally insoluble in water but can provide a state of being finely dispersed in water, such as emulsion or suspension. Examples of such an aqueous resin which can be used include a polyolefin-based resin, an acrylolefin-based resin, a polyurethane-based resin, a polycarbonate-based resin, an epoxy-based resin, a polyester-based resin, an alkyd-based resin, a phenol-based resin and other thermosetting resins. Among these resins, preferred are crosslinkable resins, and more preferred are an acrylolefin-based resin, a polyurethane-based resin and a mixed resin of these two resins. These aqueous resins may be used by mixing or polymerizing two or more thereof.

The silane coupling agent is firmly bonded to both the zinc or zinc-containing alloy plating and the film in the presence of an organic resin, whereby the adhesion of the film and in turn the corrosion resistance are remarkably enhanced. Examples of the silane coupling agent include γ-(2-aminoethyl)aminopropyltrimethoxysilane, γ-(2-aminoethyl)aminopropymethyldimethoxysilane, aminosilane, γ-methacryloxypropyltrimethoxysilane, N-β-(N-vinylbenzylaminoethyl)-γ-aminopropyltrimethoxysilane, γ-glycidoxypropyltrimethoxysilane, γ-mercaptopropyltrimethoxysilane, methyltrimethoxysilane, vinyltrimethoxysialne, octadecyldimethyl[3-(trimethoxysilyl)propyl]ammonium chloride, γ-chloropropylmethyldimethoxysilane, γ-mercaptopropylmethyldimethoxysilane, methyltrichlorosilane, dimethyldichlorosilane and trimethylchlorosilane.

In the case of using a silane coupling agent for the undercoating layer formed of an aqueous resin, the content thereof is preferably from 0.1 to 3,000 parts by weight per 100 parts by weight of the aqueous resin in terms of the solid content. If the content is less than 0.1 part by weight, a sufficiently high adhesive property cannot be obtained at the forming due to insufficient amount of the silane coupling agent and poor corrosion resistance results, whereas if it exceeds 3,000 parts by weight, the effect of enhancing the adhesive property is saturated and this is unprofitable.

The tannin or tannic acid in the undercoating layer formed of an aqueous resin has a role of adhering to the zinc or zinc-containing alloy plating layer by firmly reacting therewith, and also adhering to the aqueous resin. The aqueous resin adhered by tannin or tannic acid firmly adheres to the resin coated thereon, as a result, the plating layer seems to firmly adhere to the film even without use of a chromate treatment which has been conventionally used. Furthermore, in some portions, the tannin or tannic acid itself is considered to participate in the bonding between the plated steel sheet and the film without the intervention of the aqueous resin.

The tannin or tannic acid is firmly bonded to both the zinc or zinc-containing alloy plating and the film in the presence of an aqueous resin, whereby the adhesion of the film and in turn the corrosion resistance are remarkably enhanced. The tannin or tannic acid may be a hydrolyzable tannin, a condensed tannin or a partially decomposed product thereof. Examples of the tannin or tannic acid include, but are not particularly limited to, hamamelitannin, sumac tannin, gallic tannin, myrobolan tannin, divi-divi tannin, algarrobilla tannin, valonia tannin and catechin. A commercially available product such as "Tannic Acid: AL" (produced by Fuji Chemical Industry Co., Ltd.) may be used.

As for the tannin or tannic acid content, from 0.2 to 50 parts by weight of tannin or tannic acid is preferably contained per 100 parts by weight of the resin. If the tannin or tannic acid content is less than 0.2 parts by weight, the effect by its addition is not obtained and the adhesion of film or corrosion resistance of the formed part is insufficient, whereas if it exceeds 50 parts by weight, there arise problems such as occurrence of gelling during the long-term storage of the treating solution.

When a fine particulate silica is further added, the scratch resistance, film adhesion and corrosion resistance are enhanced. The fine particulate silica as used in the present invention generically indicates silicas characterized in that when dispersed in water, a water dispersion state can be stably maintained by virtue of their fine particle size and precipitation is not observed semipermanently. This fine particulate silica is not particularly limited as long as it contains less impurities such as sodium and is weakly alkaline. A commercially available silica such as "tinowtex N" (produced by Nissan Chemical Industries, Ltd.) and "Adelite AT-20N" (produced by Asahi Denka Kogyo K.K.) may be used.

The fine particulate silica content is, in terms of the solid content, preferably from 1 to 2,000 parts by weight, more preferably from 10 to 400 parts by weight, per 100 parts by weight of the aqueous resin. If the content is less than 1 part by weight, the effect obtainable by the addition is low, whereas if it exceeds 2,000 parts by weight, the effect of enhancing the corrosion resistance is saturated and this is unprofitable. Also, when an etching fluoride is added, the film adhesion is enhanced. Examples of the etching fluoride which can be used include zinc fluoride tetrahydrate and zinc hexafluorosilicate hexahydrate. The etching fluoride content is, in terms of the solid content, preferably from 1 to 1,000 parts by weight per 100 parts by weight of the aqueous resin. If the content is less than 1 part by weight, the effect obtainable by the addition is low, whereas if it exceeds 1,000 parts by weight, the effect of etching is saturated to give no more improvement in the film adhesion and this is unprofitable.

If desired, a surfactant, a rust inhibitor, a foaming agent and the like may be added. The coverage of the undercoating layer after drying is preferably from 10 to 1,000 mg/m$^2$. If the coverage is less than 10 mg/m$^2$, the adhesive property is poor and the corrosion resistance of the formed part is insufficient, whereas if it exceeds 1,000 mg/m$^2$, this is not only unprofitable but also causes reduction in the formability and also in the corrosion resistance.

The coated metal material of the present invention may be produced by a known method. The coated steel sheet containing electrically conducting particles can be produced, for example, by mixing electrically conducting particles with a binder component to prepare a coating material and applying the obtained coating material. The film formation can be performed by a known method according to the binder component or contained components, for example, by applying heat to volatilize the solvent or the like or cure the film or irradiating an energy ray to cure the film. As for the coating method, a known method may be used and examples thereof include roll coater, roller coating, brush coating, curtain coater, die coater, slide coater, electrostatic coating, spray coating, dip coating and air knife coating. The form of the coating material is also not particularly limited and may be a powder, a solid, a solvent system or a water system. Also, a solid coating material may be melted under heating and coated while extruding it from a die.

Alternatively, the coated metal sheet may be produced by previously kneading an electrically conducting particle in the film layer and laminating the resulting film. An adhesive may be used for the lamination or the film may be heat-melted and laminated directly on a metal sheet.

In the present invention, the coat layer is sufficient if it is formed at least on one surface of a metal, but may be formed on both surfaces. In the case of forming the coat layer is formed on one layer, the other surface may be subjected to formation of some treating layer or a coat layer or may have the metal surface left as it is.

The method for coating the undercoating film is also not particularly limited and a commonly known coating method such as roll coating, curtain flow coating, air spraying, airless spraying, electrostatic coating and dipping may be used. The drying and baking after the coating may be performed by using a known method such as hot-air furnace, induction heating furnace and near infrared furnace, or by combining these methods. Depending on the kind of the aqueous resin used, the curing may be performed with an ultraviolet ray or an electron beam. Alternatively, the film may be naturally dried without using forced drying, or after previously heating the plated steel sheet, the film may be formed thereon and naturally dried.

During such drying and curing or after curing, a process of controlling the surface roughness and texture, such as shot blasting and skin pass rolling, may be provided.

Furthermore, in usage as a fuel tank material, the steel sheet of the present invention is used in practice after passing through forming and resistance welding such as seam welding and spot welding in the normal production process and therefore, when repair coating is applied after welding, high reliability can be obtained. The repair coating material used here may be a commercially available product and this may be sufficient if it can exhibit good adhesion to the organic film and inhibit the penetration of corrosive factors such as moisture. Even when such repair coating is performed, the steel sheet of the present invention can be produced at a sufficiently low cost as compared with conventional techniques where after-coating is applied. Also in other uses, some repair coating can be of course applied to the joined part, end face part, form flaw part, handling flaw part or the like for the purpose of obtaining higher reliability.

EXAMPLES

The present invention is described below by referring to Examples, but the present invention is not limited to these Examples.

Example 1

Various electrically conducting particles were prepared and ground by a grinder according to the conditions to produce particles having various size distributions. A predetermined amount of the electrically conducting particle was mixed with a urethane-epoxy-based resin and the resulting mixture was coated on a metal sheet, baked and then dried. In some samples, the organic film was coated after an undercoating film is applied on the metal sheet. The conditions thereof are shown in Table 1. At this time, the drying condition was 210° C. as a peak metal temperature. The thus-obtained coated metal sheets were subjected to evaluations of weldability, formability and corrosion resistance under the following conditions.

(1) Evaluation of Spot Weldability

Spot welding was performed by using a R40 chromium-copper electrode having a tip diameter of 5 mm at a welding current of 8 kA under an applied pressure of 1.96 kN for a welding time of 12 cycles, and the continuous dotting number was evaluated by the dotting number immediately before the nugget diameter decreased below $3\sqrt{t}$ (where t=sheet thickness)

(2) Earthing Property

The interlayer resistivity of the coat layer was measured by a Rollester four-probe method.

(3) Formability (a) Cylindrical Deep-Drawing Test

A forming test was performed at a drawing ratio of 2.0 by using a cylindrical pounch having a diameter of 50 mm in a hydraulic forming tester. After coating with a rust-preventive oil, the metal sheet was left standing for 1 hour to 1 hour and 30 minutes and then tested. At this time, the unwrinkling pressure was 9.8 kN. The formability was evaluated according to the following criteria.

⊚: Formable and no defect in the coating film. Completely normal without lackluster or the like in the formed part.

○: Formable but flaw was slightly generated in the coating film. The film formed part was changed in the color tone but free from cracking or separation.

Δ: Formable but large flaw was generated in the coating film and film cracking was observed.

x: Not formable.

(b) Draw-Bead Test

The steel sheet was coated with a rust-preventive oil, left in the erected state for 1 hour to 1 hour and 30 minutes, subjected to a draw-bead test under a pressing load of 9.8 kN by using a round beading mold having a protrusion R of 4 mm and a shoulder R of 2 mm, and then evaluated on the scratch resistance. The evaluation of the scratch resistance was performed according to the following criteria.

⊚: No defect in the coating film. The film state was completely normal without a lack of luster or the like in the formed part.

○: Slight generation of flaw in the coating film. The film formed part was changed in the color tone but free from cracking or separation.

Δ: Generation of large flaw in the coating film. Film cracking was observed.

x: Not formable.

(4) Evaluation of Corrosion Resistance

The steel sheet after coating was formed by cylindrical deep-drawing while laying the coated surface on the outer side, and then a cycle corrosion test was performed. The conditions for the cylindrical deep-drawing were the same as in (3) above.

Also, after beading while laying the coated surface on the peak side of the protruded part, a cycle corrosion test was performed. The conditions for the beading were the same as in (3) above.

Furthermore, a cycle corrosion test was performed while leaving exposed the cut end surface of the flat sheet.

In the cycle corrosion test, one cycle was 8 hours in total consisting of salt water spraying for 2 hours, drying for 4 hours and dampening for 2 hours. The salt water spraying was performed under the conditions according to JIS-K5400. The drying conditions were a temperature of 50° C. and a humidity of 30% RH or less, and the dampening conditions were a temperature of 35° C. and a humidity of 95% RH or more.

The evaluation of the corrosion resistance was performed according to the following criteria.

(a) Cylindrical Deep-Drawn Material:

The corrosion resistance was evaluated by the cycle number until red rust was generated.

(b) Beaded Material:

The corrosion resistance was evaluated by the cycle number until red rust was generated.

(c) Flat Sheet End Face

The corrosion resistance was evaluated by the state on the end face after 100 cycles of CCT.

⊚: Red rust was not generated and white rust indicating the corrosion of the plating layer was covering the sample in an area ratio of less than 5% of the entire area.

○: Red rust was not generated and white rust indicating the corrosion of the plating layer was covering the sample in an area ratio of 5% to less than 50% of the entire area.

Δ: Red rust was slightly generated and white rust generation ratio was 50% or more.

x: Red rust generation ratio was 20% or more.

TABLE 1

Specification of Coated Metal Sheet

| | Base Sheet for Coating | | Electrically Conducting Particles | | | | | |
|---|---|---|---|---|---|---|---|---|
| | | | | | Mode Value for Number Distribution | | Mode Value for Volume Distribution, μm | Maximum Particle Size, μm | Film Thickness, μm |
| No. | Kind*[1] | Undercoating*[2] | Kind*[3] | Vol % | Mode Value, μm | Number of Particles, % | | | |
| 101 | EG | trivalent Cr | Particle 1 | 12 | 0.50 | 7 | 18.2 | 23.3 | 9 |
| 102 | EG | trivalent Cr | Particle 1 | 15 | 0.50 | 7 | 18.2 | 23.3 | 9 |
| 103 | EG | trivalent Cr | Particle 1 | 20 | 0.50 | 7 | 18.2 | 23.3 | 9 |
| 104 | EG | trivalent Cr | Particle 1 | 25 | 0.50 | 7 | 18.2 | 23.3 | 9 |
| 105 | EG | trivalent Cr | Particle 1 | 30 | 0.50 | 7 | 18.2 | 23.3 | 9 |
| 106 | EG | trivalent Cr | Particle 1 | 35 | 0.50 | 7 | 18.2 | 23.3 | 9 |
| 107 | EG | trivalent Cr | Particle 1 | 45 | 0.50 | 7 | 18.2 | 23.3 | 9 |
| 108 | EG | trivalent Cr | Particle 1 | 55 | 0.50 | 7 | 18.2 | 23.3 | 9 |
| 109 | EG | trivalent Cr | Particle 1 | 60 | 0.50 | 7 | 18.2 | 23.3 | 9 |
| 110 | EG | trivalent Cr | Particle 1 | 65 | 0.50 | 7 | 18.2 | 23.3 | 9 |
| 111 | EG | trivalent Cr | Particle 2 | 25 | 0.05 | 6 | 1.0 | 20.1 | 9 |
| 112 | EG | trivalent Cr | Particle 3 | 25 | 0.15 | 6 | 2.0 | 20.2 | 9 |
| 113 | EG | trivalent Cr | Particle 4 | 25 | 0.90 | 7 | 18.9 | 23.8 | 9 |
| 114 | EG | trivalent Cr | Particle 5 | 25 | 1.85 | 7 | 29.5 | 38.8 | 9 |
| 115 | EG | trivalent Cr | Particle 6 | 25 | 0.55 | 4 | 20.2 | 26.2 | 9 |
| 116 | EG | trivalent Cr | Particle 7 | 25 | 0.55 | 7 | 22.0 | 28.2 | 9 |
| 117 | EG | none | Particle 8 | 25 | 0.60 | 7 | 19.5 | 28.0 | 9 |
| 118 | EG | trivalent Cr | Particle 9 | 25 | 0.45 | 7 | 17.2 | 23.5 | 19 |
| 119 | EG | trivalent Cr | Particle 1 | 25 | 0.50 | 8 | 18.2 | 23.3 | 25 |
| 120 | EG | trivalent Cr | Particle 1 | 25 | 0.50 | 8 | 18.2 | 23.3 | 30 |
| 121 | EG | trivalent Cr | Particle 1 | 25 | 0.50 | 5 | 18.2 | 23.3 | 35 |
| 122 | EG | trivalent Cr | Particle 1 | 25 | 0.50 | 7 | 18.2 | 23.3 | 3 |
| 123 | EG | trivalent Cr | Particle 1 | 25 | 0.50 | 7 | 18.2 | 23.3 | 1.5 |
| 124 | EG | Ti-based treatment 1 | Particle 1 | 25 | 0.50 | 7 | 18.2 | 23.3 | 9 |
| 125 | EG | Zr-based treatment | Particle 1 | 25 | 0.50 | 7 | 18.2 | 23.3 | 9 |
| 126 | ZL | trivalent Cr | Particle 1 | 25 | 0.50 | 7 | 18.2 | 23.3 | 9 |
| 127 | ZL | trivalent Cr | Particle 5 | 25 | 1.85 | 7 | 29.5 | 38.8 | 9 |
| 128 | GA | trivalent Cr | Particle 1 | 25 | 0.50 | 7 | 18.2 | 23.3 | 9 |
| 129 | GA | trivalent Cr | Particle 5 | 25 | 1.85 | 7 | 29.5 | 38.8 | 9 |
| 130 | EG | trivalent Cr | Particle 10 | 25 | 0.75 | 8 | 19.6 | 30.8 | 9 |
| 131 | EG | trivalent Cr | Particle 11 | 35 | 0.85 | 7 | 20.1 | 32.2 | 9 |

*[1]EG: zinc electroplated steel sheet (plating coverage: 40 g/m$^2$)
ZL: zinc-12% nickel electroplated steel sheet (plating coverage: 40 g/m$^2$)
GA: alloyed hot-dip galvanized steel sheet (plating coverage: 45 g/m$^2$)
*[2]trivalent chromium: trivalent chromium-treated film (film coverage: 50 mg/m$^2$ [in terms of chromium])
titanium-based treatment 1: titanium compound-resin-silica system (film coverage: 100 mg/m$^2$)
zirconium-based treatment: zirconium compound-silane coupling agent-silica system (film coverage: 200 mg/m$^2$)
*[3]Particle 1: 76%-silicon-containing ferrosilicon particle
Particle 2: 76%-silicon-containing ferrosilicon particle
Particle 3: 76%-silicon-containing ferrosilicon particle
Particle 4: 76%-silicon-containing ferrosilicon particle
Particle 5: 76%-silicon-containing ferrosilicon particle
Particle 6: 76%-silicon-containing ferrosilicon particle
Particle 7: 76%-silicon-containing ferrosilicon particle
Particle 8: 76%-silicon-containing ferrosilicon particle
Particle 9: 45%-silicon-containing ferrosilicon particle
Particle 10: iron phosphide ($Fe_2P_5$) particle
Particle 11: zirconium powder

TABLE 2

| | | | Performance Evaluation Results | | | | | |
|---|---|---|---|---|---|---|---|---|
| | | | Formability | | Corrosion Resistance | | | |
| No. | Weldability, dotting number | Electric Conductivity, mΩ | Cylindrical Drawing, appearance | Beading, appearance | Cycle Number of Cylindrical Drawn Part | Cycle Number of Beaded Part | Appearance of End Face Part | Remarks |
| 101 | 0 | —[note] | ☉ | ☉ | 250 | 200 | ○ | Comparison |
| 102 | 800 | 1 | ☉ | ☉ | 400 | 350 | ○ | Example |
| 103 | 1500 | 0.05 | ☉ | ☉ | 450 | 400 | ☉ | Example |
| 104 | 2100 | 0.05 | ☉ | ☉ | 450 | 400 | ☉ | Example |
| 105 | 2100 | 0.05 | ☉ | ☉ | 450 | 400 | ☉ | Example |
| 106 | 2100 | 0.03 | ☉ | ☉ | 450 | 400 | ☉ | Example |
| 107 | 2100 | 0.03 | ○ | ○ | 400 | 350 | ☉ | Example |
| 108 | 2100 | 0.03 | ○ | ○ | 400 | 350 | ☉ | Example |
| 109 | 2100 | 0.02 | ○ | ○ | 350 | 350 | ☉ | Example |
| 110 | 2100 | 0.02 | Δ | Δ | 150 | 100 | ☉ | Comparison |
| 111 | 1000 | 258 | ☉ | ☉ | 400 | 350 | ☉ | Comparison |
| 112 | 1300 | 0.56 | ☉ | ☉ | 450 | 400 | ☉ | Example |
| 113 | 1800 | 0.05 | ☉ | ☉ | 450 | 350 | ☉ | Example |
| 114 | 1000 | 0.05 | Δ | Δ | 200 | 150 | ○ | Comparison |
| 115 | 1100 | 0.08 | ○ | ○ | 400 | 300 | ☉ | Example |
| 116 | 1300 | 0.05 | ○ | ○ | 400 | 300 | ☉ | Example |
| 117 | 2100 | 0.03 | ○ | ○ | 400 | 300 | ☉ | Example |
| 118 | 2100 | 0.12 | ☉ | ☉ | 400 | 350 | ☉ | Example |
| 119 | 1300 | 0.98 | ○ | ○ | 450 | 400 | ☉ | Example |
| 120 | 1300 | 1.11 | ○ | ○ | 450 | 400 | ☉ | Example |
| 121 | 1000 | 1.20 | ○ | ○ | 450 | 350 | ☉ | Example |
| 122 | 2300 | 0.05 | ☉ | ☉ | 300 | 250 | ○ | Example |
| 123 | 2300 | 0.02 | ☉ | ☉ | 250 | 200 | ○ | Example |
| 124 | 2100 | 0.05 | ☉ | ☉ | 450 | 350 | ☉ | Example |
| 125 | 2100 | 0.05 | ☉ | ☉ | 450 | 350 | ☉ | Example |
| 126 | >3000 | 0.05 | ☉ | ☉ | 650 | 600 | ☉ | Example |
| 127 | 1300 | 0.05 | Δ | Δ | 400 | 350 | ○ | Comparison |
| 128 | >3000 | 0.05 | ☉ | ☉ | 600 | 600 | ☉ | Example |
| 129 | 1300 | 0.05 | Δ | Δ | 250 | 250 | ○ | Comparison |
| 130 | 2100 | 0.05 | ☉ | ☉ | 350 | 300 | ○ | Example |
| 131 | 2100 | 0.05 | ☉ | ☉ | 350 | 300 | ○ | Example |

[note]—: not measurable (∞)

The results are shown in Table 2. As verified in Examples of the present invention, when the size distribution of the electrically conducting particles is controlled to have a mode value of 0.05 to 1.0 μm for the particle size distribution and the amount of the electrically conducting particles added is controlled to from 15 to 60 vol %, good weldability, formability and corrosion resistance can be ensured. Also, when the content of the particles at the mode value in the number distribution is controlled to 5 vol % or more or the mode value for the volume distribution is controlled to from 2 to 20 μm or when the maximum particle size of the electrically conducting particles and the film thickness are controlled to respective proper values, good weldability, formability and corrosion resistance can be similarly ensured.

Nos. 101, 110, 111, 114, 127 and 129 for comparison are showing cases of using a coated metal sheet out of the scope of the present invention. In No. 1 where the amount of the electrically conducting particle is small, the electric conductivity cannot be obtained. In No. 110 where the amount of the electrically conducting particles is too large, the formability decreases. In No. 111 where the mode value for the number distribution is low, the electric conductivity decreases. In Nos. 114, 127 and 129 where the mode value for the number distribution is large, the formability and corrosion resistance are decreased.

Example 2

The conditions when an electrically conducting particle or rust-preventive pigment of various types was mixed and when the resin system was changed are shown in Table 3. The electrically conducting particles and rust-preventive pigment each in a predetermined amount were mixed with a urethane-epoxy type resin, polyester-melamine type resin, polyester-urethane type resin, acryl-polyester type resin, polyethylene terephthalate resin or high molecular polyester resin, and the resulting mixture was coated on a metal sheet and then baked and dried. Other conditions for the production of the coated metal sheet were the same as in Example 1. The obtained coated metal sheets were evaluated on the weldability, formability and corrosion resistance under the same conditions as in Example 1.

TABLE 3

Specification of Coated Metal Sheet

| | Base Sheet for Coating | | Resin, | | | Electrically Conducting Particles | | | | Rust-Preventive Pigment | | Film Thickness, |
|---|---|---|---|---|---|---|---|---|---|---|---|---|
| | | | | | | Mode Value for Number Distribution | | Mode Value for Volume Distribution, | Maximum Particle | | | |
| No. | *¹Kind | *²Undercoating | *³Kind | *⁴Kind | Vol % | Mode Value, μm | Number of Particles, % | μm | Size, μm | *⁵Kind | Vol % | μm |
| 201 | EG | trivalent Cr | Resin A | Particle 1 | 25 | 0.50 | 7 | 18.2 | 23.3 | — | — | 9 |
| 202 | EG | trivalent Cr | Resin A | Particle 12 | 25 | 0.50 | 7 | 18.2 | 23.3 | — | — | 9 |
| 203 | EG | trivalent Cr | Resin A | Particle 13 | 25 | 0.50 | 7 | 18.2 | 23.3 | — | — | 9 |
| 204 | EG | trivalent Cr | Resin A | Particle 14 | 25 | 0.50 | 7 | 18.2 | 23.3 | — | — | 9 |
| 205 | EG | trivalent Cr | Resin A | Particle 15 | 25 | 0.50 | 6 | 18.2 | 23.3 | — | — | 9 |
| 206 | EG | trivalent Cr | Resin A | Particle 16 | 25 | 0.50 | 6 | 18.2 | 23.3 | — | — | 9 |
| 207 | EG | trivalent Cr | Resin A | Particle 17 | 25 | 2.55 | 6 | 18.2 | 23.3 | — | — | 9 |
| 208 | EG | trivalent Cr | Resin A | Particle 1 | 10 | 0.50 | 7 | 18.2 | 23.3 | — | — | 9 |
| 209 | EG | trivalent Cr | Resin A | Particle 5 | 25 | 1.85 | 7 | 29.5 | 38.8 | — | — | 9 |
| 210 | ZL | trivalent Cr | Resin A | Particle 1 | 25 | 0.50 | 7 | 18.2 | 23.3 | Pigment 1 | 5 | 9 |
| 211 | ZL | trivalent Cr | Resin A | Particle 1 | 25 | 0.50 | 7 | 18.2 | 23.3 | Pigment 1 | 10 | 9 |
| 212 | ZL | trivalent Cr | Resin A | Particle 1 | 25 | 0.50 | 7 | 18.2 | 23.3 | Pigment 1 | 20 | 9 |
| 213 | ZL | trivalent Cr | Resin A | Particle 1 | 25 | 0.50 | 7 | 18.2 | 23.3 | Pigment 1 | 40 | 9 |
| 214 | ZL | trivalent Cr | Resin A | Particle 1 | 25 | 0.50 | 7 | 18.2 | 23.3 | Pigment 1 | 60 | 9 |
| 215 | ZL | trivalent Cr | Resin A | Particle 1 | 25 | 0.50 | 7 | 18.2 | 23.3 | Pigment 2 | 10 | 9 |
| 216 | ZL | trivalent Cr | Resin A | Particle 1 | 25 | 0.50 | 7 | 18.2 | 23.3 | Pigment 3 | 10 | 9 |
| 217 | ZL | trivalent Cr | Resin A | Particle 1 | 65 | 0.50 | 7 | 18.2 | 23.3 | Pigment 1 | 10 | 9 |
| 218 | EG | trivalent Cr | Resin B | Particle 1 | 25 | 0.50 | 7 | 18.2 | 23.3 | — | — | 9 |
| 219 | EG | trivalent Cr | Resin C | Particle 1 | 25 | 0.50 | 7 | 18.2 | 23.3 | — | — | 9 |
| 220 | EG | trivalent Cr | Resin D | Particle 1 | 25 | 0.50 | 7 | 18.2 | 23.3 | — | — | 9 |
| 221 | EG | trivalent Cr | Resin E | Particle 1 | 25 | 0.50 | 7 | 18.2 | 23.3 | — | — | 9 |
| 222 | EG | trivalent Cr | Resin F | Particle 1 | 25 | 0.50 | 7 | 18.2 | 23.3 | — | — | 9 |

*¹EG: zinc electroplated steel sheet (plating coverage: 40 g/m²)
ZL: zinc-12% nickel electroplated steel sheet (plating coverage: 40 g/m²)
*²trivalent chromium: trivalent chromium-treated film (film coverage: 50 mg/m² [in terms of chromium])
*³Resin A urethane-epoxy resin
Resin B polyester-melamine resin
Resin C polyester-urethane resin
Resin D acryl-polyester resin
Resin E polyethylene terephthalate resin
Resin F high molecular polyester resin
*⁴Particle 1: 76%-silicon-containing ferrosilicon particle
Particle 5: 76%-silicon-containing ferrosilicon particle
Particle 12: Particle 1 (99 vol %) + stainless steel particle (1 vol %)
Particle 13: Particle 1 (97 vol %) + stainless steel particle (3 vol %)
Particle 14: Particle 1 (95 vol %) + stainless steel particle (5 vol %)
Particle 15: Particle 1 (90 vol %) + stainless steel particle (10 vol %)
Particle 16: Particle 1 (80 vol %) + stainless steel particle (20 vol %)
Particle 17: Particle 1 (70 vol %) + stainless steel particle (30 vol %)
The stainless steel particle used here had, by itself, a particle size distribution such that the mode value for number distribution was 2.5 μm, the number of particles was 10%, and the mode value for volume distribution was 10 μm.
*⁵Pigment 1: magnesium secondary phosphate (50 parts by mass) + baked $Mn_2O_3 \cdot V_2O_5$ (50 parts by mass)
Pigment 2: a 1/1 (by mol) mixture of $Ca_3(PO_4)_2$ and $V_2O_5$
Pigment 3: a 1/1 (by mol) mixture (50 parts by mass) of $Ca_3(PO_4)_2$ and $V_2O_5$ + fumed silica (50 parts by mass)

The results are shown in Table 4. In the case of adding stainless steel particles having a large particle size, when the content of the stainless steel particles is 5 vol % or less, weldability, formability and corrosion resistance in good balance are obtained without decreasing the formability. When the content of the stainless steel particles is 10 vol % or more, the formability is slightly decreased. Also, when the content of the rust-preventive pigment is 20 vol % or less, good corrosion resistance can be obtained without decreasing the weldability and formability. Furthermore, by using a thermoplastic resin, good weldability can be obtained.

Nos. 207 to 209 and 217 for comparison show cases of using a coated metal sheet out of the scope of the present invention. In No. 208, where the amount of the electrically conducting particles is small, the electric conductivity cannot be obtained. In Nos. 207 and 209, where the mode value for the number distribution is too large, the formability and corrosion resistance are greatly decreased. In No. 217, where the amount of the electrically conducting particles is too large, the formability is greatly decreased.

TABLE 4

Performance Evaluation Results

| | | | Formability | | Corrosion Resistance | | | |
|---|---|---|---|---|---|---|---|---|
| No. | Weldability, dotting number | Electric Conductivity, mΩ | Cylindrical Drawing, appearance | Beading, appearance | Cycle Number of Cylindrical Drawn Part | Cycle Number of Beaded Part | Appearance of End Face Part | Remarks |
| 201 | 1600 | 0.04 | ⊙ | ⊙ | 450 | 400 | ⊙ | Example |
| 202 | 1700 | 0.04 | ⊙ | ⊙ | 450 | 400 | ⊙ | Example |
| 203 | 1800 | 0.03 | ⊙ | ⊙ | 400 | 350 | ○ | Example |
| 204 | 2000 | 0.03 | ⊙ | ⊙ | 400 | 350 | ○ | Example |
| 205 | 2000 | 0.03 | ○ | ○ | 300 | 250 | ○ | Example |
| 206 | 2000 | 0.03 | ○ | ○ | 300 | 250 | ○ | Example |
| 207 | 2200 | 0.03 | Δ | Δ | 200 | 150 | ○ | Comparison |
| 208 | 0 | —note) | ○ | ○ | 300 | 250 | ○ | Comparison |
| 209 | 1500 | 0.05 | Δ | Δ | 200 | 150 | ○ | Comparison |
| 210 | >3000 | 0.05 | ⊙ | ⊙ | 650 | 600 | ⊙ | Example |
| 211 | >3000 | 0.05 | ⊙ | ⊙ | 650 | 600 | ⊙ | Example |
| 212 | 1500 | 0.15 | ⊙ | ⊙ | 650 | 600 | ⊙ | Example |
| 213 | 1100 | 1.2 | ○ | ○ | 600 | 550 | ⊙ | Example |
| 214 | 1000 | 5.1 | ○ | ○ | 400 | 300 | ⊙ | Example |
| 215 | >3000 | 0.05 | ⊙ | ⊙ | 650 | 600 | ⊙ | Example |
| 216 | >3000 | 0.05 | ⊙ | ⊙ | 650 | 600 | ⊙ | Example |
| 217 | >3000 | 0.04 | Δ | Δ | 150 | 100 | ⊙ | Comparison |
| 218 | 1500 | 0.12 | ○ | ○ | 400 | 350 | ⊙ | Example |
| 219 | 1500 | 0.13 | ⊙ | ⊙ | 450 | 400 | ⊙ | Example |
| 220 | 1400 | 0.15 | ○ | ○ | 400 | 350 | ⊙ | Example |
| 221 | 1800 | 0.1 | ⊙ | ⊙ | 450 | 400 | ⊙ | Example |
| 222 | 1800 | 0.11 | ⊙ | ⊙ | 450 | 400 | ⊙ | Example | note)—: not measurable (∞)

Example 3

Metal sheets coated with a urethane-epoxy type resin film containing an electrically conducting particle or other particle controlled in the particle size distribution were evaluated on the aptitude as a fuel tank material and the results are shown in Table 5. In addition to the items of the performance evaluation in Example 1 except for the corrosion resistance of the end face, the following seam weldability test and corrosion resistance test simulating the inner surface side of tank were performed.

(5) Seam Weldability

Seam welding of 10 m was performed with 2-on/1-off electrification at a welding current of 11 kA and an applied pressure of 4.9 kN by using an electrode ring having a tip R of 6 mm and a diameter of 250 mm. Thereafter, a specimen according to JIS-Z-3141 was prepared and tested on the leakage.

⊙: No leakage.
○: No leakage but the welded part surface was slightly roughened.
Δ: No leakage but defects such as cracking were generated on the welded part surface.
x: Leakage was generated.

(6) Inner Surface Corrosion Resistance

The corrosion resistance against gasoline was evaluated. As for the method therefor, a test solution was poured in a sample deep-drawn into a flat-bottom cylinder having a flange width of 20 mm, a diameter of 50 mm and a depth of 25 mm by a hydraulic forming tester, and a glass cover was secured thereon through a silicon rubber-made ring. After this test, the corroded state was observed by eye.

(Test Conditions)

Test Solution:

gasoline+distilled water (10%)+formic acid (200 ppm)

Test period: left standing at 40° C. for 3 months.

(Criteria of Evaluation)

⊙: No change.
○: White rust generation ratio was 0.1% or less.
Δ: Red rust generation ratio was 5% or less or white rust generation ratio was from 0.1 to 50%.
x: Red rust generation ratio was exceeding 5% or conspicuous white rust.

TABLE 5

Specification of Coated Metal Sheet

| | Base Sheet for Coating | | Electrically Conducting Particles | | | | | | Rust-Preventive Pigment | | Film Thickness |
|---|---|---|---|---|---|---|---|---|---|---|---|
| | | *2Under- | | | Mode Value for Number Distribution | | Mode Value for Volume Distribution, | Maximum Particle | | | |
| No. | *1Kind | coating | *3Kind | Vol % | Mode Value, μm | Number of Particles, % | μm | Size, μm | *4Kind | Vol % | μm |
| 301 | ZL | trivalent Cr | Particle 1 | 12 | 0.50 | 7 | 18.2 | 23.3 | — | — | 9 |
| 302 | ZL | trivalent Cr | Particle 1 | 25 | 0.50 | 7 | 18.2 | 23.3 | Pigment 1 | 10 | 9 |

TABLE 5-continued

Specification of Coated Metal Sheet

Electrically Conducting Particles

| No. | *1Kind | Base Sheet for Coating *2Under-coating | *3Kind | Vol % | Mode Value for Number Distribution Mode Value, μm | Number of Particles, % | Mode Value for Volume Distribution, μm | Maximum Particle Size, μm | Rust-Preventive Pigment *4Kind | Vol % | Film Thickness μm |
|---|---|---|---|---|---|---|---|---|---|---|---|
| 303 | ZL | trivalent Cr | Particle 18 | 25 | 0.55 | 4 | 20.2 | 26.2 | Pigment 1 | 10 | 9 |
| 304 | ZL | trivalent Cr | Particle 19 | 25 | 0.55 | 7 | 22.0 | 28.2 | Pigment 1 | 10 | 9 |
| 305 | ZL | trivalent Cr | Particle 20 | 25 | 0.90 | 7 | 18.9 | 23.8 | Pigment 1 | 10 | 9 |
| 306 | ZL | trivalent Cr | Particle 21 | 25 | 1.85 | 7 | 29.5 | 38.8 | Pigment 1 | 10 | 9 |
| 307 | ZL | Zr-based treatment | Particle 22 | 25 | 0.5 | 6 | 18 | 23 | Pigment 2 | 10 | 22 |
| 308 | ZL | Zr-based treatment | Particle 23 | 25 | 0.5 | 7 | 18 | 23 | Pigment 3 | 10 | 9 |
| 309 | Sn—Zn | trivalent Cr | Particle 1 | 12 | 0.5 | 7 | 18 | 23 | — | — | 9 |
| 310 | Sn—Zn | trivalent Cr | Particle 1 | 25 | 0.5 | 7 | 18 | 23 | Pigment 1 | 10 | 9 |
| 311 | Sn—Zn | trivalent Cr | Particle 18 | 25 | 0.55 | 4 | 20.2 | 26.2 | Pigment 1 | 10 | 9 |
| 312 | Sn—Zn | trivalent Cr | Particle 19 | 25 | 0.55 | 7 | 22.0 | 28.2 | Pigment 1 | 10 | 9 |
| 313 | Sn—Zn | trivalent Cr | Particle 20 | 25 | 0.90 | 7 | 18.9 | 23.8 | Pigment 1 | 10 | 9 |
| 314 | Sn—Zn | trivalent Cr | Particle 21 | 25 | 1.85 | 7 | 29.5 | 38.8 | Pigment 1 | 10 | 9 |
| 315 | Sn—Zn | Ti-based treatment 2 | Particle 22 | 25 | 0.50 | 7 | 18.2 | 23.3 | Pigment 2 | 10 | 24 |
| 316 | Sn—Zn | Ti-based treatment 2 | Particle 23 | 25 | 0.50 | 6 | 18.2 | 23.3 | Pigment 3 | 10 | 9 |
| 317 | ZL | trivalent Cr | Particle 10 | 65 | 0.75 | 8 | 19.6 | 30.8 | Pigment 1 | 10 | 9 |
| 318 | ZL | trivalent Cr | Particle 11 | 25 | 0.85 | 7 | 20.1 | 32.2 | Pigment 1 | 10 | 9 |

*1ZL: zinc-12% nickel electroplated steel sheet (plating coverage: 40 g/m$^2$)
Sn-hot-dip tin-8% zinc plated steel sheet
zinc: (plating coverage: 40 g/m$^2$)
*2trivalent chromium: trivalent chromium-treated film (film coverage: 50 mg/m$^2$ [in terms of chromium])
titanium-based treatment 2: titanium compound-resin-phosphoric acid (film coverage: 300 mg/m$^2$)
zirconium-based treatment: zirconium compound-silane coupling agent-silica system (film coverage: 200 mg/m$^2$)
*3Particle 1: 76%-silicon-containing ferrosilicon particle
Particle 10: iron phosphide (Fe$_2$P$_5$) particle
Particle 11: zinc powder
Particle 18: Particle 6 (99 vol %) + stainless steel particle (1 vol %)
Particle 19: Particle 7 (99 vol %) + stainless steel particle (1 vol %)
Particle 20: Particle 4 (99 vol %) + stainless steel particle (1 vol %)
Particle 21: Particle 5 (99 vol %) + stainless steel particle (1 vol %)
Particle 22: Particle 1 (99 vol %) + stainless steel particle (1 vol %)
Particle 23: Particle 1 (90 vol %) + stainless steel particle (10 vol %)
*4Pigment 1: magnesium secondary phosphate (50 parts by mass) + baked Mn$_2$O$_3$•V$_2$O$_5$ (50 parts by mass)
Pigment 2: a 1/1 (by mol) mixture of Ca$_3$(PO$_4$)$_2$ and V$_2$O$_5$
Pigment 3: a 1/1 (by mol) mixture (50 parts by mass) of Ca$_3$(PO$_4$)$_2$ and V$_2$O$_5$ + fumed silica (50 parts by mass)

The results are shown in Table 6. It is seen that the coated metal sheet where the electrically conducting particles or other particles are controlled to a proper size distribution and a proper content, is excellent in the weldability, formability and corrosion resistance and also suited as a fuel tank material.

Nos. 301, 306, 309 and 314 for comparison are showing coated metal sheets out of the scope of the present invention. In Nos. 301 and 309 where the amount of the electrically conducting particles is small, the weldability is not good. In Nos. 306 and 314 where the mode value for the number distribution is large, the formability and corrosion resistance are bad.

TABLE 6

Performance Evaluation Results

| No. | Weldability, dotting number | Electric Conductivity, mΩ | Formability Cylindrical Drawing, appearance | Beading, appearance | Corrosion Resistance Cycle Number of Cylindrical Drawn Part | Cycle Number of Beaded Part | Seam Weldability | Inner Surface Corrosion Resistance | Remarks |
|---|---|---|---|---|---|---|---|---|---|
| 301 | 0 | —note) | ⊙ | ⊙ | 300 | 250 | X | ○ | Comparison |
| 302 | 2100 | 0.05 | ⊙ | ⊙ | 500 | 450 | ⊙ | ○ | Example |
| 303 | 1300 | 0.08 | ○ | ○ | 400 | 300 | ○ | ○ | Example |
| 304 | 1300 | 0.05 | ○ | ○ | 450 | 350 | ○ | ○ | Example |

TABLE 6-continued

Performance Evaluation Results

| | | | Formability | | Corrosion Resistance | | | Inner | |
| | | | | | Cycle | Cycle | | | |
| No. | Weldability, dotting number | Electric Conductivity, mΩ | Cylindrical Drawing, appearance | Beading, appearance | Number of Cylindrical Drawn Part | Number of Beaded Part | Seam Weldability | Surface Corrosion Resistance | Remarks |
|---|---|---|---|---|---|---|---|---|---|
| 305 | 2100 | 0.03 | ⊙ | ⊙ | 500 | 400 | ⊙ | ○ | Example |
| 306 | 1300 | 0.05 | Δ | Δ | 150 | 100 | ○ | ○ | Comparison |
| 307 | 1000 | 1.12 | ⊙ | ⊙ | 450 | 400 | ○ | ○ | Example |
| 308 | 2500 | 0.03 | ○ | ○ | 200 | 150 | ⊙ | ○ | Example |
| 309 | 0 | —note) | ⊙ | ⊙ | 350 | 300 | X | ⊙ | Comparison |
| 310 | 500 | 0.05 | ○ | ○ | 600 | 500 | ⊙ | ⊙ | Example |
| 311 | 400 | 0.08 | ○ | ○ | 500 | 400 | ○ | ⊙ | Example |
| 312 | 400 | 0.05 | ○ | ○ | 500 | 400 | ○ | ⊙ | Example |
| 313 | 500 | 0.03 | ⊙ | ⊙ | 600 | 500 | ⊙ | ⊙ | Example |
| 314 | 400 | 0.05 | Δ | Δ | 150 | 100 | ○ | ⊙ | Comparison |
| 315 | 350 | 1.2 | ⊙ | ⊙ | 450 | 400 | ○ | ⊙ | Example |
| 316 | 500 | 0.03 | ○ | ○ | 250 | 200 | ⊙ | ⊙ | Example |
| 317 | 2100 | 0.05 | ⊙ | ⊙ | 350 | 300 | ⊙ | ○ | Example |
| 318 | 2100 | 0.05 | ⊙ | ⊙ | 350 | 300 | ⊙ | ○ | Example | note)—: not measurable (∞)

Example 4

Various electrically conducting particles were prepared and ground by a ginder, or classified according to the conditions, to produce particles having various size distributions. A predetermined amount of each electrically conducting particle was mixed with a urethane-epoxy type resin and the obtained mixture was coated on a metal sheet, then baked and dried. In some Samples, the organic film was coated after an undercoating film was applied to the metal sheet. The conditions thereof are shown in Table 7. At this time, the drying condition was 210° C. as a peak metal temperature. The thus-obtained coated metal sheets were subjected to evaluations of weldability, formability and corrosion resistance under the following conditions.

TABLE 7

Specification of Coated Metal Sheet

| | Base Sheet for Coating | | Electrically Conducting Particles | | | | | | |
| | | | | | Mode Value for Number Distribution | | Mode Value for Volume Distribution, μm | Maximum Particle Size, μm | Film Thickness, μm |
| No. | Kind*1 | Undercoating*2 | Kind*3 | Vol % | Mode Value, μm | Number of Particles, % | | | |
|---|---|---|---|---|---|---|---|---|---|
| 401 | EG | trivalent Cr | Particle 1 | 10 | 0.40 | 7 | 18.5 | 23.8 | 10 |
| 402 | EG | trivalent Cr | Particle 1 | 15 | 0.40 | 7 | 18.5 | 23.8 | 10 |
| 403 | EG | trivalent Cr | Particle 1 | 20 | 0.40 | 7 | 18.5 | 23.8 | 10 |
| 404 | EG | trivalent Cr | Particle 1 | 25 | 0.40 | 7 | 18.5 | 23.8 | 10 |
| 405 | EG | trivalent Cr | Particle 1 | 30 | 0.40 | 7 | 18.5 | 23.8 | 10 |
| 406 | EG | trivalent Cr | Particle 1 | 35 | 0.40 | 7 | 18.5 | 23.8 | 10 |
| 407 | EG | trivalent Cr | Particle 1 | 45 | 0.40 | 7 | 18.5 | 23.8 | 10 |
| 408 | EG | trivalent Cr | Particle 1 | 55 | 0.40 | 7 | 18.5 | 23.8 | 10 |
| 409 | EG | trivalent Cr | Particle 1 | 60 | 0.40 | 7 | 18.5 | 23.8 | 10 |
| 410 | EG | trivalent Cr | Particle 1 | 65 | 0.40 | 7 | 18.5 | 23.8 | 10 |
| 411 | EG | trivalent Cr | Particle 2 | 30 | 0.025 | 6 | 1.3 | 20.5 | 9 |
| 412 | EG | trivalent Cr | Particle 3 | 30 | 0.05 | 6 | 3.5 | 20.6 | 9 |
| 413 | EG | trivalent Cr | Particle 4 | 30 | 0.05 | 6 | 2.1 | 20.0 | 9 |
| 414 | EG | trivalent Cr | Particle 5 | 30 | 0.15 | 6 | 3.3 | 20.4 | 9 |
| 415 | EG | trivalent Cr | Particle 6 | 30 | 0.65 | 7 | 18.9 | 23.6 | 9 |
| 416 | EG | trivalent Cr | Particle 7 | 30 | 0.95 | 7 | 23.3 | 29.6 | 9 |
| 417 | EG | trivalent Cr | Particle 8 | 30 | 1.20 | 7 | 30.2 | 36.6 | 9 |
| 418 | EG | trivalent Cr | Particle 9 | 30 | 1.55 | 7 | 35.9 | 43.3 | 9 |
| 419 | EG | trivalent Cr | Particle 10 | 30 | 2.00 | 8 | 45.0 | 55.2 | 9 |
| 420 | EG | none | Particle 11 | 30 | 1.95 | 8 | 22.8 | 30.3 | 10 |
| 421 | EG | none | Particle 12 | 30 | 0.60 | 5 | 27.1 | 37.0 | 10 |
| 422 | EG | trivalent Cr | Particle 13 | 30 | 0.55 | 7 | 19.3 | 29.0 | 10 |
| 423 | EG | trivalent Cr | Particle 14 | 30 | 0.50 | 7 | 18.4 | 23.6 | 15 |
| 424 | EG | trivalent Cr | Particle 1 | 30 | 0.40 | 7 | 18.5 | 23.8 | 20 |
| 425 | EG | trivalent Cr | Particle 1 | 30 | 0.40 | 7 | 18.5 | 23.8 | 25 |
| 426 | EG | trivalent Cr | Particle 1 | 30 | 0.40 | 7 | 18.5 | 23.8 | 30 |

TABLE 7-continued

Specification of Coated Metal Sheet

| | Base Sheet for Coating | | Electrically Conducting Particles | | | | Mode Value for Volume Distribution, μm | Maximum Particle Size, μm | Film Thickness, μm |
|---|---|---|---|---|---|---|---|---|---|
| | | | | | Mode Value for Number Distribution | | | | |
| No. | Kind*[1] | Undercoating*[2] | Kind*[3] | Vol % | Mode Value, μm | Number of Particles, % | | | |
| 427 | EG | trivalent Cr | Particle 1 | 30 | 0.40 | 7 | 18.5 | 23.8 | 3 |
| 428 | EG | trivalent Cr | Particle 1 | 30 | 0.40 | 7 | 18.5 | 23.8 | 1 |
| 429 | EG | Ti-based treatment 1 | Particle 1 | 30 | 0.40 | 7 | 18.5 | 23.8 | 9 |
| 430 | EG | Zr-based treatment | Particle 1 | 30 | 0.40 | 7 | 18.5 | 23.8 | 9 |
| 431 | ZL | trivalent Cr | Particle 1 | 30 | 0.40 | 7 | 18.5 | 23.8 | 9 |
| 432 | ZL | trivalent Cr | Particle 8 | 30 | 1.20 | 7 | 30.2 | 36.6 | 9 |
| 433 | GA | trivalent Cr | Particle 1 | 30 | 0.40 | 7 | 18.5 | 23.8 | 9 |
| 434 | GA | trivalent Cr | Particle 8 | 30 | 1.20 | 7 | 30.2 | 36.6 | 9 |
| 435 | EG | trivalent Cr | Particle 15 | 30 | 0.70 | 7 | 20.2 | 29.5 | 10 |
| 436 | EG | trivalent Cr | Particle 16 | 35 | 0.80 | 7 | 22.3 | 31.3 | 10 |

*[1]EG: zinc electroplated steel sheet (plating coverage: 40 g/m$^2$)
ZL: zinc-12% nickel electroplated steel sheet (plating coverage: 40 g/m$^2$)
GA: alloyed hot-dip galvanized steel sheet (plating coverage: 45 g/m$^2$)
*[2]trivalent chromium: trivalent chromium-treated film (film coverage: 50 mg/m$^2$ [in terms of chromium])
titaniuim-based treatment 1: titanium compound-resin-silica system (film coverage: 100 mg/m$^2$)
zirconium-based treatment: zirconium compound-silane coupling agent-silica system (film coverage: 200 mg/m$^2$)
*[3]Particle 1: 76%-silicon-containing ferrosilicon particle
Particle 2: 76%-silicon-containing ferrosilicon particle
Particle 3: 76%-silicon-containing ferrosilicon particle
Particle 4: 76%-silicon-containing ferrosilicon particle
Particle 5: 76%-silicon-containing ferrosilicon particle
Particle 6: 76%-silicon-containing ferrosilicon particle
Particle 7: 76%-silicon-containing ferrosilicon particle
Particle 8: 76%-silicon-containing ferrosilicon particle
Particle 9: 76%-silicon-containing ferrosilicon particle
Particle 10: 76%-silicon-containing ferrosilicon particle
Particle 11: 76%-silicon-containing ferrosilicon particle
Particle 12: 76%-silicon-containing ferrosilicon particle
Particle 13: 76%-silicon-containing ferrosilicon particle
Particle 14: 45%-silicon-containing ferrosilicon particle
Particle 15: iron phosphide ($Fe_2P_5$) particle
Particle 16: zinc powder The results are shown in Table 8. As verified in Examples of the present invention, when the size distribution of the electrically conducting particles is controlled to have a relationship satisfying a predetermined correlation expression among the mode value Mn for the number distribution every each particle size of the electrically conducting particles, the mode value Mv in the volume distribution in relation to particle size of the electrically conducting particle and the thickness H of the coat layer and at the same time, the content of the electrically conducting particle in the coat layer is from 15 to 60 vol %, good weldability, formability and corrosion resistance can be ensured. Also, when the film thickness is controlled to a proper value, good weldability, formability and corrosion resistance can be similarly ensured.

Nos. 401, 410, 411, 412, 419, 420 and 428 for comparison show cases of using a coated metal sheet out of the scope of the present invention. In No. 1 where the amount of the electrically conducting particle is small, the electric conductivity cannot be obtained. In No. 410 where the amount of the electrically conducting particles is too large, the formability decreases. In No. 412 where Mv/Mn is less than 12, the weldability decreases. In No. 419 where Mv/Mn exceeds 50, the corrosion resistance and formability are decreased. In No. 411 where the thickness H of the coat layer exceeds 200 Mn, the weldability decreases. In No. 420 where the thickness H of the coat layer is less than 5 Mn, the corrosion resistance and formability are decreased. In No. 428 where Mv exceeds 10H, the corrosion resistance and formability are decreased.

TABLE 8

Performance Evaluation Results

| | | | Formability | | Corrosion Resistance | | | |
|---|---|---|---|---|---|---|---|---|
| No. | Weldability, dotting number | Electric Conductivity, mΩ | Cylindrical Drawing, appearance | Beading, appearance | Cycle Number of Cylindrical Drawn Part | Cycle Number of Beaded Part | Appearance of End Face Part | Remarks |
| 401 | 0 | —note) | ☉ | ☉ | 250 | 200 | Δ | Comparison |
| 402 | 800 | 1.2 | ☉ | ☉ | 400 | 350 | ○ | Example |

TABLE 8-continued

Performance Evaluation Results

| | | | Formability | | Corrosion Resistance | | | |
|---|---|---|---|---|---|---|---|---|
| No. | Weldability, dotting number | Electric Conductivity, mΩ | Cylindrical Drawing, appearance | Beading, appearance | Cycle Number of Cylindrical Drawn Part | Cycle Number of Beaded Part | Appearance of End Face Part | Remarks |
| 403 | 1400 | 0.05 | ⊙ | ⊙ | 450 | 400 | ⊙ | Example |
| 404 | 2000 | 0.05 | ⊙ | ⊙ | 450 | 400 | ⊙ | Example |
| 405 | 2000 | 0.05 | ⊙ | ⊙ | 450 | 400 | ⊙ | Example |
| 406 | 2000 | 0.03 | ⊙ | ⊙ | 450 | 400 | ⊙ | Example |
| 407 | 1900 | 0.03 | ○ | ○ | 400 | 400 | ○ | Example |
| 408 | 1900 | 0.03 | ○ | ○ | 400 | 350 | ○ | Example |
| 409 | 1900 | 0.02 | ○ | ○ | 400 | 350 | ○ | Example |
| 410 | 1900 | 0.02 | Δ | Δ | 150 | 100 | ⊙ | Comparison |
| 411 | 150 | 165 | ○ | ○ | 350 | 300 | ⊙ | Comparison |
| 412 | 1300 | 0.85 | Δ | Δ | 200 | 100 | Δ | Comparison |
| 413 | 1000 | 0.64 | ⊙ | ⊙ | 450 | 400 | ⊙ | Example |
| 414 | 1100 | 0.33 | ⊙ | ⊙ | 450 | 400 | ⊙ | Example |
| 415 | 1600 | 0.05 | ⊙ | ⊙ | 450 | 350 | ⊙ | Example |
| 416 | 1600 | 0.05 | ⊙ | ⊙ | 450 | 350 | ⊙ | Example |
| 417 | 1200 | 0.05 | ○ | ○ | 250 | 200 | ○ | Example |
| 418 | 1200 | 0.05 | ○ | ○ | 250 | 200 | ○ | Example |
| 419 | 1200 | 0.03 | Δ | Δ | 200 | 150 | ○ | Comparison |
| 420 | 300 | 0.9 | ○ | ○ | 250 | 200 | ○ | Comparison |
| 421 | 1700 | 0.08 | ○ | ○ | 400 | 350 | ⊙ | Example |
| 422 | 1900 | 0.03 | ⊙ | ⊙ | 450 | 400 | ⊙ | Example |
| 423 | 2300 | 0.05 | ⊙ | ⊙ | 400 | 350 | ⊙ | Example |
| 424 | 1200 | 0.05 | ⊙ | ⊙ | 450 | 400 | ⊙ | Example |
| 425 | 1100 | 0.05 | ⊙ | ⊙ | 450 | 400 | ⊙ | Example |
| 426 | 2300 | 0.05 | ⊙ | ○ | 400 | 350 | ⊙ | Example |
| 427 | 2300 | 0.02 | ⊙ | ⊙ | 300 | 250 | ○ | Example |
| 428 | 2300 | 0.02 | Δ | Δ | 150 | 100 | X | Comparison |
| 429 | 2100 | 0.05 | ⊙ | ⊙ | 450 | 350 | ⊙ | Example |
| 430 | 2100 | 0.05 | ⊙ | ⊙ | 450 | 350 | ⊙ | Example |
| 431 | >3000 | 0.05 | ⊙ | ⊙ | 650 | 600 | ⊙ | Example |
| 432 | 1800 | 0.05 | ○ | ○ | 500 | 450 | ○ | Example |
| 433 | >3000 | 0.05 | ⊙ | ⊙ | 600 | 600 | ⊙ | Example |
| 434 | 1800 | 0.05 | ○ | ○ | 450 | 400 | ○ | Example |
| 435 | 2100 | 0.05 | ⊙ | ⊙ | 350 | 300 | ○ | Example |
| 436 | 2100 | 0.05 | ⊙ | ⊙ | 350 | 300 | ○ | Example | note)—: not measurable (∞)

Example 5

The conditions when electrically conducting particles or rust-preventive pigment of various types were mixed and when the resin system was changed are shown in Table 9. The electrically conducting particle and rust-preventive pigment each in a predetermined amount were mixed with a urethane-epoxy type resin, polyester-melamine type resin, polyester-urethane type resin, acryl-polyester type resin, polyethylene terephthalate resin or polyolefin resin, and the resulting mixture was coated on a metal sheet and then baked•dried. Other conditions for the production of the coated metal sheet were the same as in Example 1. The obtained coated metal sheets were evaluated on the weldability, formability and corrosion resistance under the same conditions as in Example 1.

TABLE 9

Specification of Coated Metal Sheet

| | Base Sheet for Coating | | Resin, | | | Electrically Conducting Particles | | | | Rust-Preventive Pigment | | Film Thickness, |
|---|---|---|---|---|---|---|---|---|---|---|---|---|
| | | | | | | Mode Value for Number Distribution | | Mode Value for Volume Distribution, μm | Maximum Particle Size, μm | | | |
| No. | *¹Kind | *²Undercoating | *³Kind | *⁴Kind | Vol % | Mode Value, Mn, μm | Number of Particles, % | | | *⁵Kind | Vol % | μm |
| 501 | EG | trivalent Cr | Resin A | Particle 1 | 25 | 0.40 | 7 | 18.5 | 23.8 | — | — | 10 |
| 502 | EG | trivalent Cr | Resin A | Particle 17 | 10 | 0.40 | 7 | 18.5 | 23.8 | — | — | 10 |
| 503 | EG | trivalent Cr | Resin A | Particle 18 | 25 | 2.00 | 7 | 45.0 | 55.2 | — | — | 10 |
| 504 | EG | trivalent Cr | Resin A | Particle 19 | 25 | 0.40 | 7 | 18.5 | 23.8 | — | — | 10 |
| 505 | EG | trivalent Cr | Resin A | Particle 20 | 25 | 0.40 | 7 | 18.5 | 23.8 | — | — | 10 |
| 506 | EG | trivalent Cr | Resin A | Particle 21 | 25 | 0.40 | 6 | 18.5 | 23.8 | — | — | 10 |

TABLE 9-continued

Specification of Coated Metal Sheet

| | Base Sheet for Coating | | Resin, | | | Electrically Conducting Particles | | | | Rust-Preventive Pigment | | Film Thickness, |
|---|---|---|---|---|---|---|---|---|---|---|---|---|
| | | | | | | Mode Value for Number Distribution | | Mode Value for Volume Distribution, μm | Maximum Particle Size, μm | | | |
| No. | *¹Kind | *²Undercoating | *³Kind | *⁴Kind | Vol % | Mode Value, Mn, μm | Number of Particles, % | | | *⁵Kind | Vol % | μm |
| 507 | EG | trivalent Cr | Resin A | Particle 22 | 65 | 0.40 | 6 | 18.5 | 23.8 | — | — | 10 |
| 508 | ZL | trivalent Cr | Resin A | Particle 17 | 25 | 0.40 | 7 | 18.5 | 23.8 | Pigment 1 | 5 | 10 |
| 509 | ZL | trivalent Cr | Resin A | Particle 17 | 25 | 0.40 | 7 | 18.5 | 34.8 | Pigment 1 | 10 | 10 |
| 510 | ZL | trivalent Cr | Resin A | Particle 17 | 25 | 0.40 | 7 | 18.5 | 23.8 | Pigment 1 | 20 | 10 |
| 511 | ZL | trivalent Cr | Resin A | Particle 17 | 25 | 0.40 | 7 | 18.5 | 23.8 | Pigment 1 | 40 | 10 |
| 512 | ZL | trivalent Cr | Resin A | Particle 17 | 25 | 0.40 | 7 | 18.5 | 23.8 | Pigment 1 | 60 | 10 |
| 513 | ZL | trivalent Cr | Resin A | Particle 17 | 25 | 0.40 | 7 | 18.5 | 23.8 | Pigment 2 | 10 | 10 |
| 514 | ZL | trivalent Cr | Resin A | Particle 17 | 25 | 0.40 | 7 | 18.5 | 23.8 | Pigment 3 | 10 | 10 |
| 515 | EG | trivalent Cr | Resin B | Particle 17 | 25 | 0.40 | 7 | 18.5 | 23.8 | — | — | 10 |
| 516 | EG | trivalent Cr | Resin C | Particle 17 | 25 | 0.40 | 7 | 18.5 | 23.8 | — | — | 10 |
| 517 | EG | trivalent Cr | Resin D | Particle 17 | 25 | 0.40 | 7 | 18.5 | 23.8 | — | — | 10 |
| 518 | EG | trivalent Cr | Resin E | Particle 17 | 25 | 0.40 | 7 | 18.5 | 23.8 | — | — | 10 |
| 519 | EG | trivalent Cr | Resin F | Particle 17 | 25 | 0.40 | 7 | 18.5 | 23.8 | — | — | 10 |

*¹EG: zinc electroplated steel sheet (plating coverage: 40 g/m²)
ZL: zinc-12% nickel electroplated steel sheet (plating coverage: 40 g/m²)
*²trivalent chromium: trivalent chromium-treated film (film coverage: 50 mg/m² [in terms of chromium])
*³Resin A urethane-epoxy resin
Resin B polyester-melamine resin
Resin C polyester-urethane resin
Resin D acryl-polyester resin
Resin E polyethylene terephthalate resin
Resin F polyolefin resin
*⁴Particle 1: 76%-silicon-containing ferrosilicon particle
Particle 17: Particle 1 (99 vol %) + stainless steel particle (1 vol %)
Particle 18: Particle 10 (99 vol %) + stainless steel particle (1 vol %)
Particle 19: Particle 1 (97 vol %) + stainless steel particle (3 vol %)
Particle 20: Particle 1 (95 vol %) + stainless steel particle (5 vol %)
Particle 21: Particle 1 (90 vol %) + stainless steel particle (10 vol %)
Particle 22: Particle 1 (80 vol %) + stainless steel particle (20 vol %)
The stainless steel particle used here had, by itself, a particle size distribution such that the mode value for number distribution was 2.5 μm, the number of particles was 10%, the mode value for volume distribution s 7 μm, and the maximum particle size was 10 μm.
*⁵Pigment 1: magnesium secondary phosphate (50 parts by mass) + baked $Mn_2O_3 \cdot V_2O_5$ (50 parts by mass)
Pigment 2: a 1/1 (by mol) mixture of $Ca_3(PO_4)_2$ and $V_2O_5$
Pigment 3: a 1/1 (by mol) mixture (50 parts by mass) of $Ca_3(PO_4)_2$ and $V_2O_5$ + fumed silica (50 parts by mass)

The results are shown in Table 10. In the case of adding the stainless steel particles having a large particle size, when the content of the stainless steel particle is 5 vol % or less, weldability, formability and corrosion resistance in good balance are obtained without decreasing the formability. When the content of the stainless steel particle is 10 vol % or more, the formability is slightly decreased. Also, when the content of the rust-preventive pigment is 20 vol % or less, good corrosion resistance can be obtained without decreasing the weldability and formability. Furthermore, by using a thermoplastic resin, good weldability can be obtained.

Nos. 502, 503 and 507 for comparison are showing cases of using a coated metal sheet out of the scope of the present invention. In No. 502 where the amount of the electrically conducting particles is too small, the electric conductivity cannot be obtained. In No. 503 where H is less than 5 Mn, the formability and corrosion resistance are decreased. In No. 507 where the amount of the electrically conducting particles exceeds 60 vol %, the formability is bad.

TABLE 10

Performance Evaluation Results

| | | | Formability | | Corrosion Resistance | | | |
|---|---|---|---|---|---|---|---|---|
| No. | Weldability, dotting number | Electric Conductivity, mΩ | Cylindrical Drawing, appearance | Beading, appearance | Cycle Number of Cylindrical Drawn Part | Cycle Number of Beaded Part | Appearance of End Face Part | Remarks |
| 501 | 1500 | 0.04 | ⊙ | ⊙ | 400 | 400 | ⊙ | Example |
| 502 | 0 | —note) | ⊙ | ⊙ | 300 | 300 | ○ | Comparison |
| 503 | 1200 | 0.03 | Δ | Δ | 200 | 150 | ○ | Comparison |
| 504 | 1500 | 0.04 | ⊙ | ⊙ | 400 | 400 | ⊙ | Example |

TABLE 10-continued

| | | | Performance Evaluation Results | | | | | |
| | | | Formability | | Corrosion Resistance | | | |
| No. | Weldability, dotting number | Electric Conductivity, mΩ | Cylindrical Drawing, appearance | Beading, appearance | Cycle Number of Cylindrical Drawn Part | Cycle Number of Beaded Part | Appearance of End Face Part | Remarks |
|---|---|---|---|---|---|---|---|---|
| 505 | 1700 | 0.03 | ⊙ | ⊙ | 400 | 350 | ⊙ | Example |
| 506 | 1800 | 0.05 | ○ | ○ | 300 | 250 | ○ | Example |
| 507 | 1800 | 0.05 | Δ | Δ | 150 | 100 | ○ | Comparison |
| 508 | 2500 | 0.05 | ⊙ | ⊙ | 600 | 550 | ⊙ | Example |
| 509 | 2500 | 0.05 | ⊙ | ⊙ | 600 | 550 | ⊙ | Example |
| 510 | 2400 | 0.03 | ⊙ | ⊙ | 600 | 550 | ⊙ | Example |
| 511 | 1500 | 0.23 | ○ | ○ | 550 | 500 | ⊙ | Example |
| 512 | 1100 | 1.9 | Δ | Δ | 400 | 300 | ⊙ | Example |
| 513 | 2800 | 0.06 | ⊙ | ⊙ | 650 | 600 | ⊙ | Example |
| 514 | 2800 | 0.06 | ⊙ | ⊙ | 650 | 600 | ⊙ | Example |
| 515 | 1500 | 0.12 | ○ | ○ | 400 | 350 | ⊙ | Example |
| 516 | 1500 | 0.13 | ⊙ | ⊙ | 450 | 400 | ⊙ | Example |
| 517 | 1400 | 0.15 | ○ | ○ | 400 | 350 | ⊙ | Example |
| 518 | 1800 | 0.10 | ⊙ | ⊙ | 450 | 400 | ⊙ | Example |
| 519 | 1800 | 0.11 | ⊙ | ⊙ | 450 | 400 | ⊙ | Example | note)—: not measurable (∞)

Example 6

Metal sheets coated with a urethane-epoxy type resin film containing electrically conducting particles or other particles controlled in the particle size distribution were evaluated on the aptitude as a fuel tank material and the results are shown in Table 11. In addition to the items of the performance evaluation in Example 1 except for the corrosion resistance of the end face, the seam weldability test and corrosion resistance test simulating the inner surface side of tank described in Example 3 were performed.

TABLE 11

| | Specification of Coated Metal Sheet | | | | | | | | | |
| | Base Sheet for Coating | | Electrically Conducting Particles | | | | | Rust-Preventive Pigment | | Film Thickness, |
| | | | | | Mode value for Number Distribution | | Mode Value for Volume Distribution, μm | Maximum Particle Size, μm | | | |
| No. | *¹Kind | *²Undercoating | *³Kind | Vol % | Mode Value, μm | Number of Particles, % | | | *⁴Kind | Vol % | μm |
|---|---|---|---|---|---|---|---|---|---|---|---|
| 601 | ZL | trivalent Cr | Particle 1 | 10 | 0.40 | 7 | 18.5 | 23.8 | — | — | 10 |
| 602 | ZL | trivalent Cr | Particle 23 | 25 | 0.40 | 7 | 18.5 | 23.8 | Pigment 1 | 10 | 10 |
| 603 | ZL | trivalent Cr | Particle 23 | 35 | 0.40 | 7 | 18.5 | 23.8 | Pigment 1 | 10 | 10 |
| 604 | ZL | trivalent Cr | Particle 24 | 25 | 0.15 | 7 | 3.3 | 20.4 | Pigment 1 | 10 | 10 |
| 605 | ZL | trivalent Cr | Particle 25 | 25 | 0.95 | 7 | 23.3 | 29.6 | Pigment 1 | 10 | 10 |
| 606 | ZL | trivalent Cr | Particle 26 | 25 | 2.00 | 7 | 45.0 | 55.2 | Pigment 1 | 10 | 10 |
| 607 | ZL | Zr-based treatment | Particle 23 | 25 | 0.40 | 7 | 18.5 | 23.8 | Pigment 1 | 10 | 10 |
| 608 | ZL | Zr-based treatment | Particle 23 | 25 | 0.40 | 7 | 18.5 | 23.8 | Pigment 2 | 10 | 25 |
| 609 | ZL | Zr-based treatment | Particle 23 | 25 | 0.40 | 7 | 18.5 | 23.8 | Pigment 3 | 10 | 10 |
| 610 | ZL | trivalent Cr | Particle 15 | 25 | 0.70 | 7 | 20.2 | 29.5 | Pigment 1 | 10 | 10 |
| 611 | ZL | trivalent Cr | Particle 16 | 35 | 0.80 | 7 | 22.3 | 31.3 | Pigment 1 | 10 | 10 |
| 612 | Sn—Zn | trivalent Cr | Particle 1 | 10 | 0.40 | 7 | 18.5 | 23.8 | — | — | 10 |
| 613 | Sn—Zn | trivalent Cr | Particle 23 | 25 | 0.40 | 7 | 18.5 | 23.8 | Pigment 1 | 10 | 10 |
| 614 | Sn—Zn | trivalent Cr | Particle 23 | 35 | 0.40 | 7 | 18.5 | 23.8 | Pigment 1 | 10 | 10 |
| 615 | Sn—Zn | trivalent Cr | Particle 23 | 45 | 0.40 | 7 | 18.5 | 23.8 | Pigment 1 | 10 | 10 |
| 616 | Sn—Zn | trivalent Cr | Particle 23 | 60 | 0.40 | 7 | 18.5 | 23.8 | Pigment 1 | 10 | 10 |
| 617 | Sn—Zn | trivalent Cr | Particle 24 | 25 | 0.15 | 7 | 3.3 | 20.4 | Pigment 1 | 10 | 10 |
| 618 | Sn—Zn | trivalent Cr | Particle 25 | 25 | 0.95 | 7 | 23.3 | 29.6 | Pigment 1 | 10 | 10 |
| 619 | Sn—Zn | trivalent Cr | Particle 27 | 25 | 1.55 | 7 | 35.9 | 43.3 | Pigment 1 | 10 | 10 |
| 620 | Sn—Zn | trivalent Cr | Particle 26 | 25 | 2.00 | 7 | 45.0 | 55.2 | Pigment 1 | 10 | 10 |
| 621 | Sn—Zn | Ti-based treatment 2 | Particle 23 | 25 | 0.40 | 7 | 18.5 | 23.8 | Pigment 1 | 10 | 10 |
| 622 | Sn—Zn | Ti-based treatment 2 | Particle 23 | 25 | 0.40 | 7 | 18.5 | 23.8 | Pigment 2 | 10 | 25 |

TABLE 11-continued

Specification of Coated Metal Sheet

| | Base Sheet for Coating | | | Electrically Conducting Particles | | Mode value for Number Distribution | | Mode Value for Volume Distribution, μm | Maximum Particle Size, μm | Rust-Preventive Pigment | | Film Thickness, μm |
|---|---|---|---|---|---|---|---|---|---|---|---|---|
| No. | *¹Kind | *²Undercoating | *³Kind | | Vol % | Mode Value, μm | Number of Particles, % | | | *⁴Kind | Vol % | |
| 623 | Sn—Zn | Ti-based treatment 2 | Particle 23 | | 25 | 0.40 | 7 | 18.5 | 23.8 | Pigment 3 | 10 | 10 |

*¹ZL: zinc-12% nickel electroplated steel sheet (plating coverage: 40 g/m²)
Sn-hot-dip tin-8% zinc plated steel sheet
zinc: (plating coverage: 40 g/m²)
*²trivalent chromium: trivalent chromium-treated film (film coverage: 50 mg/m² [in terms of chromium])
titanium-based treatment 2: titanium compound-resin-phosphoric acid (film coverage: 300 mg/m²)
zirconium-based treatment: zirconium compound-silane coupling agent-silica system (film coverage: 200 mg/m²)
*³Particle 1: 76%-silicon-containing ferrosilicon particle
Particle 15: iron phosphide ($Fe_2P_5$) particle
Particle 16: zinc powder
Particle 23: Particle 1 (99 vol %) + stainless steel particle (1 vol %)
Particle 24: Particle 5 (99 vol %) + stainless steel particle (1 vol %)
Particle 25: Particle 7 (99 vol %) + stainless steel particle (1 vol %)
Particle 26: Particle 10 (99 vol %) + stainless steel particle (1 vol %)
Particle 27: Particle 9 (99 vol %) + stainless steel particle (1 vol %)
*⁴Pigment 1: magnesium secondary phosphate (50 parts by mass) + baked $Mn_2O_3 \cdot V_2O_5$ (50 parts by mass)
Pigment 2: a 1/1 (by mol) mixture of $Ca_3(PO_4)_2$ and $V_2O_5$
Pigment 3: a 1/1 (by mol) mixture (50 parts by mass) of $Ca_3(PO_4)_2$ and $V_2O_5$ + fumed silica (50 parts by mass)

The results are shown in Table 12. It is seen that when the size distribution of the electrically conducting particle is controlled to have a relationship satisfying a predetermined correlation expression among the mode value Mn for the number distribution every each particle size of the electrically conducting particles, the mode value Mv at the volume distribution in relation to particle size of the electrically conducting particles and the thickness H of the coat layer, the coated steel sheet is excellent in the weldability, formability and corrosion resistance and also suited as a fuel tank material.

Nos. 601, 606, 612, 616 and 620 for comparison show coated metal sheets out of the scope of the present invention. In Nos. 601 and 612 where the amount of the electrically conducting particle is small, the weldability is poor. In Nos. 606 and 620 where the mode value Mn for the number distribution of the electrically conducting particle is large and H is less than 5 Mn, the formability and corrosion resistance are bad. In No. 616 where the amount of the electrically conducting particles is too large, the formability decreases.

TABLE 12

Performance Evaluation Results

| | | | Formability | | Corrosion Resistance | | | Inner | |
| | | | | | Cycle | Cycle | | | |
| No. | Weldability, dotting number | Electric Conductivity, mΩ | Cylindrical Drawing, appearance | Beading, appearance | Number of Cylindrical Drawn Part | Number of Beaded Part | Seam Weldability | Surface Corrision Resistance | Remarks |
|---|---|---|---|---|---|---|---|---|---|
| 601 | 0 | —note) | ⊙ | ⊙ | 300 | 250 | X | ◯ | Comparison |
| 602 | 2000 | 0.06 | ⊙ | ⊙ | 550 | 450 | ⊙ | ◯ | Example |
| 603 | 1300 | 0.08 | ⊙ | ⊙ | 550 | 400 | ◯ | ◯ | Example |
| 604 | 1300 | 0.05 | ⊙ | ⊙ | 500 | 350 | ◯ | ◯ | Example |
| 605 | 2000 | 0.04 | ⊙ | ⊙ | 450 | 350 | ⊙ | ◯ | Example |
| 606 | 1100 | 0.06 | ⊙ | ⊙ | 250 | 200 | Δ | ◯ | Comparison |
| 607 | 2000 | 0.06 | ⊙ | ⊙ | 550 | 450 | ⊙ | ◯ | Example |
| 608 | 1400 | 0.05 | ⊙ | ⊙ | 550 | 450 | ◯ | ◯ | Example |
| 609 | 2400 | 0.03 | ◯ | ◯ | 250 | 200 | ⊙ | ◯ | Example |
| 610 | 2000 | 0.06 | ⊙ | ⊙ | 500 | 400 | ⊙ | ◯ | Example |
| 611 | 2000 | 0.07 | ⊙ | ⊙ | 500 | 400 | ⊙ | ⊙ | Example |
| 612 | 0 | —note) | ⊙ | ⊙ | 400 | 300 | X | ⊙ | Comparison |
| 613 | 400 | 0.07 | ⊙ | ⊙ | 650 | 500 | ⊙ | ⊙ | Example |
| 614 | 500 | 0.07 | ⊙ | ⊙ | 650 | 500 | ⊙ | ⊙ | Example |
| 615 | 500 | 0.07 | ◯ | ◯ | 650 | 500 | ⊙ | ⊙ | Example |
| 616 | 500 | 0.08 | Δ | Δ | 400 | 350 | ⊙ | ⊙ | Comparison |
| 617 | 450 | 0.06 | ⊙ | ⊙ | 650 | 500 | ◯ | ⊙ | Example |
| 618 | 500 | 0.05 | ⊙ | ⊙ | 550 | 400 | ⊙ | ⊙ | Example |

TABLE 12-continued

Performance Evaluation Results

| | | | Formability | | Corrosion Resistance | | | | |
| | | | | | Cycle | Cycle | | Inner | |
| No. | Weldability, dotting number | Electric Conductivity, mΩ | Cylindrical Drawing, appearance | Beading, appearance | Number of Cylindrical Drawn Part | Number of Beaded Part | Seam Weldability | Surface Corrision Resistance | Remarks |
|---|---|---|---|---|---|---|---|---|---|
| 619 | 450 | 0.08 | ◯ | ◯ | 350 | 250 | ◯ | ⊙ | Example |
| 620 | 400 | 0.08 | Δ | Δ | 350 | 250 | Δ | ⊙ | Comparison |
| 621 | 500 | 0.07 | ⊙ | ⊙ | 650 | 500 | ⊙ | ⊙ | Example |
| 622 | 450 | 0.07 | ⊙ | ⊙ | 500 | 400 | ◯ | ⊙ | Example |
| 623 | 500 | 0.05 | ◯ | ◯ | 250 | 200 | ⊙ | ⊙ | Example |

[note]—: not measurable (∞)

Example 7

First, in the following Nos. 1 to 46, the contents of the coating material and undercoating agent where a polyol, a resin having mixed therein a blocked product, and an epoxy resin or an adduct thereof are blended with a rust inhibitor and an electrically conducting particle are described below. Next, Examples of the present invention and Comparative Examples are described.

The contents of Examples and Comparative Examples are shown in Tables 20 to 23. In Examples and Comparative Examples, the electrically conducting particle of Nos. 30 to 38 shown in Table 17 and/or the rust inhibitor of Nos. 25 to 29 in Table 18 were blended•dispersed at the blending ratio shown in Tables 20 to 23 in a resin where the polyol of Nos. 1 to 5 in Table 13, the blocked product of Nos. 6 to 8 in Table 14 and/or the epoxy resin or an adduct thereof of Nos. 9 to 11 in Table 15 were blended at the ratio of Nos. 12 to 24 in Table 16, and the obtained coating material was applied to a plated steel sheet subjected to an undercoating treatment, and then heated to give a peak steel temperature of 220° C., whereby the organic film was formed. The contents of the undercoating treatment are shown in Table 19. The plated steel sheet used had a thickness of 0.8 mm and the construction material used for the steel sheet was free from cracking even when bent at 180° with intervention of a spacer having a thickness of 0.8 mm.

As for the performance evaluation in Examples of the present invention and Comparative Examples, a formability test, a test on corrosion resistance after cup drawing, and a weldability test were performed. Also, the presence or absence of hexavalent chromium and trivalent chromium was examined.

(1) Formability Test

The sheet after coating was bent at 180° C. with intervention of a spacer having a thickness of 0.8 mm, and the film state in the bent part was observed by a magnifier at a magnification of 10 times.

In the evaluation of the film state, the sample was rated 4 when the formed part was completely normal without lackluster or the like in the formed part, rated 3 when the formed part was slightly changed in the color tone but had no cracking or separation, rated 2 when slightly cracked, and rated 1 when cracking was observed even without using a magnifier.

(2) Test on Corrosion Resistance after Cup Drawing

The steel sheet after coating was formed by cylindrical cup drawing such that the coated surface came to the outer side, and then subjected to a cycle corrosion test. In the cylindrical cup drawing, the steel sheet was coated with a rust-preventive oil, left in the erected state for 1 hour to 1 hour and 30 minutes, and then drawn at a drawing ratio of 1.8 by using a metal mold having a punch diameter of 50 mm, a punch shoulder R of 3 mm, a die diameter of 52 mm and a die shoulder R of 3 mm.

In the cycle corrosion test, one cycle was 8 hours in total consisting of salt water spraying for 2 hours, drying for 2 hours and dampening for 2 hours. The salt water spraying was performed under the conditions according to JIS-K5400. The drying conditions were a temperature of 50° C. and a humidity of 30% RH or less, and the dampening conditions were a temperature of 35° C. and a humidity of 95% RH or more.

In the evaluation of the corrosion resistance, the sample was rated 4 when red rust indicating the decrease in the thickness of the steel sheet was not generated and white rust indicating the corrosion of the plating layer was covering the sample in an area ratio of 50% or less of the entire area, rated 3 when red rust indicating the decrease in the thickness of the steel sheet was not generated even after 300 cycles, rated 2 when red rust was not observed after 100 cycles but observed after 300 cycles, and rated 1 when red rust was observed after 100 cycles.

(3) Weldability Test

Two coated steel sheets were combined and subjected to a continuous spot welding test and the dotting number where continuous welding could be performed was evaluated. The welding conditions were such that the electrode tip diameter was 4 mm, the applied pressure was 300 kg and the electrification time in one welding operation was 0.2 seconds. The welding current value was determined by the following procedure. That is, the current value was gradually increased from 3 kA at every 0.2 kA under the conditions that the electrode tip diameter was 4 mm, the applied pressure was 300 kg and the electrification time in one welding operation was 0.2 seconds, and (the current value when the nugget diameter first exceeded 3.6 mm+the current value when the coated steel sheet after welding was first strongly welded to the electrode)÷2 was determined as the welding current value in the continuous welding test.

In the evaluation of continuous weldability, the sample was rated 3 when a nugget diameter of 3.6 mm was ensured over a continuous dotting number of 500, rated 2 when ensured at a dotting number of 100 to 500, and rated 1 when ensured at a dotting number of less than 100.

The presence or absence of hexavalent chromium and trivalent chromium is shown in the item of "chromium class" of Tables 22 and 23. The class was "3" when the entire coated steel sheet was free from trivalent chromium and hexavalent chromium, "2" when hexavalent chromium was not contained and trivalent chromium was contained, and "1" when hexavalent chromium was contained.

TABLE 13

Precursor of Polyester Polyol Having at Least 3 Functional Groups

| No. | Dicarboxylic Acid | Glycol | Polyol |
|---|---|---|---|
| 701 | maleic acid | propylene glycol | trimethylolpropane |
| 702 | maleic acid | propylene glycol | glycerin |
| 703 | maleic acid | 1,6-hexanediol | glycerin |
| 704 | isophthalic acid | propylene glycol | trimethylolpropane |
| 705 | isophthalic acid | 1,6-hexanediol | glycerin |
| a | maleic acid | 1,6-hexanediol | none |

TABLE 14

Precursor of Blocked Product of Prepolymer Having NCO Group at the End, Obtained by Reaction of Organic Polyisocyanate or Blocked Product Thereof with Active Hydrogen Compound

| No. | Compound Having NCO Group | Blocking Agent |
|---|---|---|
| 706 | tetramethylene diisocyanate | phenol |
| 707 | tetramethylene diisocyanate | isopropyl alcohol |
| 708 | m-xylene diisocyanate | isopropyl alcohol |

TABLE 15

Epoxy Resin Having at Least One Secondary Hydroxyl Group or Adduct Thereof

| No. | Epoxy Resin | Addition Agent |
|---|---|---|
| 709 | epoxy resin of formula 2 shown below where n is 3 on average | ε-caprolactone |
| 710 | epoxy resin of formula 2 shown below where n is 8 on average | ε-caprolactone |
| 711 | epoxy resin of formula 2 shown below where n is 8 on average | ethylene oxide |

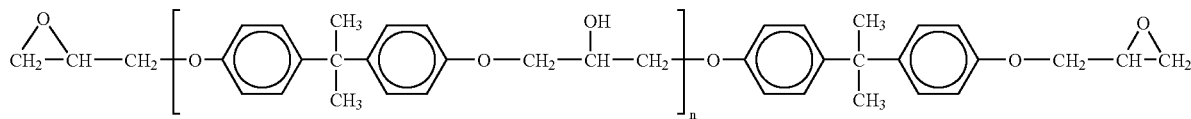

TABLE 16

Composition of Organic Resin

| No. | (a) Precursor of Table 2 | (b) Precursor of Table 3 | (c) Resin of Table 4 | OH Group equivalent of (a)/regenerated NCO group equivalent of (b), or OH group equivalent of (a) + (c)/ regenerated NCO group equivalent of (b) | Mass ratio of (a):(c) | Remarks |
|---|---|---|---|---|---|---|
| 712 | No. 701 | No. 706 | none | 1/1 | — | Invention |
| 713 | No. 701 | No. 707 | none | 1/1 | — | |
| 714 | No. 701 | No. 708 | none | 1/1 | — | |
| 715 | No. 702 | No. 706 | none | 1.2/1 | — | |
| 716 | No. 703 | No. 707 | none | 1.2/1 | — | |
| 717 | No. 704 | No. 708 | none | 0.8/1 | — | |
| 718 | No. 705 | No. 707 | none | 0.9/1 | — | |
| 719 | No. 701 | No. 706 | No. 709 | 1/1 | 7:3 | |
| 720 | No. 701 | No. 707 | No. 710 | 1/1 | 7:3 | |
| 721 | No. 705 | No. 706 | No. 710 | 1/1 | 6:4 | |
| 722 | No. 705 | No. 707 | No. 709 | 1/1 | 6:4 | |
| 723 | No. 705 | No. 707 | No. 711 | 1/1 | 6:4 | |
| 724 | No. 705 | No. 708 | No. 709 | 1/1 | 6:4 | |
| A | No. a | No. 707 | No. 709 | 1/1 | 6:4 | Comparison |
| B | No. a | No. 708 | No. 709 | 1/1 | 6:4 | |

TABLE 17

| No. | Electrically Conducting Particle Kind |
|---|---|
| 730 | aluminum |
| 731 | zinc |
| 732 | tin |
| 733 | common steel |
| 734 | stainless steel |
| 735 | iron phosphide ($Fe_2P_5$) |
| 736 | ferrosilicon (Fe: 55%, Si: 45%) |
| 737 | ferrosilicon (Fe: 20%, Si: 80%) |
| 738 | silicon |

TABLE 18

| No. | Rust Inhibitor Kind |
|---|---|
| 725 | a 1/1 (by mass) mixture of magnesium secondary phosphate and baked $Mn_2O_3 \cdot V_2O_5$ |
| 726 | a 1/1 (by mol) mixture of $Ca_3(PO_4)_2$ and $V_2O_5$ |
| 727 | strontium chromate |
| 728 | magnesium secondary phosphate |
| 729 | baked $2CaO \cdot V_2O_5$ |

TABLE 19

| No. | Undercoating Chemicals (component ratio by mass) | Treating Method | Hexavalent Chromium | Trivalent Chromium |
|---|---|---|---|---|
| 739 | aqueous solution of hexavalent chromic acid | drying at a sheet temperature of 60° C. after coating | + | + |
| 740 | aqueous solution of hexavalent chromic acid (50 parts) + fine particulate silica (50 parts) | drying at a sheet temperature of 60° C. after coating | + | + |
| 741 | aqueous solution of 50% reduced chromic acid (100 parts) + fine particulate silica (30 parts) + etching fluoride (10 parts) | drying at a sheet temperature of 60° C. after coating | − | + |
| 742 | aqueous solution of hexavalent chromic acid | electro deposition of trivalent Cr | − | + |
| 743 | aqueous solution of trivalent chromic acid | drying at a sheet temperature of 60° C. after coating | − | − |
| 744 | acrylolefin (100 parts) + silane coupling agent (10 parts) + silica (30 parts) | drying at a sheet temperature of 60° C. after coating | − | − |
| 745 | acrylolefin (100 parts) + silane coupling agent (10 parts) + etching floride (10 parts) | drying at a sheet temperature of 60° C. after coating | − | − |
| 746 | acrylolefin (100 parts) + silane coupling agent (10 parts) + silica (30 parts) + etching fluoride (10 parts) | drying at a sheet temperature of 60° C. after coating | − | − |

+: contained,
−: not contained

TABLE 20

Specification (1 of 4) of Examples of the Invention and Comparative Examples

| | Composition of Organic Film | | | | | | | |
|---|---|---|---|---|---|---|---|---|
| | Organic Resin | | Electrically Conducting Pigment | | Rust-Preventive Pigment | | Thickness | *Coated |
| | Kind | Vol % | Kind | Vol % | Kind | Vol % | (μm) | Surface |
| Example 1 | No. 712 | 65 | No. 737 | 35 | — | 0 | 10 | both |
| Example 2 | No. 713 | 65 | No. 737 | 35 | — | 0 | 10 | both |
| Example 3 | No. 714 | 65 | No. 737 | 35 | — | 0 | 10 | both |
| Example 4 | No. 715 | 65 | No. 737 | 35 | — | 0 | 10 | both |
| Example 5 | No. 716 | 65 | No. 737 | 35 | — | 0 | 10 | both |
| Example 6 | No. 717 | 65 | No. 737 | 35 | — | 0 | 10 | both |
| Example 7 | No. 718 | 65 | No. 737 | 35 | — | 0 | 10 | both |
| Example 8 | No. 719 | 65 | No. 737 | 35 | — | 0 | 10 | both |
| Example 9 | No. 720 | 65 | No. 737 | 35 | — | 0 | 10 | both |
| Example 10 | No. 721 | 65 | No. 737 | 35 | — | 0 | 10 | both |
| Example 11 | No. 722 | 65 | No. 737 | 35 | — | 0 | 10 | both |
| Example 12 | No. 723 | 65 | No. 737 | 35 | — | 0 | 10 | both |
| Example 13 | No. 724 | 65 | No. 737 | 35 | — | 0 | 10 | both |
| Example 14 | No. 712 | 85 | No. 737 | 15 | — | 0 | 10 | both |
| Example 15 | No. 712 | 65 | No. 737 | 35 | — | 0 | 10 | both |
| Example 16 | No. 719 | 85 | No. 737 | 15 | — | 0 | 10 | both |
| Example 17 | No. 722 | 65 | No. 737 | 35 | — | 0 | 10 | both |
| Example 18 | No. 723 | 65 | No. 730 | 35 | — | 0 | 10 | both |
| Example 19 | No. 719 | 65 | No. 731 | 35 | — | 0 | 10 | both |
| Example 20 | No. 719 | 65 | No. 732 | 35 | — | 0 | 10 | both |
| Example 21 | No. 719 | 65 | No. 733 | 35 | — | 0 | 10 | both |
| Example 22 | No. 719 | 65 | No. 734 | 35 | — | 0 | 10 | both |
| Example 23 | No. 719 | 65 | No. 735 | 35 | — | 0 | 10 | both |
| Example 24 | No. 719 | 65 | No. 736 | 35 | — | 0 | 10 | both |
| Example 25 | No. 719 | 65 | No. 738 | 35 | — | 0 | 10 | both |
| Example 26 | No. 719 | 60 | No. 730 | 35 | No. 725 | 5 | 10 | both |
| Example 27 | No. 719 | 60 | No. 731 | 35 | No. 725 | 5 | 10 | both |
| Example 28 | No. 719 | 60 | No. 732 | 35 | No. 725 | 5 | 10 | both |
| Example 29 | No. 719 | 60 | No. 733 | 35 | No. 725 | 5 | 10 | both |
| Example 30 | No. 719 | 60 | No. 734 | 35 | No. 725 | 5 | 10 | both |
| Example 31 | No. 719 | 60 | No. 735 | 35 | No. 725 | 5 | 10 | both |
| Example 32 | No. 719 | 60 | No. 736 | 35 | No. 725 | 5 | 10 | both |
| Example 33 | No. 719 | 60 | No. 735 | 35 | No. 726 | 5 | 10 | both |
| Example 34 | No. 719 | 60 | No. 735 | 35 | No. 727 | 5 | 10 | both |
| Example 35 | No. 719 | 60 | No. 736 | 35 | No. 728 | 5 | 10 | both |
| Example 36 | No. 719 | 60 | No. 736 | 35 | No. 729 | 5 | 10 | both |
| Example 37 | No. 719 | 65 | No. 737 | 35 | — | 0 | 10 | both |
| Example 38 | No. 719 | 65 | No. 737 | 35 | — | 0 | 10 | both |
| Example 39 | No. 719 | 65 | No. 737 | 35 | — | 0 | 10 | both |
| Example 40 | No. 719 | 65 | No. 737 | 35 | — | 0 | 10 | both |

*both: both surfaces

TABLE 21

Specification (2 of 4) of Examples of the Invention and Comparative Examples

| | Composition of Organic Film | | | | | | | |
|---|---|---|---|---|---|---|---|---|
| | Organic Resin | | Electrically Conducting Pigment | | Rust-Preventive Pigment | | Thickness | *Coated |
| | Kind | Vol % | Kind | Vol % | Kind | Vol % | (μm) | Surface |
| Example 41 | No. 719 | 65 | No. 737 | 35 | — | 0 | 10 | both |
| Example 42 | No. 719 | 65 | No. 737 | 35 | — | 0 | 10 | both |
| Example 43 | No. 719 | 65 | No. 737 | 35 | — | 0 | 10 | both |
| Example 44 | No. 719 | 40 | No. 737 | 55 | No. 725 | 5 | 10 | both |
| Example 45 | No. 719 | 65 | No. 737 | 35 | — | 0 | 5 | both |
| Example 46 | No. 719 | 65 | No. 737 | 35 | — | 0 | 7 | both |
| Example 47 | No. 719 | 65 | No. 737 | 35 | — | 0 | 15 | both |
| Example 48 | No. 719 | 65 | No. 737 | 35 | — | 0 | 10 | both |
| Example 49 | No. 719 | 65 | No. 737 | 35 | — | 0 | 10 | both |
| Example 50 | No. 719 | 65 | No. 737 | 35 | — | 0 | 10 | both |

TABLE 21-continued

Specification (2 of 4) of Examples of the Invention and Comparative Examples

| | Composition of Organic Film | | | | | | | |
|---|---|---|---|---|---|---|---|---|
| | Organic Resin | | Electrically Conducting Pigment | | Rust-Preventive Pigment | | Thickness | *Coated |
| | Kind | Vol % | Kind | Vol % | Kind | Vol % | (μm) | Surface |
| Example 51 | No. 719 | 65 | No. 737 | 35 | — | 0 | 10 | both |
| Example 52 | No. 719 | 65 | No. 737 | 35 | — | 0 | 10 | both |
| Example 53 | No. 719 | 65 | No. 737 | 35 | — | 0 | 10 | both |
| Comparative Example 1 | nylon | 65 | No. 737 | 35 | — | 0 | 10 | both |
| Comparative Example 2 | epoxy | 65 | No. 737 | 35 | — | 0 | 10 | both |
| Comparative Example 3 | melamine alkyd | 65 | No. 737 | 35 | — | 0 | 10 | both |
| Comparative Example 4 | polyester | 30 | No. 737 | 70 | — | 0 | 10 | both |
| Comparative Example 5 | acryl | 90 | No. 737 | 10 | — | 0 | 10 | both |
| Comparative Example 6 | No. 719 | 100 | — | 0 | — | 0 | 10 | both |
| Comparative Example 7 | No. 720 | 100 | — | 0 | — | 0 | 3 | both |
| Comparative Example 8 | No. 721 | 100 | — | 0 | — | 0 | 20 | both |
| Comparative Example 9 | No. A | 65 | No. 737 | 0 | — | 0 | 10 | both |
| Comparative Example 10 | No. B | 65 | No. 737 | 35 | — | 0 | 10 | both |
| Comparative Example 11 | No. A | 65 | No. 737 | 35 | — | 0 | 10 | both |
| Comparative Example 12 | No. A | 65 | No. 737 | 35 | — | 0 | 10 | both |

*both: both surfaces

TABLE 22

Specification (3 of 4) of Examples of the Invention and Comparative Examples

| | Plated Layer | | Undercoating Layer | | |
|---|---|---|---|---|---|
| | Kind | Coverage (g/m²) | Kind | Coverage (mg/m²) | Chromium Class |
| Example 1 | Zn—Ni electroplating | 40 | No. 745 | 50 | 3 |
| Example 2 | Zn—Ni electroplating | 40 | No. 745 | 50 | 3 |
| Example 3 | Zn—Ni electroplating | 40 | No. 745 | 50 | 3 |
| Example 4 | Zn—Ni electroplating | 40 | No. 745 | 50 | 3 |
| Example 5 | Zn—Ni electroplating | 40 | No. 745 | 50 | 3 |
| Example 6 | Zn—Ni electroplating | 40 | No. 745 | 50 | 3 |
| Example 7 | Zn—Ni electroplating | 40 | No. 745 | 50 | 3 |
| Example 8 | Zn—Ni electroplating | 40 | No. 745 | 50 | 3 |
| Example 9 | Zn—Ni electroplating | 40 | No. 745 | 50 | 3 |
| Example 10 | Zn—Ni electroplating | 40 | No. 745 | 50 | 3 |
| Example 11 | Zn—Ni electroplating | 40 | No. 745 | 50 | 3 |
| Example 12 | Zn—Ni electroplating | 40 | No. 745 | 50 | 3 |
| Example 13 | Zn—Ni electroplating | 40 | No. 745 | 50 | 3 |
| Example 14 | Zn—Ni electroplating | 40 | No. 745 | 50 | 3 |
| Example 15 | Zn—Ni electroplating | 40 | No. 745 | 50 | 3 |
| Example 16 | Zn—Ni electroplating | 40 | No. 745 | 50 | 3 |
| Example 17 | Zn—Ni electroplating | 40 | No. 745 | 50 | 3 |
| Example 18 | Zn—Ni electroplating | 40 | No. 745 | 50 | 3 |
| Example 19 | Zn—Ni electroplating | 40 | No. 745 | 50 | 3 |
| Example 20 | Zn—Ni electroplating | 40 | No. 745 | 50 | 3 |
| Example 21 | Zn—Ni electroplating | 40 | No. 745 | 50 | 3 |
| Example 22 | Zn—Ni electroplating | 40 | No. 745 | 50 | 3 |
| Example 23 | Zn—Ni electroplating | 40 | No. 745 | 50 | 3 |
| Example 24 | Zn—Ni electroplating | 40 | No. 745 | 50 | 3 |
| Example 25 | Zn—Ni electroplating | 40 | No. 745 | 50 | 3 |
| Example 26 | Zn—Ni electroplating | 40 | No. 745 | 50 | 3 |
| Example 27 | Zn—Ni electroplating | 40 | No. 745 | 50 | 3 |
| Example 28 | Zn—Ni electroplating | 40 | No. 745 | 50 | 3 |
| Example 29 | Zn—Ni electroplating | 40 | No. 745 | 50 | 3 |
| Example 30 | Zn—Ni electroplating | 40 | No. 745 | 50 | 3 |
| Example 31 | Zn—Ni electroplating | 40 | No. 745 | 50 | 3 |
| Example 32 | Zn—Ni electroplating | 40 | No. 745 | 50 | 3 |
| Example 33 | Zn—Ni electroplating | 40 | No. 745 | 50 | 3 |
| Example 34 | Zn—Ni electroplating | 40 | No. 745 | 50 | 3 |
| Example 35 | Zn—Ni electroplating | 40 | No. 745 | 50 | 3 |
| Example 36 | Zn—Ni electroplating | 40 | No. 745 | 50 | 3 |
| Example 37 | Zn—Ni electroplating | 40 | No. 739 | 50 | 1 |
| Example 38 | Zn—Ni electroplating | 40 | No. 740 | 50 | 1 |
| Example 39 | Zn—Ni electroplating | 40 | No. 741 | 50 | 2 |
| Example 40 | Zn—Ni electroplating | 40 | No. 742 | 50 | 2 |

TABLE 23

Specification (4 of 4) of Examples of the Invention and Comparative Examples

| | Plated Layer | | Undercoating Layer | | |
|---|---|---|---|---|---|
| | Kind | Coverage (g/m²) | Kind | Coverage (mg/m²) | Chromium Class |
| Example 41 | Zn—Ni electroplating | 40 | No. 743 | 50 | 2 |
| Example 42 | Zn—Ni electroplating | 40 | No. 744 | 50 | 3 |
| Example 43 | Zn—Ni electroplating | 40 | No. 746 | 50 | 3 |
| Example 44 | Zn—Ni electroplating | 40 | No. 745 | 50 | 3 |
| Example 45 | Zn—Ni electroplating | 40 | No. 745 | 50 | 3 |
| Example 46 | Zn—Ni electroplating | 40 | No. 745 | 50 | 3 |
| Example 47 | Zn—Ni electroplating | 40 | No. 745 | 50 | 3 |
| Example 48 | Zn—Ni electroplating | 40 | No. 745 | 50 | 3 |
| Example 49 | Zn—Ni electroplating | 40 | No. 745 | 50 | 3 |
| Example 50 | Zn—Ni electroplating | 20 | No. 745 | 50 | 3 |
| Example 51 | Zn—Ni electroplating | 30 | No. 745 | 50 | 3 |
| Example 52 | hot-dip galvanization | 60 | No. 745 | 50 | 3 |
| Example 53 | alloyed hot-dip galvanization | 50 | No. 745 | 50 | 3 |
| Comparative Example 1 | Zn—Ni electroplating | 40 | No. 745 | 50 | 3 |
| Comparative Example 2 | Zn—Ni electroplating | 40 | No. 745 | 50 | 3 |
| Comparative Example 3 | Zn—Ni electroplating | 40 | No. 745 | 50 | 3 |
| Comparative Example 4 | Zn—Ni electroplating | 40 | No. 745 | 50 | 3 |
| Comparative Example 5 | Zn—Ni electroplating | 40 | No. 745 | 50 | 3 |
| Comparative Example 6 | Zn—Ni electroplating | 40 | No. 745 | 50 | 3 |
| Comparative Example 7 | Zn—Ni electroplating | 40 | No. 745 | 50 | 3 |
| Comparative Example 8 | Zn—Ni electroplating | 40 | No. 745 | 50 | 3 |
| Comparative Example 9 | Zn—Ni electroplating | 40 | No. 745 | 5 | 3 |
| Comparative Example 10 | Zn—Ni electroplating | 40 | No. 745 | 150 | 3 |
| Comparative Example 11 | Zn electroplating | 5 | No. 745 | 50 | 3 |
| Comparative Example 12 | hot-dip galvanization | 120 | No. 745 | 50 | 3 |

TABLE 24

Evaluation Results (1 of 2) of Examples of the Invention and Comparative Examples

| | Formability | Corrosion Resistance after Cup Drawing | Weldability |
|---|---|---|---|
| Example 1 | 3 | 4 | 3 |
| Example 2 | 3 | 4 | 3 |
| Example 3 | 3 | 4 | 3 |
| Example 4 | 3 | 4 | 3 |
| Example 5 | 3 | 4 | 3 |
| Example 6 | 3 | 4 | 3 |
| Example 7 | 3 | 4 | 3 |
| Example 8 | 4 | 4 | 3 |
| Example 9 | 4 | 4 | 3 |
| Example 10 | 4 | 4 | 3 |
| Example 11 | 4 | 4 | 3 |
| Example 12 | 4 | 4 | 3 |
| Example 13 | 4 | 4 | 3 |
| Example 14 | 4 | 4 | 3 |
| Example 15 | 3 | 4 | 3 |
| Example 16 | 4 | 4 | 3 |
| Example 17 | 4 | 4 | 3 |
| Example 18 | 4 | 3 | 3 |
| Example 19 | 4 | 3 | 3 |
| Example 20 | 4 | 3 | 3 |
| Example 21 | 4 | 3 | 3 |
| Example 22 | 4 | 3 | 3 |
| Example 23 | 4 | 3 | 3 |
| Example 24 | 4 | 3 | 3 |
| Example 25 | 4 | 4 | 3 |
| Example 26 | 4 | 4 | 3 |
| Example 27 | 4 | 4 | 3 |
| Example 28 | 4 | 4 | 3 |
| Example 29 | 4 | 4 | 3 |
| Example 30 | 4 | 4 | 3 |
| Example 31 | 4 | 4 | 3 |
| Example 32 | 4 | 4 | 3 |
| Example 33 | 4 | 4 | 3 |
| Example 34 | 4 | 4 | 3 |
| Example 35 | 4 | 4 | 3 |
| Example 36 | 4 | 4 | 3 |
| Example 37 | 3 | 4 | 3 |
| Example 38 | 3 | 4 | 3 |
| Example 39 | 3 | 4 | 3 |
| Example 40 | 3 | 4 | 3 |

TABLE 25

Evaluation Results (2 of 2) of Examples of the Invention and Comparative Examples

| | Outer Surface Corrosion Resistance | Inner Surface Corrosion Resistance | Formability |
|---|---|---|---|
| Example 41 | 3 | 4 | 3 |
| Example 42 | 3 | 4 | 3 |
| Example 43 | 3 | 4 | 3 |
| Example 44 | 2 | 3 | 3 |
| Example 45 | 4 | 2 | 3 |
| Example 46 | 4 | 3 | 3 |
| Example 47 | 3 | 4 | 2 |
| Example 48 | 4 | 4 | 3 |
| Example 49 | 4 | 4 | 2 |
| Example 50 | 4 | 4 | 3 |
| Example 51 | 4 | 4 | 3 |
| Example 52 | 4 | 4 | 2 |
| Example 53 | 4 | 4 | 3 |
| Comparative Example 1 | 1 | not tested | not tested |
| Comparative Example 2 | 1 | not tested | not tested |
| Comparative Example 3 | 1 | not tested | not tested |
| Comparative Example 4 | 1 | not tested | not tested |
| Comparative Example 5 | 1 | not tested | not tested |
| Comparative Example 6 | 4 | not tested | 1 |
| Comparative Example 7 | 4 | not tested | 1 |
| Comparative Example 8 | 4 | not tested | 1 |
| Comparative Example 9 | 1 | not tested | not tested |
| Comparative Example 10 | 1 | not tested | not tested |
| Comparative Example 11 | 1 | not tested | not tested |

TABLE 25-continued

Evaluation Results (2 of 2) of Examples of the Invention and Comparative Examples

| | Outer Surface Corrosion Resistance | Inner Surface Corrosion Resistance | Formability |
|---|---|---|---|
| Comparative Example 12 | 1 | not tested | not tested |

Evaluation results are as shown in Tables 24 and 25. In Examples 1 to 53 of the present invention, the score is 2 or higher in all of the formability test, test on corrosion resistance after cup drawing and weldability test. Depending on the constitution of Examples, a higher performance, having a score of 3, is exhibited.

In the case of intending not to contain trivalent chromium and hexavalent chromium, Examples in the "chromium class 3" come under the case, and in the case of intending not to contain hexavalent chromium, Examples in the "chromium class 2" come under the case.

Comparative Examples 1 to 12 in Tables 24 and 25 show cases of using a coated steel sheet out of the scope of the present invention.

In Comparative Examples 1, 2 and 3 where the resins are differing in the kind, the formability is bad.

In Comparative Example 4 where the resin content in the film is small, the formability is bad.

In Comparative Examples 5 and 6 where the content of the electrically conducting particle in the film is small, the weldability is bad.

In Comparative Example 7 where the film coverage is too small, the corrosion resistance is bad.

In Comparative Example 8 where the film coverage is too large, the weldability is bad and the formability is slightly worsened.

In Comparative Example 9 where the undercoating coverage is too small, the corrosion resistance is bad.

In Comparative Example 10 where the undercoating coverage is too large, the weldability is bad.

In Comparative Example 11 where the plating coverage is too small, the corrosion resistance is bad.

In Comparative Example 12 where the plating coverage is too large, the weldability is bad.

Example 8

The conditions when an electrically conducting particle or rust-preventive pigment of various types was mixed in a resin system containing a urethane bond are shown in Table 26. The following five resins were used as the resin containing a urethane bond.

Resin A: A resin system produced by mixing a polyol comprising maleic acid, propylene glycol and trimethylolpropane, and a tetramethylene diisocyanate blocked with phenol at an equivalent ratio of OH group equivalent/regenerated NCO group equivalent=1/1.

Resin B: A resin system produced by mixing a polyol comprising maleic acid, propylene glycol and trimethylpropanolamine, a tetramethylene diisocyanate blocked with phenol, and an epoxy resin using $\epsilon$-caprolactone as the addition agent and having formula 2 where n is 3 on average, at an equivalent ratio of OH group equivalent/regenerated NCO group equivalent=1/1; the mass ratio between polyol and epoxy resin is 7:3.

Resin C: A resin system produced by mixing a polyol comprising isophthalic acid, 1,6-hexanediol and glycerin, an m-xylene diisocyanate blocked with isopropyl alcohol, and an epoxy resin using $\epsilon$-caprolactone as the addition agent and having formula 2 where n is 3 on average, at an equivalent ratio of OH group equivalent/regenerated NCO group equivalent=1.2/1; the mass ratio between polyol and epoxy resin is 6:4.

Resin D: Bisphenol-type epoxy resin (commercially available product)

Resin E: Acryl resin (commercially available product)

An electrically conducting particle having a predetermined particle size distribution and/or a predetermined rust inhibitor were blended•dispersed at the blending ratio shown in Table 26 in the resin prepared above and the obtained coating material was applied to a plated steel sheet subjected to an undercoating treatment, and then baked•dried at a peak steel temperature of 220° C., whereby coated metal sheets were produced. These coated metal sheets were evaluated on the weldability, formability and corrosion resistance under the same conditions as in Example 1.

TABLE 26

Specification of Coated Metal Sheet

| | Base Sheet for Coating | | Resin, | Electrically Conducting Particles | | | | | Rust-Preventive Pigment | | Film |
|---|---|---|---|---|---|---|---|---|---|---|---|
| | | | | | | Mode Value for Number Distribution | | Mode value for volume Distribution | Maximum Particle | | |
| No. | *¹Kind | *²Under-coating | Kind | *³Kind | Vol % | Mode Value, μm | Number of Particles, % | μm | Size, μm | *⁴Kind | Vol % | Thickness, μm |
| 801 | EG | Treatment 1 | Resin A | Particle 1 | 3 | 0.50 | 7 | 18.2 | 23.3 | — | — | 9 |
| 802 | EG | Treatment 1 | Resin A | Particle 1 | 15 | 0.50 | 7 | 18.2 | 23.3 | — | — | 9 |
| 803 | EG | Treatment 1 | Resin A | Particle 2 | 25 | 2.05 | 7 | 45.0 | 55.2 | — | — | 9 |
| 804 | EG | Treatment 1 | Resin A | Particle 3 | 25 | 0.50 | 7 | 18.2 | 23.3 | Pigment 1 | 5 | 9 |
| 805 | EG | Treatment 2 | Resin A | Particle 1 | 25 | 0.50 | 7 | 18.2 | 23.3 | Pigment 1 | 10 | 9 |
| 806 | EG | Treatment 1 | Resin A | Particle 1 | 65 | 0.50 | 7 | 18.2 | 23.3 | Pigment 1 | 20 | 9 |
| 807 | ZL | Treatment 1 | Resin A | Particle 1 | 25 | 0.50 | 7 | 18.2 | 23.3 | Pigment 2 | 10 | 9 |
| 808 | ZL | Treatment 1 | Resin A | Particle 1 | 25 | 0.50 | 7 | 18.2 | 23.3 | Pigment 3 | 10 | 9 |
| 809 | ZL | Treatment 1 | Resin B | Particle 1 | 25 | 0.50 | 7 | 18.2 | 23.3 | Pigment 2 | 10 | 9 |

TABLE 26-continued

Specification of Coated Metal Sheet

| | Base Sheet for Coating | | Resin, Kind | Electrically Conducting Particles | | | | | | Rust-Preventive Pigment | | Film Thickness, μm |
|---|---|---|---|---|---|---|---|---|---|---|---|---|
| | | | | | | Mode Value for Number Distribution | | Mode value for volume Distribution μm | Maximum Particle Size, μm | | | |
| No. | *¹Kind | *²Under- coating | | *³Kind | Vol % | Mode Value, μm | Number of Particles, % | | | *⁴Kind | Vol % | |
| 810 | ZL | Treatment 1 | Resin C | Particle 1 | 25 | 0.50 | 7 | 18.2 | 23.3 | Pigment 2 | 10 | 9 |
| 811 | ZL | Treatment 1 | Resin D | Particle 1 | 25 | 0.50 | 7 | 18.2 | 23.3 | Pigment 2 | 10 | 9 |
| 812 | ZL | Treatment 1 | Resin E | Particle 1 | 25 | 0.50 | 7 | 18.2 | 23.3 | Pigment 2 | 10 | 9 |

*¹EG: zinc electroplated steel sheet (plating coverage: 40 g/m²)
ZL: zinc-12% nickel electroplated steel sheet (plating coverage: 40 g/m²)
*²Treatment 1: trivalent chromium-treated film (film coverage: 50 mg/m² [in terms of chromium])
Treatment 2: acrylolefin (100 parts by mass) + silane coupling agent (10 parts by mass) + silica (30 parts by mass) + etching fluoride (10 parts by mass)
*³Particle 1: 76%-silicon-containing ferrosilicon particle
Particle 2: 76%-silicon-containing ferrosilicon particle
Particle 3: Particle 1 (95 vol %) + stainless steel particle (5 vol %)
The stainless steel particle used here had, by itself, a particle size distribution such that the mode value for number distribution was 2.5 μm, the number of particles was 10%, and the mode value for volume distribution was 10 μm.
*⁴Pigment 1: magnesium secondary phosphate (50 parts by mass) + baked $Mn_2O_3 \cdot V_2O_5$ (50 parts by mass)
Pigment 2: a 1/1 (by mol) mixture of $Ca_3(PO_4)_2$ and $V_2O_5$
Pigment 3: a 1/1 (by mol) mixture (50 parts by mass) of $Ca_3(PO_4)_2$ and $V_2O_5$ + fumed silica (50 parts by mass)

The results are shown in Table 27. By using a resin system having a urethane bond and, at the same time, using an electrically conducting particle having a particle size distribution within the scope of the present invention, weldability, formability and corrosion resistance in good balance are obtained. In the system using a resin having a urethane bond, the formability is good as compared with the epoxy resin system of Example 811 and the acryl resin system of Example 812.

Nos. 801, 803 and 806 for comparison are showing cases of using a coated metal sheet out of the scope of the present invention. In No. 801 where the amount of the electrically conducting particle is too small, the electric conductivity cannot be obtained. In No. 803 where the mode value for the number distribution is too large, the formability and the corrosion resistance are greatly decreased. In No. 806 where the amount of the electrically conducting particle is too large, the formability is greatly decreased.

TABLE 27

Performance Evaluation Results

| | | | Formability | | Corrosion Resistance | | | |
|---|---|---|---|---|---|---|---|---|
| No. | Weldability, dotting number | Electric Conductivity, mΩ | Cylindrical Drawing, appearance | Beading, appearance | Cycle Number of Cylindrical Drawn Part | Cycle Number of Beaded Part | Appearance of End Face Part | Remarks |
| 801 | 0 | —note*) | ○ | ○ | 300 | 250 | Δ | Comparison |
| 802 | 800 | 1.1 | ⊙ | ⊙ | 400 | 350 | ○ | Example |
| 803 | 1200 | 0.03 | Δ | Δ | 200 | 100 | Δ | Comparison |
| 804 | 1800 | 0.05 | ⊙ | ⊙ | 450 | 400 | ⊙ | Example |
| 805 | 1700 | 0.03 | ⊙ | ⊙ | 300 | 250 | ○ | Example |
| 806 | 1700 | 0.04 | Δ | Δ | 250 | 150 | ⊙ | Comparison |
| 807 | 2200 | 0.03 | ⊙ | ⊙ | 600 | 500 | ○ | Example |
| 808 | 2200 | 0.05 | ⊙ | ⊙ | 600 | 500 | ○ | Example |
| 809 | 2000 | 0.03 | ⊙ | ⊙ | 600 | 500 | ○ | Example |
| 810 | 2100 | 0.04 | ⊙ | ⊙ | 600 | 500 | ○ | Example |
| 811 | 1500 | 0.07 | ○ | ○ | 500 | 400 | ○ | Example |
| 812 | 1500 | 0.15 | ○ | ○ | 500 | 400 | ○ | Example | note)—: not measurable (∞)

Example 9

The steel having components shown in Table 28 was ingotted into a bloom by a normal converter-vacuum degassing treatment and the bloom was hot-rolled and then cold-rolled under ordinary conditions to obtain a cold-rolled steel sheet (thickness: 0.8 mm). By using this steel sheet as the material, various surface-treated steel sheets were produced. The hot-dip plating was performed in a line using of a Sendzimir system or a flux system. In the case of Sendzimir system, the annealing was performed within the line. The annealing temperature was from 800 to 850° C. After the plating, the plating coverage was adjusted by a gas wiping method. At this time, the plating temperature which varies according to the plating composition was set to the melting point of plating composition +40° C. The electroplating was performed in an electroplating line after annealing the cold-rolled steel sheet.

TABLE 28

| | Components of Base Sheet for Plating (mass %) | | | | | | | | |
|---|---|---|---|---|---|---|---|---|---|
| Symbol | C | Si | Mn | P | S | Ti | Al | B | N |
| I | 0.0012 | 0.03 | 0.32 | 0.007 | 0.009 | 0.054 | 0.04 | 0.0003 | 0.0033 |
| II | 0.0020 | 0.09 | 0.32 | 0.008 | 0.011 | 0.040 | 0.04 | — | 0.0032 |

On both surfaces of the surface-treated steel sheet obtained above, an undercoating film having the composition shown in Table 35 was coated by a roll coater to a predetermined coverage and baked and dried with hot air at 200° C. Furthermore, an electrically conducting pigment-containing organic film having the composition shown in Tables 29 to 34 was coated by a roll coater on both surfaces or one surface (on the outer side) to a predetermined coverage and then baked and dried with a hot air at 250° C. In some levels, skin pass rolling was applied to the surface-treated steel sheet and applied also after the coating of the organic film to adjust the roughness and texture of the surface. The specifications of the thus-obtained rust-preventive steel sheets are shown in Tables 36 to 39.

The steel sheets produced as above were evaluated on the aptitude as a fuel tank by the following method.

(1) Evaluation of Corrosion Resistance (a) Outer Surface Corrosion Resistance

The steel sheet after coating was formed by cylindrical cup drawing such that the coated surface came the outer side, and was then subjected to a cycle corrosion test. In the cylindrical cup drawing, the steel sheet was coated with a rust-preventive oil, left in the erected state for 1 hour to 1 hour and 30 minutes and then drawn at a drawing ratio of 2.0 with a punch diameter of 50 mm under an unwrinkling pressure of 9.8 kN.

In the cycle corrosion test, one cycle was 8 hours in total consisting of salt water spraying for 2 hours, drying for 4 hours and dampening for 2 hours. The salt water spraying was performed under the conditions according to JIS-K5400. The drying conditions were a temperature of 50° C. and a humidity of 30% RH or less, and the dampening conditions were a temperature of 35° C. and a humidity of 95% RH or more.

The corrosion resistance was evaluated according to the following rating scale.

Score 4+: Red rust indicating the decrease in the thickness of the steel sheet was not generated even after 300 cycles and white rust indicating the corrosion of the plating layer was covering the sample in an area ratio of less than 5% of the entire area.

Score 4: Red rust indicating the decrease in the thickness of the steel sheet was not generated even after 300 cycles and white rust indicating the corrosion of the plating layer was covering the sample in an area ratio of 5% to less than 50% of the entire area.

Score 3: Red rust indicating the decrease in the thickness of the steel sheet was not generated even after 300 cycles.

Score 2: Red rust was not observed after 100 cycles but observed after 300 cycles.

Score 1: Red rust was observed after 100 cycles.

(b) Inner Surface Corrosion Resistance

The corrosion resistance against gasoline was evaluated. As for the method therefor, a test solution was poured in a sample deep-drawn into a flat-bottom cylinder having a flange width of 20 mm, a diameter of 50 mm and a depth of 25 mm by a hydraulic forming tester, and a glass cover was secured thereon through a silicon rubber-made ring. After this test, the corroded state was observed by eye.

(Test Conditions)

Test solution:

gasoline+distilled water (10%)+formic acid (200 ppm)

Test period: left standing at 40° C. for 3 months.

(Criteria of Evaluation)

Score 4: No change.

Score 3: White rust generation ratio was 1% or less.

Score 2: Red rust generation ratio was 5% or less or white rust generation ratio was from 1 to 50%.

Score 1: Red rust generation ratio was exceeding 5% or conspicuous white rust.

(2) Evaluation of Press Workability

A forming test at a drawing ratio of 2.3 was performed by using a hydraulic forming tester and a cylindrical punch having a diameter of 50 mm. At this time, the unwrinkling pressure was 4.9 kN. The formability was evaluated according to the following criteria.

Score 4: Formable and no defect in the plating layer. The film state was completely normal without a lack of luster or the like in the formed part.

Score 3: Formable but a flaw was slightly generated in the plating layer. The film formed part was changed in the color tone but free from cracking or separation.

Score 2: Formable but a large flaw was generated in the plating layer and film cracking was observed.

Score 1: Not formable.

(3) Evaluation of Weldability

The weldability was evaluated by the spot welding continuous dotting property and seam weldability.

(a) Spot Welding

Spot welding was performed by using a R40 chromium-copper electrode having a tip diameter of 6 mm at a welding current of 10 kA under an applied pressure of 1.96 kN for a welding time of 12 cycles, and the continuous dotting number before the nugget diameter decreased below $4\sqrt{t}$ (where t=sheet thickness) was evaluated.

Score 4: Continuous dotting number of 500 or more.
Score 3: Continuous dotting number of 300 to less than 500.
Score 2: Continuous dotting number of 100 to less than 300.
Score 1: Continuous dotting number of less than 100.

(b) Seam Weldability

Seam welding of 10 m was performed with 2-on/1-off electrification at a welding current of 11 kA and an applied pressure of 4.9 kN by using an electrode ring having a tip R of 6 mm and a diameter of 250 mm. Thereafter, a specimen according to JIS-Z-3141 was prepared and tested on the leakage.

Score 4: No leakage.
Score 3: No leakage but the welded part surface was slightly roughened.
Score 2: No leakage but defects such as cracking were generated on the welded part surface.
Score 1: Leakage was generated.

TABLE 29

Precursor of Polyester Polyol Having at Least 3 Functional Groups

| No. | Dicarboxylic Acid | Glycol | Polyol |
|---|---|---|---|
| 901 | maleic acid | propylene glycol | trimethylolpropane |
| 902 | maleic acid | propylene glycol | glycerin |

TABLE 29-continued

Precursor of Polyester Polyol Having at Least 3 Functional Groups

| No. | Dicarboxylic Acid | Glycol | Polyol |
|---|---|---|---|
| 903 | maleic acid | 1,6-hexanediol | glycerin |
| 904 | isophthalic acid | propylene glycol | trimethylolpropane |
| 905 | isophthalic acid | 1,6-hexanediol | glycerin |

TABLE 30

Precursor of Blocked Product of Prepolymer Having NCO Group at the End, Obtained by Reaction of Organic Polyisocyanate or Blocked Product Thereof with Active Hydrogen Compound

| No. | Compound Having NCO Group | Blocking Agent |
|---|---|---|
| 906 | tetramethylene diisocyanate | phenol |
| 907 | tetramethylene diisocyanate | isopropyl alcohol |
| 908 | n-xylene diisocyanate | isopropyl alcohol |

TABLE 31

Epoxy Resin Having at Least One Secondary Hydroxyl Group or Adduct Thereof

| No. | Epoxy Resin | Addition Agent |
|---|---|---|
| 909 | epoxy resin of formula (1) where n is 3 on average | ε-caprolactone |
| 910 | epoxy resin of formula (1) where n is 8 on average | ε-caprolactone |
| 911 | epoxy resin of formula (1) where n is 8 on average | ethylene oxide |

TABLE 32

Composition of Organic Resin

| No. | (a) Precursor of Table 2 | (b) Precursor of Table 3 | (c) Resin of Table 4 | Constitutional Ratio (equivalent ratio) OH Group equivalent of (a)/regenerated NCO group equivalent of (b), or OH group equivalent of (a) + (c)/regenerated NCO group equivalent of (b) | Mass ratio of (a):(c) | Remarks |
|---|---|---|---|---|---|---|
| 912 | No. 901 | No. 906 | none | 1/1 | — | Invention |
| 913 | No. 901 | No. 907 | none | 1/1 | — | |
| 914 | No. 901 | No. 908 | none | 1/1 | — | |
| 915 | No. 902 | No. 906 | none | 1.2/1 | — | |
| 916 | No. 903 | No. 907 | none | 1.2/1 | — | |
| 917 | No. 904 | No. 908 | none | 0.8/1 | — | |
| 918 | No. 905 | No. 907 | none | 0.9/1 | — | |
| 919 | No. 901 | No. 906 | No. 909 | 1/1 | 7:3 | |
| 920 | No. 901 | No. 907 | No. 910 | 1/1 | 7:3 | |
| 921 | No. 905 | No. 906 | No. 910 | 1/1 | 6:4 | |
| 922 | No. 905 | No. 907 | No. 909 | 1/1 | 6:4 | |
| 923 | No. 905 | No. 907 | No. 911 | 1/1 | 6:4 | |
| 924 | No. 905 | No. 908 | No. 909 | 1/1 | 6:4 | |

TABLE 33

Electrically Conducting Pigment

| No. | Kind |
|---|---|
| 925 | aluminum |
| 926 | zinc |
| 927 | nickel |
| 928 | stainless steel |
| 929 | iron phosphide ($Fe_2P_5$) |
| 930 | ferrosilicon (Fe: 55%, Si: 45%) |
| 931 | ferrosilicon (Fe: 20%, Si: 80%) |
| 932 | a 10/1 (by mol) mixture of ferrosilicon (Fe: 20%, Si: 80%) and stainless steel |
| 933 | silicon |

TABLE 34

Rust-Preventive Pigment

| No. | Kind |
|---|---|
| 934 | a mixture of magnesium secondary phosphate (50 parts by mass) and baked $Mn_2O_3 \cdot V_2O_5$ (50 parts by mass) |
| 935 | a 1/1 (by mol) mixture of $Ca_3(PO_4)_2$ and $V_2O_5$ |
| 936 | strontium chromate |
| 937 | magnesium secondary phosphate |
| 938 | baked $2CaO \cdot V_2O_5$ |

TABLE 35

Undercoating Treatment

| No. | Undercoating Chemicals (component ratio by mass) | Hexavalent Chromium | Trivalent Chromium |
|---|---|---|---|
| 939 | aqueous solution of hexavalent chromic acid:fine particulate silica = 50:50 | + | + |
| 940 | aqueous solution of hexavalent chromic acid:fine particulate silica:etching fluoride = 100:30:10 | + | + |
| 941 | aqueous solution of hexavalent chromic acid | + | + |
| 942 | aqueous solution of trivalent chromic acid | − | + |
| 943 | phenol resin:silane coupling agent:phosphoric acid = 100:10:10 | − | − |
| 944 | phenol resin:silane coupling agent:phosphoric acid:silica = 100:10:10:20 | − | − |
| 945 | acrylolefin:silane coupling agent:silica = 100:10:30 | − | − |
| 946 | acrylolefin:silane coupling agent:silica:tannic acid = 100:10:30:10 | − | − |

+: contained,
−: not contained

TABLE 36

Specification (1 of 4) of Coated Metal Sheet

| | Steel Sheet | Plating Layer Kind | Coverage (g/m²) | Undercoating Layer Kind | Coverage (mg/m²) |
|---|---|---|---|---|---|
| Example 1 | I | Zn electroplating | 40 | No. 942 | 50 |
| Example 2 | II | Zn electroplating | 40 | No. 942 | 50 |
| Example 3 | I | Zn electroplating | 40 | No. 942 | 50 |
| Example 4 | I | Zn—12% Ni electroplating | 40 | — | — |
| Example 5 | I | Zn—12% Ni electroplating | 40 | No. 942 | 50 |
| Example 6 | I | Zn—12% Ni electroplating | 20 | No. 942 | 50 |
| Example 7 | I | Zn—12% Ni electroplating | 50 | No. 942 | 50 |
| Example 8 | I | Zn—12% Ni electroplating | 40 | No. 942 | 50 |
| Example 9 | I | Zn—12% Ni electroplating | 40 | No. 942 | 50 |
| Example 10 | I | Zn—12% Ni electroplating | 40 | No. 942 | 50 |
| Example 11 | I | Zn—12% Ni electroplating | 40 | No. 942 | 50 |
| Example 12 | I | Zn—12% Ni electroplating | 40 | No. 942 | 50 |
| Example 13 | I | Zn—12% Ni electroplating | 40 | No. 942 | 50 |
| Example 14 | I | Zn—12% Ni electroplating | 40 | No. 942 | 50 |
| Example 15 | I | Zn—12% Ni electroplating | 40 | No. 942 | 50 |
| Example 16 | I | Zn—12% Ni electroplating | 40 | No. 942 | 50 |
| Example 17 | I | Zn—12% Ni electroplating | 40 | No. 942 | 50 |
| Example 18 | I | hot-dip Zn plating | 50 | No. 942 | 50 |
| Example 19 | I | hot-dip Zn plating | 50 | No. 942 | 50 |
| Example 20 | I | hot-dip Zn plating | 50 | No. 942 | 50 |
| Example 21 | I | hot-dip Zn plating | 50 | No. 942 | 50 |
| Example 22 | I | hot-dip Zn plating | 50 | No. 942 | 50 |
| Example 23 | I | hot-dip Zn plating | 50 | No. 942 | 50 |
| Example 24 | I | hot-dip Zn plating | 50 | No. 942 | 50 |
| Example 25 | I | hot-dip Zn plating | 50 | No. 942 | 50 |
| Example 26 | I | alloyed hot-dip Zn plating | 45 | No. 942 | 50 |
| Example 27 | I | alloyed hot-dip Zn plating | 45 | No. 942 | 50 |

TABLE 36-continued

Specification (1 of 4) of Coated Metal Sheet

|  | Steel Sheet | Plating Layer Kind | Plating Layer Coverage (g/m²) | Undercoating Layer Kind | Undercoating Layer Coverage (mg/m²) |
|---|---|---|---|---|---|
| Example 28 | I | alloyed hot-dip Zn plating | 45 | No. 942 | 50 |
| Example 29 | I | alloyed hot-dip Zn plating | 45 | No. 942 | 50 |

TABLE 37

Specification (2 of 4) of Coated Metal Sheet

|  | Steel Sheet | Plating Layer Kind | Plating Layer Coverage (g/m²) | Undercoating Layer Kind | Undercoating Layer Coverage (mg/m²) |
|---|---|---|---|---|---|
| Example 30 | I | hot-dip Al—9% Si plating | 40 | No. 939 | 20 |
| Example 31 | I | hot-dip Al—9% Si plating | 40 | No. 940 | 20 |
| Example 32 | I | hot-dip Al—9% Si plating | 40 | No. 941 | 20 |
| Example 33 | I | hot-dip Al—9% Si plating | 40 | No. 942 | 50 |
| Example 34 | I | hot-dip Al—9% Si plating | 40 | No. 944 | 300 |
| Example 35 | I | hot-dip Al—9% Si plating | 40 | No. 945 | 100 |
| Example 36 | I | hot-dip Al—9% Si plating | 40 | No. 946 | 100 |
| Example 37 | I | hot-dip Sn—8% Zn plating | 40 | — | — |
| Example 38 | I | hot-dip Sn—8% Zn plating | 40 | — | — |
| Example 39 | I | hot-dip Sn—8% Zn plating | 40 | — | — |
| Example 40 | I | hot-dip Sn—8% Zn plating | 40 | No. 943 | 300 |
| Example 41 | I | hot-dip Sn—8% Zn plating | 40 | No. 943 | 300 |
| Example 42 | I | hot-dip Sn—8% Zn plating | 40 | No. 943 | 300 |
| Example 43 | I | hot-dip Sn—8% Zn plating | 20 | No. 943 | 300 |
| Example 44 | I | hot-dip Sn—8% Zn plating | 30 | No. 943 | 300 |
| Example 45 | I | hot-dip Sn—8% Zn plating | 60 | No. 943 | 300 |
| Example 46 | I | hot-dip Sn—8% Zn plating | 50 | No. 943 | 300 |
| Comparative Example 1 | I | hot-dip Zn plating | 50 | No. 942 | 50 |
| Comparative Example 2 | I | Zn—12% Ni electroplating | 40 | No. 942 | 50 |
| Comparative Example 3 | I | Zn—12% Ni electroplating | 40 | No. 942 | 50 |
| Comparative Example 4 | I | Zn—12% Ni electroplating | 40 | No. 942 | 50 |
| Comparative Example 5 | I | Zn—12% Ni electroplating | 40 | No. 942 | 50 |
| Comparative Example 6 | I | Zn—12% Ni electroplating | 40 | No. 942 | 50 |
| Comparative Example 7 | I | Zn—12% Ni electroplating | 40 | No. 942 | 50 |
| Comparative Example 8 | I | hot-dip Al—9% Si plating | 40 | No. 942 | 50 |
| Comparative Example 9 | I | hot-dip Al—9% Si plating | 40 | No. 942 | 50 |
| Comparative Example 10 | I | hot-dip Al—9% Si plating | 40 | No. 942 | 50 |
| Comparative Example 11 | I | hot-dip Al—9% Si plating | 40 | No. 942 | 50 |
| Comparative Example 12 | I | hot-dip Al—9% Si plating | 40 | — | — |

TABLE 38

Specification (3 of 4) of Coated Metal Sheet

| | Composition of Organic Film | | | | | | | |
|---|---|---|---|---|---|---|---|---|
| | Organic Resin | | Electrically Conducting Pigment | | Rust-Preventive Pigment | | Thickness | *Coated |
| | Kind | Vol % | Kind | Vol % | Kind | Vol % | (μm) | Surface |
| Example 1 | No. 912 | 65 | No. 932 | 35 | — | 0 | 12 | both |
| Example 2 | No. 912 | 65 | No. 932 | 35 | — | 0 | 12 | both |
| Example 3 | No. 912 | 65 | No. 932 | 35 | — | 0 | 12 | both |
| Example 4 | No. 912 | 65 | No. 932 | 35 | — | 0 | 12 | both |
| Example 5 | No. 912 | 65 | No. 932 | 35 | — | 0 | 12 | both |
| Example 6 | No. 913 | 60 | No. 932 | 35 | No. 934 | 5 | 12 | both |
| Example 7 | No. 914 | 60 | No. 932 | 35 | No. 934 | 5 | 12 | both |
| Example 8 | No. 915 | 60 | No. 932 | 35 | No. 934 | 5 | 12 | both |
| Example 9 | No. 916 | 60 | No. 932 | 35 | No. 934 | 5 | 12 | both |
| Example 10 | No. 917 | 60 | No. 932 | 35 | No. 934 | 5 | 12 | both |
| Example 11 | No. 918 | 60 | No. 932 | 35 | No. 934 | 5 | 12 | both |
| Example 12 | No. 919 | 60 | No. 932 | 35 | No. 934 | 5 | 12 | both |
| Example 13 | No. 920 | 60 | No. 932 | 35 | No. 934 | 5 | 12 | both |
| Example 14 | No. 921 | 80 | No. 932 | 15 | No. 934 | 5 | 12 | both |
| Example 15 | No. 922 | 60 | No. 932 | 45 | No. 934 | 5 | 12 | both |
| Example 16 | No. 923 | 80 | No. 932 | 15 | No. 934 | 5 | 12 | both |
| Example 17 | No. 924 | 50 | No. 932 | 45 | No. 934 | 5 | 12 | both |
| Example 18 | No. 919 | 60 | No. 932 | 35 | No. 934 | 5 | 12 | both |
| Example 19 | No. 919 | 60 | No. 932 | 35 | No. 934 | 5 | 12 | both |
| Example 20 | No. 919 | 60 | No. 925 | 35 | No. 934 | 5 | 12 | both |
| Example 21 | No. 919 | 60 | No. 926 | 35 | No. 934 | 5 | 12 | both |
| Example 22 | No. 919 | 60 | No. 927 | 35 | No. 934 | 5 | 12 | both |
| Example 23 | No. 919 | 60 | No. 928 | 35 | No. 934 | 5 | 12 | both |
| Example 24 | No. 919 | 60 | No. 929 | 35 | No. 934 | 5 | 12 | both |
| Example 25 | No. 919 | 60 | No. 930 | 35 | No. 934 | 5 | 12 | both |
| Example 26 | No. 919 | 60 | No. 931 | 35 | No. 935 | 5 | 12 | both |
| Example 27 | No. 919 | 60 | No. 933 | 35 | No. 936 | 5 | 12 | both |
| Example 28 | No. 919 | 60 | No. 932 | 35 | No. 937 | 5 | 12 | both |
| Example 29 | No. 919 | 60 | No. 932 | 35 | No. 938 | 5 | 12 | both |

*both: both surfaces

TABLE 39

Specification (4 of 4) of Coated Metal Sheet

| | Composition of Organic Film | | | | | | | |
|---|---|---|---|---|---|---|---|---|
| | Organic Resin | | Electrically Conducting Pigment | | Rust-Preventive Pigment | | Thickness | *Coated |
| | Kind | Vol % | Kind | Vol % | Kind | Vol % | (μm) | Surface |
| Example 30 | No. 919 | 60 | No. 932 | 35 | No. 934 | 5 | 10 | both |
| Example 31 | No. 919 | 60 | No. 932 | 35 | No. 934 | 5 | 10 | both |
| Example 32 | No. 919 | 60 | No. 932 | 35 | No. 934 | 5 | 10 | both |
| Example 33 | No. 919 | 60 | No. 932 | 35 | No. 934 | 5 | 10 | both |
| Example 34 | No. 919 | 60 | No. 932 | 35 | No. 934 | 5 | 10 | both |
| Example 35 | No. 919 | 65 | No. 932 | 35 | — | 0 | 10 | both |
| Example 36 | No. 919 | 65 | No. 932 | 35 | — | 0 | 10 | both |
| Example 37 | No. 919 | 40 | No. 932 | 35 | No. 934 | 5 | 5 | both |
| Example 38 | No. 919 | 60 | No. 932 | 35 | No. 934 | 5 | 15 | both |
| Example 39 | No. 919 | 60 | No. 932 | 35 | No. 934 | 5 | 25 | both |
| Example 40 | No. 919 | 60 | No. 932 | 35 | No. 934 | 5 | 10 | one |
| Example 41 | No. 919 | 60 | No. 932 | 35 | No. 934 | 5 | 10 | one |
| Example 42 | No. 919 | 60 | No. 932 | 35 | No. 934 | 5 | 10 | one |
| Example 43 | No. 919 | 60 | No. 932 | 35 | No. 934 | 5 | 10 | one |
| Example 44 | No. 919 | 60 | No. 932 | 35 | No. 934 | 5 | 10 | one |
| Example 45 | No. 919 | 60 | No. 932 | 35 | No. 934 | 5 | 10 | one |
| Example 46 | No. 919 | 60 | No. 932 | 35 | No. 934 | 5 | 10 | one |
| Comparative Example 1 | No. 919 | 25 | No. 932 | 70 | No. 934 | 5 | 1 | both |
| Comparative Example 2 | No. 919 | 25 | No. 932 | 55 | No. 934 | 20 | 10 | both |
| Comparative Example 3 | No. 919 | 65 | No. 932 | 35 | — | 0 | 35 | both |

TABLE 39-continued

Specification (4 of 4) of Coated Metal Sheet

Composition of Organic Film

|  | Organic Resin | | Electrically Conducting Pigment | | Rust-Preventive Pigment | | Thickness | *Coated |
|---|---|---|---|---|---|---|---|---|
|  | Kind | Vol % | Kind | Vol % | Kind | Vol % | (μm) | Surface |
| Comparative Example 4 | No. 919 | 65 | No. 932 | 35 | — | 0 | 12 | both |
| Comparative Example 5 | No. 919 | 65 | No. 932 | 35 | — | 0 | 10 | both |
| Comparative Example 6 | No. 919 | 65 | No. 932 | 35 | — | 0 | 10 | both |
| Comparative Example 7 | No. 919 | 100 | — | 0 | — | 0 | 10 | both |
| Comparative Example 8 | epoxy | 95 | — | 0 | No. 934 | 5 | 10 | both |
| Comparative Example 9 | Polyester | 95 | — | 0 | No. 934 | 5 | 10 | both |
| Comparative Example 10 | acryl | 65 | No. 932 | 35 | — | 0 | 10 | both |
| Comparative Example 11 | acryl-epoxy | 65 | No. 932 | 35 | — | 0 | 10 | both |
| Comparative Example 12 | acryl-urethane | 65 | No. 932 | 35 | — | 0 | 10 | both |

*one: only outer surface side, both: both surfaces

TABLE 40

Performance Evaluation Results (1 of 2)

|  | Surface Roughness | | Surface Texture Pc | Outer Surface | Inner Surface | | | |
|---|---|---|---|---|---|---|---|---|
|  | Ra (μm) | Rmax (μm) | (peaks/ 10 mm) | Corrosion Resistance | Corrosion Resistance | Formability | Spot Weldability | Seam Weldability |
| Example 1 | 0.72 | 9.16 | 74 | 3 | 3 | 4 | 4 | 4 |
| Example 2 | 0.72 | 12.48 | 66 | 4 | 3 | 4 | 4 | 4 |
| Example 3 | 1.48 | 13.40 | 154 | 4 | 3 | 4 | 3 | 3 |
| Example 4 | 1.48 | 14.04 | 141 | 3 | 3 | 4 | 4 | 4 |
| Example 5 | 0.92 | 6.20 | 79 | 4 | 3 | 4 | 4 | 4 |
| Example 6 | 0.45 | 5.23 | 65 | 3 | 3 | 3 | 4 | 4 |
| Example 7 | 0.68 | 7.72 | 105 | 4 | 3 | 4 | 4 | 4 |
| Example 8 | 0.40 | 5.55 | 117 | 3 | 3 | 3 | 4 | 4 |
| Example 9 | 0.56 | 6.87 | 100 | 4 | 3 | 4 | 4 | 4 |
| Example 10 | 0.65 | 6.05 | 98 | 4 | 3 | 4 | 4 | 4 |
| Example 11 | 0.88 | 6.03 | 65 | 4 | 3 | 4 | 4 | 4 |
| Example 12 | 0.90 | 7.06 | 68 | 4 | 3 | 4 | 3 | 3 |
| Example 13 | 0.84 | 8.01 | 102 | 4 | 3 | 4 | 4 | 4 |
| Example 14 | 0.88 | 8.98 | 78 | 4 | 3 | 4 | 3 | 3 |
| Example 15 | 0.79 | 8.05 | 68 | 4 | 3 | 4 | 4 | 4 |
| Example 16 | 0.88 | 7.65 | 64 | 4 | 3 | 4 | 4 | 4 |
| Example 17 | 0.80 | 7.88 | 85 | 4 | 3 | 4 | 4 | 4 |
| Example 18 | 1.10 | 12.20 | 125 | 4 | 3 | 4 | 4 | 4 |
| Example 19 | 1.12 | 15.88 | 185 | 4 | 3 | 4 | 3 | 3 |
| Example 20 | 1.35 | 16.00 | 165 | 4 | 3 | 4 | 3 | 3 |
| Example 21 | 1.55 | 16.50 | 178 | 4 | 3 | 4 | 3 | 3 |
| Example 22 | 1.02 | 13.10 | 125 | 4 | 3 | 4 | 4 | 4 |
| Example 23 | 1.32 | 15.08 | 141 | 4 | 3 | 4 | 4 | 4 |
| Example 24 | 0.98 | 7.05 | 70 | 4 | 3 | 4 | 4 | 4 |
| Example 25 | 1.01 | 7.98 | 65 | 4+ | 3 | 4 | 4 | 4 |
| Example 26 | 0.78 | 10.12 | 120 | 4+ | 3 | 4 | 4 | 4 |
| Example 27 | 0.77 | 9.32 | 105 | 4+ | 3 | 4 | 4 | 4 |
| Example 28 | 0.65 | 7.54 | 89 | 4 | 3 | 4 | 4 | 4 |
| Example 29 | 0.66 | 6.98 | 68 | 4 | 3 | 4 | 4 | 4 |

TABLE 41

Performance Evaluation Results (2 of 2)

| | Surface Roughness | | Surface Texture Pc | Outer Surface | Inner Surface | | | |
|---|---|---|---|---|---|---|---|---|
| | Ra (μm) | Rmax (μm) | (peaks/ 10 mm) | Corrosion Resistance | Corrosion Resistance | Formability | Spot Weldability | Seam Weldability |
| Example 30 | 0.95 | 7.35 | 65 | 4 | 4 | 4 | 4 | 4 |
| Example 31 | 0.93 | 7.68 | 87 | 4 | 4 | 4 | 4 | 4 |
| Example 32 | 1.05 | 7.98 | 98 | 4 | 4 | 4 | 4 | 4 |
| Example 33 | 0.68 | 8.64 | 85 | 4 | 4 | 4 | 4 | 4 |
| Example 34 | 0.78 | 6.90 | 75 | 4 | 4 | 4 | 4 | 4 |
| Example 35 | 0.79 | 8.25 | 71 | 4 | 4 | 4 | 4 | 4 |
| Example 36 | 0.78 | 6.56 | 68 | 4 | 4 | 4 | 4 | 4 |
| Example 37 | 1.68 | 7.31 | 98 | 3 | 3 | 3 | 4 | 4 |
| Example 38 | 0.70 | 7.92 | 63 | 4 | 4 | 4 | 3 | 4 |
| Example 39 | 0.66 | 5.86 | 68 | 4 | 4 | 4 | 3 | 3 |
| Example 40 | 0.85 | 6.89 | 100 | 4+ | 4 | 4 | 4 | 4 |
| Example 41 | 0.86 | 8.01 | 85 | 4+ | 4 | 4 | 4 | 4 |
| Example 42 | 0.85 | 7.45 | 91 | 4+ | 4 | 4 | 4 | 4 |
| Example 43 | 0.80 | 6.89 | 72 | 4 | 4 | 4 | 4 | 4 |
| Example 44 | 0.82 | 7.84 | 65 | 4 | 4 | 4 | 4 | 4 |
| Example 45 | 0.79 | 6.85 | 84 | 4+ | 4 | 4 | 4 | 4 |
| Example 46 | 0.68 | 7.48 | 69 | 4+ | 4 | 4 | 4 | 4 |
| Comparative Example 1 | 1.52 | 6.57 | 253 | 2 | 1 | 2 | 4 | 2 |
| Comparative Example 2 | 2.85 | 19.50 | 198 | 4 | 3 | 4 | 2 | 2 |
| Comparative Example 3 | 0.66 | 5.54 | 21 | 4 | 3 | 3 | 2 | 1 |
| Comparative Example 4 | 2.88 | 25.50 | 220 | 3 | 3 | 4 | 2 | 2 |
| Comparative Example 5 | 2.55 | 19.65 | 302 | 2 | 3 | 4 | 3 | 2 |
| Comparative Example 6 | 3.15 | 28.80 | 190 | 2 | 3 | 4 | 2 | 2 |
| Comparative Example 7 | 0.78 | 7.56 | 65 | 1 | 2 | 4 | 1 | 1 |
| Comparative Example 8 | 0.85 | 7.88 | 78 | 2 | 2 | 3 | 1 | 1 |
| Comparative Example 9 | 0.65 | 8.25 | 96 | 2 | 2 | 3 | 1 | 1 |
| Comparative Example 10 | 0.87 | 6.87 | 66 | 2 | 2 | 2 | 4 | 4 |
| Comparative Example 11 | 0.95 | 9.40 | 80 | 2 | 2 | 2 | 4 | 4 |
| Comparative Example 12 | 0.79 | 8.31 | 77 | 2 | 2 | 2 | 4 | 4 |

Evaluation results are as shown in Tables 40 and 41. In Examples of the present invention, the score is 3 or higher in all of the corrosion resistance test, formability test and weldability test. Depending on the constitution of Examples, a higher performance having a score of 4 is exhibited. Particularly, when the surface roughness of the organic resin film is controlled to 0.3 to 2.5 μm as Ra and 20 μm or less as Rmax and the Pc of the surface texture is controlled to 10 to 200 peaks per 10-mm length with a count level of 0.3 μm, stable welding formability and corrosion resistance are exhibited. Also, in the system where the organic film is formed by using a raw material film-forming resin containing (a) a polyester polyol having at least three functional groups, (b) a blocked organic polyisocyanate or a blocked product of a prepolymer having an NCO group at the end obtained by the reaction of an organic polyisocyanate with an active hydrogen compound, and (c) an epoxy resin having at least one secondary hydroxyl group or an adduct thereof and in the system using ferrosilicon as the electrically conducting pigment, good outer surface corrosion resistance is exhibited.

Comparative Examples 1 to 12 in Table 41 show cases of using a coated steel sheet out of the scope of the present invention. In Comparative Example 1 where the thickness of the organic film is small, the corrosion resistance and formability are insufficient. Also, as the Pc is high, the seam weldability is slightly bad. In Comparative Example 2 where the Ra value is high, the spot weldability is bad and in the seam welding, troubles are generated. In Comparative Example 3 where the film thickness is too large, the weldability is bad. In Comparative Examples 4, 5 and 6 where the surface roughness Ra is high and the Rmax and/or surface texture Pc are high, the spot weldability and seam weldability are bad. In Comparative Example 7 where an electrically conducting pigment is not contained in the film, the weldability is bad. In Comparative Examples 8, 9, 10, 11, and 12 where the resin film is out of the scope of the present invention, the corrosion resistance after forming is poor. In Comparative Examples 8 and 9 where an electrically conducting pigment is not contained, the weldability is also bad. In Comparative Example 12 where an undercoating film is not formed, the formability is bad and in turn the corrosion resistance is decreased.

Example 10

The steel having components shown in Table 42 was ingotted into a bloom by a normal converter-vacuum degassing treatment and the bloom was hot-rolled and then cold-rolled under ordinary conditions to obtain a cold-rolled steel sheet (thickness: 0.8 mm). By using this steel sheet as the material, hot-dip tin plating or tin-based alloy plating was performed. For the hot-dip plating, a line using a Sendzimir system or a flux system was used. In the case of a Sendzimir system, the annealing would be performed within the line. The annealing temperature was from 800 to 850° C. After the plating, the plating coverage was adjusted by a gas wiping method. At this time, the plating temperature which varies according to the plating composition was set to the melting point of plating composition +40° C. On both surfaces of the tin-plated or tin-based alloy-plated steel sheet obtained above, an undercoating film having the composition shown in Table 49 was coated by a roll coater to a predetermined coverage and baked and dried with hot air at 200° C. Furthermore, an electrically conducting pigment-containing organic film having the composition shown in Tables 43 to 48 was coated by a roll coater on both surfaces or one surface (on the outer side) to a predetermined coverage and then baked-dried with a hot air at 250° C. The conditions thereof are shown in Tables 50 to 53. The thus-produced steel sheets were evaluated on the aptitude as a fuel tank in the same manner as in Example 8. The results obtained are shown in Tables 54 to 55.

TABLE 42

| | Components of Base Sheet for Plating (wt %) | | | | | | | | |
|---|---|---|---|---|---|---|---|---|---|
| Symbol | C | Si | Mn | P | S | Ti | Al | B | N |
| I | 0.0012 | 0.03 | 0.32 | 0.007 | 0.009 | 0.054 | 0.04 | 0.0003 | 0.0033 |
| II | 0.0020 | 0.09 | 0.32 | 0.008 | 0.011 | 0.040 | 0.04 | — | 0.0032 |

TABLE 43

Precursor of Polyester Polyol Having at Least 3 Functional Groups

| No. | Dicarboxylic Acid | Glycol | Polyol |
|---|---|---|---|
| 1001 | maleic acid | propylene glycol | trimethylolpropane |
| 1002 | maleic acid | propylene glycol | glycerin |
| 1003 | maleic acid | 1,6-hexanediol | glycerin |
| 1004 | isophthalic acid | propylene glycol | trimethylolpropane |
| 1005 | isophthalic acid | 1,6-hexanediol | glycerin |
| a | maleic acid | 1,6-hexanediol | none |

TABLE 44

Precursor of Blocked Product of Prepolymer Having NCO Group at the End, Obtained by Reaction of Organic Polyisocyanate or Blocked Product Thereof with Active Hydrogen Compound

| No. | Compound Having NCO Group | Blocking Agent |
|---|---|---|
| 1006 | tetramethylene diisocyanate | phenol |
| 1007 | tetramethylene diisocyanate | isopropyl alcohol |
| 1008 | n-xylene diisocyanate | isopropyl alcohol |

TABLE 45

Epoxy Resin Having at Least One Secondary Hydroxyl Group or Adduct Thereof

| No. | Epoxy Resin | Addition Agent |
|---|---|---|
| 1009 | epoxy resin of formula (1) where n is 3 on average | ε-caprolactone |
| 1010 | epoxy resin of formula (1) where n is 8 on average | ε-caprolactone |
| 1011 | epoxy resin of formula (1) where n is 8 on average | ethylene oxide |

TABLE 46

Composition of Organic Resin

| No. | (a) Precursor of Table 2 | (b) Precursor of Table 3 | (c) Resin of Table 4 | Constitutional Ratio (equivalent ratio) OH Group equivalent of (a)/regenerated NCO group equivalent of (b), or OH group equivalent of (a) + (c)/ regenerated NCO group equivalent of (b) | Mass ratio of (a):(c) | Remarks |
|---|---|---|---|---|---|---|
| 1012 | No. 1001 | No. 1006 | none | 1/1 | — | Invention |
| 1013 | No. 1001 | No. 1007 | none | 1/1 | — | |
| 1014 | No. 1001 | No. 1008 | none | 1/1 | — | |
| 1015 | No. 1002 | No. 1006 | none | 1.2/1 | — | |
| 1016 | No. 1003 | No. 1007 | none | 1.2/1 | — | |
| 1017 | No. 1004 | No. 1008 | none | 0.8/1 | — | |
| 1018 | No. 1005 | No. 1007 | none | 0.9/1 | — | |
| 1019 | No. 1001 | No. 1006 | No. 1009 | 1/1 | 7:3 | |
| 1020 | No. 1001 | No. 1007 | No. 1010 | 1/1 | 7:3 | |
| 1021 | No. 1005 | No. 1006 | No. 1010 | 1/1 | 6:4 | |
| 1022 | No. 1005 | No. 1007 | No. 1009 | 1/1 | 6:4 | |
| 1023 | No. 1005 | No. 1007 | No. 1011 | 1/1 | 6:4 | |
| 1024 | No. 1005 | No. 1008 | No. 1009 | 1/1 | 6:4 | |
| A | No. a | No. 1007 | No. 1009 | 1/1 | 6:4 | Comparison |
| B | No. a | No. 1008 | No. 1009 | 1/1 | 6:4 | |

TABLE 47

Electrically Conducting Pigment

| No. | Kind |
|---|---|
| 1025 | aluminum |
| 1026 | zinc |
| 1027 | nickel |
| 1028 | stainless steel |
| 1029 | iron phosphide |
| 1030 | ferrosilicon (Fe: 55%, Si: 45%) |
| 1031 | ferrosilicon (Fe: 20%, Si: 80%) |
| 1032 | a 10/1 (by mol) mixture of ferrosilicon (Fe: 20%, Si: 80%) and stainless steel |
| 1033 | silicon |

TABLE 48

Rust-Preventive Pigment

| No. | Kind |
|---|---|
| 1034 | a 1/1 (by mass) mixture of magnesium secondary phosphate and baked $Mn_2O_3 \cdot V_2O_5$ |
| 1035 | a 1/1 (by mol) mixture of $Ca_3(PO_4)_2$ and $V_2O_5$ |
| 1036 | strontium chromate |
| 1037 | magnesium secondary phosphate |
| 1038 | baked $2CaO \cdot V_2O_5$ |

TABLE 49

Undercoating Treatment

| No. | Undercoating Chemicals (component ratio by mass) | Hexavalent Chromium | Trivalent Chromium |
|---|---|---|---|
| 1039 | aqueous solution of hexavalent chromic acid:fine particulate silica = 50:50 | + | + |
| 1040 | aqueous solution of hexavalent chromic acid:fine particulate silica:etching fluoride = 100:30:10 | + | + |
| 1041 | aqueous solution of hexavalent chromic acid | + | + |
| 1042 | aqueous solution of trivalent chromic acid | − | +− |
| 1043 | phenol resin:silane coupling agent:phosphoric acid = 100:10:10 | − | − |
| 1044 | phenol resin:silane coupling agent:phosphoric acid:silica = 100:10:10:20 | − | − |
| 1045 | acrylolefin:silane coupling agent:silica = 100:10:30 | − | − |
| 1046 | acrylolefin:silane coupling agent:silica:tannic acid = 100:10:30:10 | − | − |

+: contained,
−: not contained

TABLE 50

Specification (1 of 4) of Coated Metal Material

| | Steel Sheet | Plating Layer Kind | Coverage (g/m²) | Undercoating Layer Kind | Coverage (mg/m²) |
|---|---|---|---|---|---|
| Example 1 | I | Sn | 40 | No. 1043 | 300 |
| Example 2 | II | Sn—8% Zn | 40 | No. 1043 | 300 |
| Example 3 | I | Sn—8% Zn—2% Mg | 40 | No. 1043 | 300 |
| Example 4 | I | Sn—8% Zn—2% Mg—1% Al | 40 | No. 1043 | 300 |
| Example 5 | I | Sn—5% Zn | 40 | No. 1043 | 300 |
| Example 6 | I | Sn—20% Zn | 40 | No. 1043 | 300 |
| Example 7 | I | Sn—40% Zn | 40 | No. 1043 | 300 |
| Example 8 | I | Sn—8% Zn | 20 | No. 1043 | 300 |
| Example 9 | I | Sn—8% Zn | 50 | No. 1043 | 300 |
| Example 10 | I | Sn—8% Zn | 40 | No. 1043 | 300 |
| Example 11 | I | Sn—8% Zn | 40 | No. 1043 | 300 |
| Example 12 | I | Sn—8% Zn | 40 | No. 1043 | 300 |
| Example 13 | I | Sn—8% Zn | 40 | No. 1043 | 300 |
| Example 14 | I | Sn—8% Zn | 40 | No. 1043 | 300 |
| Example 15 | I | Sn—8% Zn | 40 | No. 1043 | 300 |
| Example 16 | I | Sn—8% Zn | 40 | No. 1043 | 300 |
| Example 17 | I | Sn—8% Zn | 40 | No. 1043 | 300 |
| Example 18 | I | Sn—8% Zn | 40 | No. 1043 | 300 |
| Example 19 | I | Sn—8% Zn | 40 | No. 1043 | 300 |
| Example 20 | I | Sn—8% Zn | 40 | No. 1043 | 300 |
| Example 21 | I | Sn—8% Zn | 40 | No. 1043 | 300 |
| Example 22 | I | Sn—8% Zn | 40 | No. 1043 | 300 |
| Example 23 | I | Sn—8% Zn | 40 | No. 1043 | 300 |
| Example 24 | I | Sn—8% Zn | 40 | No. 1043 | 300 |
| Example 25 | I | Sn—8% Zn | 40 | No. 1043 | 300 |
| Example 26 | I | Sn—8% Zn | 40 | No. 1043 | 300 |
| Example 27 | I | Sn—8% Zn | 40 | No. 1043 | 300 |
| Example 28 | I | Sn—8% Zn | 40 | — | — |
| Example 29 | I | Sn—8% Zn | 40 | — | — |
| Example 30 | I | Sn—8% Zn | 40 | — | — |
| Example 31 | I | Sn—8% Zn | 40 | — | — |

TABLE 51

Specification (2 of 4) of Coated Metal Material

| | Steel Sheet | Plating Layer Kind | Coverage (g/m²) | Undercoating Layer Kind | Coverage (mg/m²) |
|---|---|---|---|---|---|
| Example 32 | I | Sn—8% Zn | 40 | No. 1039 | 20 |
| Example 33 | I | Sn—8% Zn | 40 | No. 1040 | 20 |
| Example 34 | I | Sn—8% Zn | 40 | No. 1041 | 20 |
| Example 35 | I | Sn—8% Zn | 40 | No. 1042 | 20 |
| Example 36 | I | Sn—8% Zn | 40 | No. 1044 | 300 |
| Example 37 | I | Sn—8% Zn | 40 | No. 1045 | 100 |
| Example 38 | I | Sn—8% Zn | 40 | No. 1046 | 100 |
| Example 39 | I | Sn—8% Zn | 40 | No. 1043 | 300 |
| Example 40 | I | Sn—8% Zn | 40 | No. 1043 | 300 |
| Example 41 | I | Sn—8% Zn | 40 | No. 1043 | 300 |
| Example 42 | I | Sn—8% Zn | 40 | No. 1043 | 300 |
| Example 43 | I | Sn—8% Zn | 40 | No. 1043 | 300 |
| Example 44 | I | Sn—8% Zn | 40 | No. 1043 | 300 |
| Example 45 | I | Sn—8% Zn | 20 | No. 1043 | 300 |
| Example 46 | I | Sn—8% Zn | 30 | No. 1043 | 300 |
| Example 47 | I | Sn—8% Zn | 60 | No. 1043 | 300 |
| Example 48 | I | Sn—8% Zn | 50 | No. 1043 | 300 |
| Comparative Example 1 | I | Sn | 40 | No. 1043 | 300 |
| Comparative Example 2 | I | Sn—8% Zn | 40 | No. 1043 | 300 |
| Comparative Example 3 | I | Sn | 40 | No. 1043 | 300 |
| Comparative Example 4 | I | Sn—8% Zn | 40 | No. 1043 | 300 |
| Comparative Example 5 | I | Sn—8% Zn | 40 | No. 1043 | 300 |
| Comparative Example 6 | I | Sn—8% Zn | 40 | No. 1043 | 300 |
| Comparative Example 7 | I | Sn—8% Zn | 40 | No. 1043 | 300 |
| Comparative Example 8 | I | Zn—Ni electroplating | 40 | No. 1043 | 300 |
| Comparative Example 9 | I | Zn—Ni electroplating | 40 | No. 1043 | 300 |
| Comparative Example 10 | I | alloyed hot-dip galvanization | 40 | No. 1043 | 300 |
| Comparative Example 11 | I | electrogalvanization | 40 | — | — |
| Comparative Example 12 | I | hot-dip galvanization | 60 | — | — |

TABLE 52

Specification (3 of 4) of Coated Metal Material

Composition of Organic Film

| | Organic Resin | | Electrically Conducting Pigment | | Rust-Preventive Pigment | | Thickness | *Coated |
|---|---|---|---|---|---|---|---|---|
| | Kind | Vol % | Kind | Vol % | Kind | Vol % | (μm) | Surface |
| Example 1 | No. 1012 | 65 | No. 1032 | 35 | — | 0 | 10 | both |
| Example 2 | No. 1012 | 65 | No. 1032 | 35 | — | 0 | 10 | both |
| Example 3 | No. 1012 | 65 | No. 1032 | 35 | — | 0 | 10 | both |
| Example 4 | No. 1012 | 65 | No. 1032 | 35 | — | 0 | 10 | both |
| Example 5 | No. 1012 | 65 | No. 1032 | 35 | — | 0 | 10 | both |
| Example 6 | No. 1012 | 65 | No. 1032 | 35 | — | 0 | 10 | both |
| Example 7 | No. 1012 | 65 | No. 1032 | 35 | — | 0 | 10 | both |
| Example 8 | No. 1013 | 65 | No. 1032 | 35 | — | 0 | 10 | both |
| Example 9 | No. 1014 | 65 | No. 1032 | 35 | — | 0 | 10 | both |
| Example 10 | No. 1015 | 65 | No. 1032 | 35 | — | 0 | 10 | both |
| Example 11 | No. 1016 | 65 | No. 1032 | 35 | — | 0 | 10 | both |
| Example 12 | No. 1017 | 65 | No. 1032 | 35 | — | 0 | 10 | both |
| Example 13 | No. 1018 | 65 | No. 1032 | 35 | — | 0 | 10 | both |
| Example 14 | No. 1019 | 65 | No. 1032 | 15 | — | 0 | 10 | both |
| Example 15 | No. 1020 | 65 | No. 1032 | 45 | — | 0 | 10 | both |
| Example 16 | No. 1021 | 65 | No. 1032 | 15 | — | 0 | 10 | both |
| Example 17 | No. 1022 | 65 | No. 1032 | 45 | — | 0 | 10 | both |
| Example 18 | No. 1023 | 65 | No. 1032 | 35 | — | 0 | 10 | both |
| Example 19 | No. 1024 | 65 | No. 1032 | 35 | — | 0 | 10 | both |
| Example 20 | No. 1019 | 65 | No. 1025 | 35 | No. 1034 | 5 | 10 | both |
| Example 21 | No. 1019 | 65 | No. 1026 | 35 | No. 1034 | 5 | 10 | both |
| Example 22 | No. 1019 | 60 | No. 1027 | 35 | No. 1034 | 5 | 10 | both |
| Example 23 | No. 1019 | 60 | No. 1028 | 35 | No. 1034 | 5 | 10 | both |
| Example 24 | No. 1019 | 60 | No. 1029 | 35 | No. 1034 | 5 | 10 | both |
| Example 25 | No. 1019 | 60 | No. 1030 | 35 | No. 1034 | 5 | 10 | both |
| Example 26 | No. 1019 | 60 | No. 1031 | 35 | No. 1034 | 5 | 10 | both |
| Example 27 | No. 1019 | 60 | No. 1033 | 35 | No. 1034 | 5 | 10 | both |
| Example 28 | No. 1019 | 60 | No. 1032 | 35 | No. 1036 | 5 | 10 | both |
| Example 29 | No. 1019 | 60 | No. 1032 | 35 | No. 1036 | 5 | 10 | both |
| Example 30 | No. 1019 | 60 | No. 1032 | 35 | No. 1037 | 5 | 10 | both |
| Example 31 | No. 1019 | 60 | No. 1032 | 35 | No. 1038 | 5 | 10 | both |

*both: both surfaces

TABLE 53

Specification (4 of 4) of Coated Metal Material

Composition of Organic Film

| | Organic Resin | | Electrically Conducting Pigment | | Rust-Preventive Pigment | | Thickness | *Coated |
|---|---|---|---|---|---|---|---|---|
| | Kind | Vol % | Kind | Vol % | Kind | Vol % | (μm) | Surface |
| Example 32 | No. A | 60 | No. 1032 | 35 | No. 1034 | 5 | 10 | one |
| Example 33 | No. A | 60 | No. 1032 | 35 | No. 1034 | 5 | 10 | one |
| Example 34 | No. A | 60 | No. 1032 | 35 | No. 1034 | 5 | 10 | one |
| Example 35 | No. B | 60 | No. 1032 | 35 | No. 1034 | 5 | 10 | one |
| Example 36 | No. B | 60 | No. 1032 | 35 | No. 1034 | 5 | 10 | one |
| Example 37 | No. 1019 | 60 | No. 1032 | 35 | — | 0 | 10 | one |
| Example 38 | No. 1019 | 60 | No. 1032 | 35 | — | 0 | 10 | one |
| Example 39 | No. 1019 | 60 | No. 1032 | 35 | No. 1034 | 5 | 1 | both |
| Example 40 | No. 1019 | 60 | No. 1032 | 35 | No. 1034 | 5 | 5 | both |
| Example 41 | No. 1019 | 60 | No. 1032 | 35 | No. 1034 | 5 | 15 | both |
| Example 42 | No. 10A | 60 | No. 1032 | 35 | No. 1034 | 5 | 10 | both |
| Example 43 | No. 10B | 60 | No. 1032 | 35 | No. 1034 | 5 | 10 | both |
| Example 44 | epoxy | 60 | No. 1032 | 35 | No. 1034 | 5 | 10 | both |
| Example 45 | poly-ester | 60 | No. 1032 | 15 | No. 1034 | 5 | 10 | both |
| Example 46 | acryl | 60 | No. 1032 | 35 | No. 1034 | 5 | 10 | both |
| Example 47 | acryl-epoxy | 60 | No. 1032 | 35 | No. 1034 | 5 | 10 | both |
| Example 48 | acryl-urethane | 60 | No. 1032 | 35 | No. 1034 | 5 | 10 | both |

TABLE 53-continued

Specification (4 of 4) of Coated Metal Material

Composition of Organic Film

| | Organic Resin | | Electrically Conducting Pigment | | Rust-Preventive Pigment | | Thickness | *Coated |
|---|---|---|---|---|---|---|---|---|
| | Kind | Vol % | Kind | Vol % | Kind | Vol % | (μm) | Surface |
| Comparative Example 1 | No. 1019 | 25 | No. 1032 | 70 | No. 1034 | 5 | 10 | both |
| Comparative Example 2 | No. 1019 | 25 | No. 1032 | 55 | No. 1034 | 20 | 10 | both |
| Comparative Example 3 | No. 1019 | 65 | No. 1032 | 35 | — | 0 | 35 | both |
| Comparative Example 4 | No. 1019 | 65 | No. 1032 | 35 | — | 0 | 0.5 | both |
| Comparative Example 5 | polyester | 100 | — | 0 | — | 0 | 10 | both |
| Comparative Example 6 | acryl | 100 | — | 0 | — | 0 | 10 | both |
| Comparative Example 7 | No. 1019 | 100 | — | 0 | — | 0 | 3 | both |
| Comparative Example 8 | No. 1020 | 95 | — | 0 | No. 1034 | 5 | 20 | both |
| Comparative Example 9 | No. 1021 | 95 | — | 0 | No. 1034 | 5 | 10 | both |
| Comparative Example 10 | No. 1019 | 65 | No. 1032 | 35 | — | 0 | 10 | both |
| Comparative Example 11 | No. A | 65 | No. 1032 | 35 | — | 0 | 10 | both |
| Comparative Example 12 | No. B | 65 | No. 1032 | 35 | — | 0 | 10 | both |

*one: only outer surface side, both: both surfaces

TABLE 54

Performance Evaluation Results (1 of 2)

| | Outer Surface Corrosion Resistance | Inner Surface Corrosion Resistance | Formability | Spot Weldability | Seam Weldability |
|---|---|---|---|---|---|
| Example 1 | 3 | 3 | 4 | 4 | 4 |
| Example 2 | 4 | 4 | 4 | 4 | 4 |
| Example 3 | 4 | 4 | 4 | 4 | 4 |
| Example 4 | 4 | 4 | 4 | 4 | 4 |
| Example 5 | 4 | 4 | 4 | 4 | 4 |
| Example 6 | 4 | 4 | 4 | 4 | 4 |
| Example 7 | 4 | 4 | 4 | 4 | 4 |
| Example 8 | 3 | 3 | 4 | 4 | 4 |
| Example 9 | 4 | 4 | 4 | 4 | 4 |
| Example 10 | 4 | 4 | 4 | 4 | 4 |
| Example 11 | 4 | 4 | 4 | 4 | 4 |
| Example 12 | 4 | 4 | 4 | 4 | 4 |
| Example 13 | 4 | 4 | 4 | 4 | 4 |
| Example 14 | 4 | 4 | 4 | 3 | 3 |
| Example 15 | 4 | 4 | 4 | 4 | 4 |
| Example 16 | 4 | 4 | 4 | 3 | 3 |
| Example 17 | 4 | 4 | 4 | 4 | 4 |
| Example 18 | 4 | 4 | 4 | 4 | 4 |
| Example 19 | 4 | 4 | 4 | 4 | 4 |
| Example 20 | 4 | 4 | 4 | 4 | 4 |
| Example 21 | 4 | 4 | 4 | 4 | 4 |
| Example 22 | 4 | 4 | 4 | 4 | 4 |
| Example 23 | 4 | 4 | 4 | 4 | 4 |
| Example 24 | 4 | 4 | 4 | 4 | 4 |
| Example 25 | 4+ | 4 | 4 | 4 | 4 |
| Example 26 | 4+ | 4 | 4 | 4 | 4 |
| Example 27 | 4+ | 4 | 4 | 4 | 4 |
| Example 28 | 4 | 3 | 4 | 4 | 4 |
| Example 29 | 4 | 3 | 4 | 4 | 4 |
| Example 30 | 4 | 3 | 4 | 4 | 4 |
| Example 31 | 4 | 3 | 4 | 4 | 4 |

TABLE 55

Evaluation Results (2 of 2) of Examples of the Invention and Comparative Examples

| | Outer Surface Corrosion Resistance | Inner Surface Corrosion Resistance | Formability | Spot Weldability | Seam Weldability |
|---|---|---|---|---|---|
| Example 32 | 4 | 3 | 4 | 4 | 4 |
| Example 33 | 4 | 3 | 4 | 4 | 4 |
| Example 34 | 4 | 3 | 4 | 4 | 4 |
| Example 35 | 4 | 3 | 4 | 4 | 4 |
| Example 36 | 4 | 4 | 4 | 4 | 4 |
| Example 37 | 4 | 3 | 4 | 4 | 4 |
| Example 38 | 4 | 3 | 4 | 4 | 4 |
| Example 39 | 3 | 4 | 3 | 4 | 4 |
| Example 40 | 3 | 4 | 4 | 4 | 4 |
| Example 41 | 4+ | 4 | 4 | 3 | 3 |
| Example 42 | 3 | 4 | 3 | 4 | 4 |
| Example 43 | 3 | 4 | 3 | 4 | 4 |
| Example 44 | 3 | 4 | 3 | 4 | 4 |

TABLE 55-continued

Evaluation Results (2 of 2) of Examples of the
Invention and Comparative Examples

| | Outer Surface Corrosion Resistance | Inner Surface Corrosion Resistance | Formability | Spot Weldability | Seam Weldability |
|---|---|---|---|---|---|
| Example 45 | 3 | 4 | 3 | 4 | 4 |
| Example 46 | 3 | 4 | 3 | 4 | 4 |
| Example 47 | 3 | 4 | 3 | 4 | 4 |
| Example 48 | 3 | 4 | 3 | 4 | 4 |
| Comparative Example 1 | 2 | 3 | 1 | 4 | 4 |
| Comparative Example 2 | 2 | 4 | 2 | 4 | 4 |
| Comparative Example 3 | 4+ | 3 | 4 | 2 | 2 |
| Comparative Example 4 | 2 | 4 | 1 | 4 | 4 |
| Comparative Example 5 | 2 | 4 | 4 | 1 | 1 |
| Comparative Example 6 | 2 | 4 | 4 | 1 | 1 |
| Comparative Example 7 | 2 | 4 | 4 | 1 | 1 |
| Comparative Example 8 | 2 | 2 | 4 | 2 | 2 |
| Comparative Example 9 | 2 | 2 | 4 | 1 | 1 |
| Comparative Example 10 | 4 | 2 | 4 | 4 | 4 |
| Comparative Example 11 | 1 | 2 | 1 | 4 | 4 |
| Comparative Example 12 | 1 | 2 | 1 | 4 | 4 |

Evaluation results are as shown in Tables 54 and 55. In Examples of the present invention, the score is 3 or higher in all of the corrosion resistance test, the formability test and the weldability test. Depending on the constitution of Examples, higher performances having a score of 4 are exhibited. Particularly, in the system where the organic film is formed by using a raw material film-forming resin containing (a) a polyester polyol having at least three functional groups, (b) a blocked organic polyisocyanate or a blocked product of a prepolymer having an NCO group at the end obtained by the reaction of an organic polyisocyanate with an active hydrogen compound, and (c) an epoxy resin having at least one secondary hydroxyl group or an adduct thereof and in the system using ferrosilicon as the electrically conducting pigment, good outer surface corrosion resistance is exhibited. Even when not an organic film containing an electrically conducting pigment but only an undercoating film is present on the inner surface side, good properties are exhibited.

Comparative Examples 1 to 12 in Table 55 show cases of using a coated steel sheet out of the scope of the present invention. In Comparative Examples 1 and 2 where the amounts of the electrically conducting pigment and rust inhibitor are too large, the formability and in turn the corrosion resistance are decreased. In Comparative Example 3 where the film thickness is too large, the weldability is bad. In Comparative Example 4 where the film thickness is too small, the formability and corrosion resistance are bad. In Comparative Examples 5, 6, 7, 8 and 9 where an electrically conducting pigment is not contained in the film, the weldability is bad. In Comparative Example 10 where a zinc-based plating is used, the inner surface corrosion resistance is slightly bad. In Comparative Examples 11 and 12 where a zinc-based plating is used and moreover, an undercoating film is not formed, the formability is band and in turn the corrosion resistance is decreased.

These results reveal that, according to the constitutions of the present invention, a rust-preventive steel sheet having excellent corrosion resistance as a fuel tank material of automobiles and exhibiting good property in both resistance weldability and press formability can be provided.

INDUSTRIAL APPLICABILITY

As is apparent from the description in the foregoing pages, the coated-metal sheet of the present invention containing electrically conducting particles controlled in the size distribution can be widely and easily used for parts which are subjected to welding or required to have an earthing property and used in automobiles, home appliances, OA devices, civil engineering-building materials and the like. Also, as good formability and corrosion resistance can be ensured, this metal sheet allows for application in various uses and greatly contributes to various industrial fields. According to the constitutions of the present invention, a weldable coated metal material excellent in the corrosion resistance of the formed part can be provided. Furthermore, according to the constitutions of the present invention, a rust-preventive steel sheet having excellent corrosion resistance as a fuel tank material of automobiles, and exhibiting good property in both resistance weldability and press formability, can be provided.

The invention claimed is:

1. A coated metal material excellent in electric conductivity, corrosion resistance and formability, comprising a metal sheet having formed on at least one surface thereof a coat layer containing electrically conducting particles, wherein a mode value in the number distribution for every each particle size of the electrically conducting particle is Mn, a mode value in the volume distribution for every each particle size of the electrically conducting particle is Mv and a thickness of the coat layer is H, $$H/10 \leq Mv \leq 10H$$

$$5Mn \leq H \leq 200Mn$$

$$12 \leq Mv/Mn \leq 50$$

and at the same time, the content of the electrically conducting particles in the coat layer is from 15 to 60 vol %.

2. The coated metal material according to claim 1 wherein Mn is 0.05 to 1.5 μm and Mv is 2 to 30 μm.

3. The coated metal material according to claim 2, comprising a metal sheet having formed on at least one surface thereof a coat layer containing electrically conducting particles, wherein the mode value in the number distribution of the electrically conducting particle, Mn, is in a range of 0.05 to 1.0 μm and the total content of the conducting particles in the coat layer is in a range of 15 to 60 vol %.

4. The coated metal material according to claim 3, wherein the binder of the coat layer mainly comprises a urethane bond-containing resin.

5. The coated metal material according to claim 4, comprising a metal sheet having a coat layer containing electrically conducting particles, wherein the binder of the coat layer mainly comprises a urethane bond-containing resin, said urethane bond-containing resin being an organic resin produced from a raw film-forming resin material comprising (a) a polyester polyol having at least three functional groups and (b) a blocked organic polyisocyanate or a blocked product of a prepolymer having an NCO group at the end obtained by the reaction of an organic polyisocyanate with an active hydrogen compound.

6. The coated metal material according to claim 5, wherein said urethane bond-containing resin is an organic resin produced from a raw film-forming resin material comprising (a) a polyester polyol having at least three functional groups, (b) a blocked organic polyisocyanate or a blocked product of a prepolymer having an NCO group at the end obtained by the reaction of an organic polyisocyanate with an active hydrogen compound, and (c) an epoxy resin having at least one secondary hydroxyl group or an adduct thereof.

7. The coated metal material according to claim 6, wherein said coated metal material comprise a stainless steel sheet, a tin or tin alloy coat layer on surfaces of said stainless steel sheet, a undercoating layer on said tin or tin alloy coat layer on one side or both sides of said stainless steel sheet, with a coverage of the undercoating layer being from 10 to 1,000 mg/m$^2$, and said coat layer containing said electrically conducting particles on said undercoating layer on one side or both sides of said stainless steel sheet, with a thickness of said coat layer containing said electrically conducting particles being from 1.0 to 20 μm.

8. The coated metal material according to claim 3, wherein the number of the electrically conducting particles at the mode value in the number distribution of said electrically conducting particles occupies 5% or more in the number of all electrically conducting particles.

9. The coated metal material according to claim 3, wherein the distribution of the volume of every each particle size of said electrically conducting particles has a mode value at a particle size in a range of 2 to 20 μm.

10. The coated metal material according to claim 9, wherein the coat layer has a thickness H in a range of 2 to 20 μm.

11. The coated metal material according to claim 10, wherein the maximum particle size of the electrically conducting particles is 35 μm or less.

12. The coated metal material according to claim 10, wherein the maximum particle size of the electrically conducting particles is 25 μm or less.

13. The coated metal material according to claim 3, wherein the electrically conducting particles comprise (i) a metal and/or (ii) an alloy or compound of a typical metal, transition metal or semimetal element.

14. The coated metal material according to claim 13, wherein said electrically conducting particles comprise an alloy or compound containing 40 mass % or more of silicon, or a composite material thereof.

15. The coated metal material according to claim 13, wherein the electrically conducting particles in the organic layer comprise an alloy or compound containing 50 mass % or more of silicon, or a composite material thereof.

16. The coated metal material according to claim 13, wherein the electrically conducting particles comprise ferrosilicon.

17. The coated metal material according to claim 13, wherein the electrically conducting particles comprise ferrosilicon containing 70 mass % or more of silicon.

18. The coated metal material according to claim 13, wherein the electrically conducting particles comprises at least one selected from the group consisting of stainless steel, zinc, aluminum, nickel, ferrosilicon and iron phosphide.

19. The coated metal material according to claim 13, wherein the content of the electrically conducting particles in the organic layer is in a range of 5 to 50 vol % in terms of the solid content.

20. The coated metal material according to claim 13, wherein the organic layer further comprises a rust-preventive pigment.

21. The coated metal material according to claim 20, wherein the organic layer further comprises from 1 to 40 vol %, in terms of the solid content, of rust-preventive pigment and the sum of the electrically conducting particles and the rust-preventive pigment is from 5 to 70 vol % in terms of the solid content.

22. The coated metal material according to claim 20, wherein the organic layer comprises from 1 to 50 vol % of electrically conducting pigment and from 5 to 40 vol % of the rust-preventive pigment, and the electrically conducting particles and rust-preventive pigment account for from 5 to 70 vol % of the entire coating layer.

23. The coated metal material according to claim 13, wherein the coat layer comprises 20 vol % or less of the rust-preventive pigment and/or silica.

24. The coated metal material according to claim 13, wherein the binder of the coat layer mainly comprises a thermoplastic resin.

25. The coated metal material according to claim 6, wherein an organic resin layer containing electrically conducting particles is formed as the coat layer on at least one surface of a surface-treated steel and the surface roughness of said organic layer is from 0.3 to 2.5 μm as the average roughness from center line of surface roughness, Ra.

26. The coated metal material according to claim 25, wherein the surface roughness of said organic film is 20 μm or less as the maximum height, Rmax.

27. The coated metal material according to claim 25, wherein the surface texture of said organic film has a peak count Pc of 200 peaks or less per 10-mm length with a count level of 0.3 μm.

28. The coated metal material according to claim 25, which comprises an undercoating film between said organic layer and the surface-treated sheet.

29. The coated metal material according to claim 28, wherein the coverage of the undercoating film is from 10 to 1,000 mg/m$^2$.

* * * * *